(12) United States Patent
Yang et al.

(10) Patent No.: US 12,229,387 B2
(45) Date of Patent: Feb. 18, 2025

(54) APPLICATION INTERFACE DISPLAY METHOD AND ELECTRONIC DEVICE

(71) Applicant: HONOR DEVICE CO., LTD., Shenzhen (CN)

(72) Inventors: Liu Yang, Shenzhen (CN); Wei Xiao, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/025,690

(22) PCT Filed: Aug. 29, 2022

(86) PCT No.: PCT/CN2022/115556
§ 371 (c)(1),
(2) Date: Mar. 10, 2023

(87) PCT Pub. No.: WO2023/098182
PCT Pub. Date: Jun. 8, 2023

(65) Prior Publication Data
US 2024/0288990 A1  Aug. 29, 2024

(30) Foreign Application Priority Data

Dec. 3, 2021 (CN) .......................... 202111471122.5

(51) Int. Cl.
*G06F 3/0482* (2013.01)
*G06F 1/16* (2006.01)
*G06F 3/04842* (2022.01)

(52) U.S. Cl.
CPC .......... *G06F 3/0482* (2013.01); *G06F 1/1652* (2013.01); *G06F 3/04842* (2013.01); *G06F 2203/04803* (2013.01)

(58) Field of Classification Search
CPC .. G06F 3/0482; G06F 3/04842; G06F 1/1652; G06F 2203/04803
See application file for complete search history.

(56) References Cited

U.S. PATENT DOCUMENTS 11,010,211 B2    5/2021  Chen et al.
11,714,520 B2 *  8/2023  Hwang ............... G06F 3/04886
                                                715/780
(Continued)

FOREIGN PATENT DOCUMENTS

CN      104572001 B    3/2016
CN      106325687 A    1/2017
(Continued)

OTHER PUBLICATIONS

Zhaohui; "Officially released for the first time! MIUI 9's hidden features are fully revealed: so useful";Aug. 1, 2018; Retrieved from the internet, URL:https://news.mydrivers.com/1/542/542668.htm?ref=https%3A//www.baidu.com/link%3Furl%3DY8kQ0sqp_ttdxP32CTu6SpAZUN38aA_MPv0c899F_IL7khlZJb6jzl5-xtVXLPmE00yGV8uQxKRVmsf6F2emeq%26wd%3D%26eqid%3D8b100d580001c1ad00000006660cb764.
(Continued)

*Primary Examiner* — Tadesse Hailu

(57) ABSTRACT

This application provides an application interface display method and an electronic device, and relates to the field of communication technologies. By using the solution of this application, according to an operation (for example, selection or copy) performed by the user on an object (for example, text or a picture) displayed on a current interface, a related application may be recommended, based on the target object, to the user for selection. When selecting a recommended application, the user may trigger simultaneous display (for example, split-screen display or floating-window display) of the current interface and an interface of (Continued)

the recommended application. In this application, a split-screen requirement may be determined according to a scenario behavior of the user, and then a recommended application and an intelligent split-screen service may be actively provided in a targeted manner, to achieve more efficient task parallel experience, thereby improving user experience.

17 Claims, 47 Drawing Sheets

(56) References Cited

U.S. PATENT DOCUMENTS

| | | | |
|---|---|---|---|
| 2016/0351168 | A1 | 12/2016 | Yan et al. |
| 2019/0187893 | A1* | 6/2019 | Gan .................... G06F 3/04886 |
| 2019/0243516 | A1 | 8/2019 | Shim et al. |
| 2019/0347144 | A1 | 11/2019 | Chen et al. |
| 2020/0042171 | A1 | 2/2020 | Tao |
| 2020/0320906 | A1 | 10/2020 | Knarr et al. |
| 2020/0333932 | A1* | 10/2020 | Lee .................... G06F 3/04883 |
| 2022/0035494 | A1 | 2/2022 | Lee et al. |
| 2022/0269405 | A1 | 8/2022 | Wu et al. |
| 2022/0318036 | A1* | 10/2022 | Zhang .................... G06F 3/0481 |
| 2022/0334697 | A1* | 10/2022 | Xu .................... G06F 3/04817 |
| 2022/0365675 | A1* | 11/2022 | Fu .................... H04M 1/0214 |
| 2023/0046708 | A1 | 2/2023 | Xu |
| 2023/0082360 | A1 | 3/2023 | Shen |
| 2023/0213973 | A1* | 7/2023 | Xu .................... G06F 1/1641 |
| | | | 345/55 |
| 2023/0367532 | A1* | 11/2023 | Peng .................... G06F 3/04845 |
| 2023/0403458 | A1* | 12/2023 | Liu .................... H04N 23/57 |

FOREIGN PATENT DOCUMENTS

| | | |
|---|---|---|
| CN | 106843732 A | 6/2017 |
| CN | 108614655 A | 10/2018 |
| CN | 109997111 A | 7/2019 |
| CN | 110225154 A | 9/2019 |
| CN | 110661917 A | 1/2020 |
| CN | 111600998 A | 8/2020 |
| CN | 113645351 A | 11/2021 |
| CN | 113703627 A | 11/2021 |
| WO | 2020118490 A1 | 6/2020 |
| WO | 2020213978 A1 | 10/2020 |
| WO | 2021018067 A1 | 2/2021 |
| WO | 2021232930 A1 | 11/2021 |

OTHER PUBLICATIONS

Notice of Allowance issued in CN202111471122.5, dated Dec. 1, 2024, 4 pages.
Communication pursuant to Article 94(3) EPC Application No. 22859568.2, dated Oct. 15, 2024, 11 pages.

* cited by examiner

TO. FIG. 3(b)

CONT. FROM FIG. 3(c)

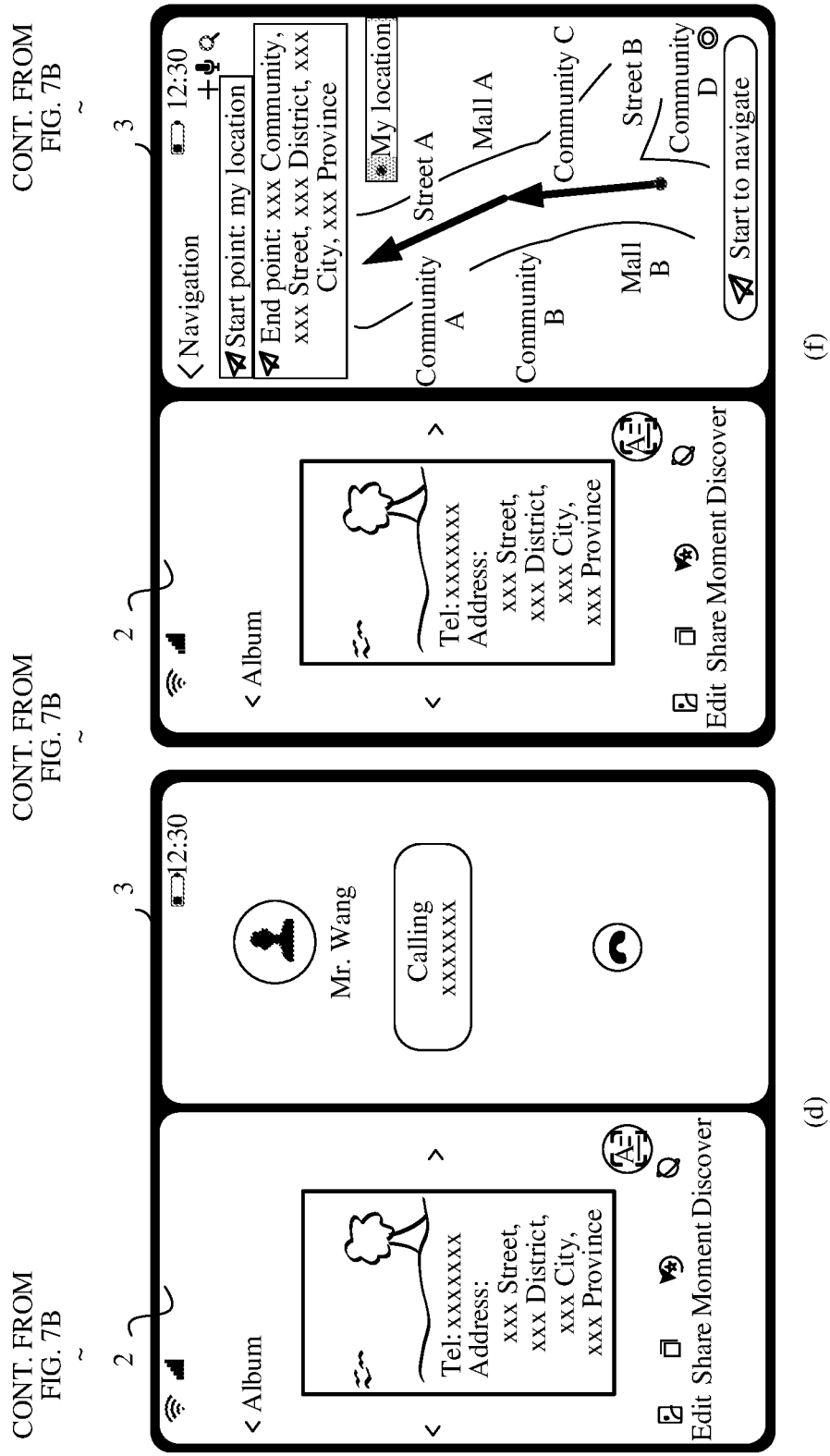

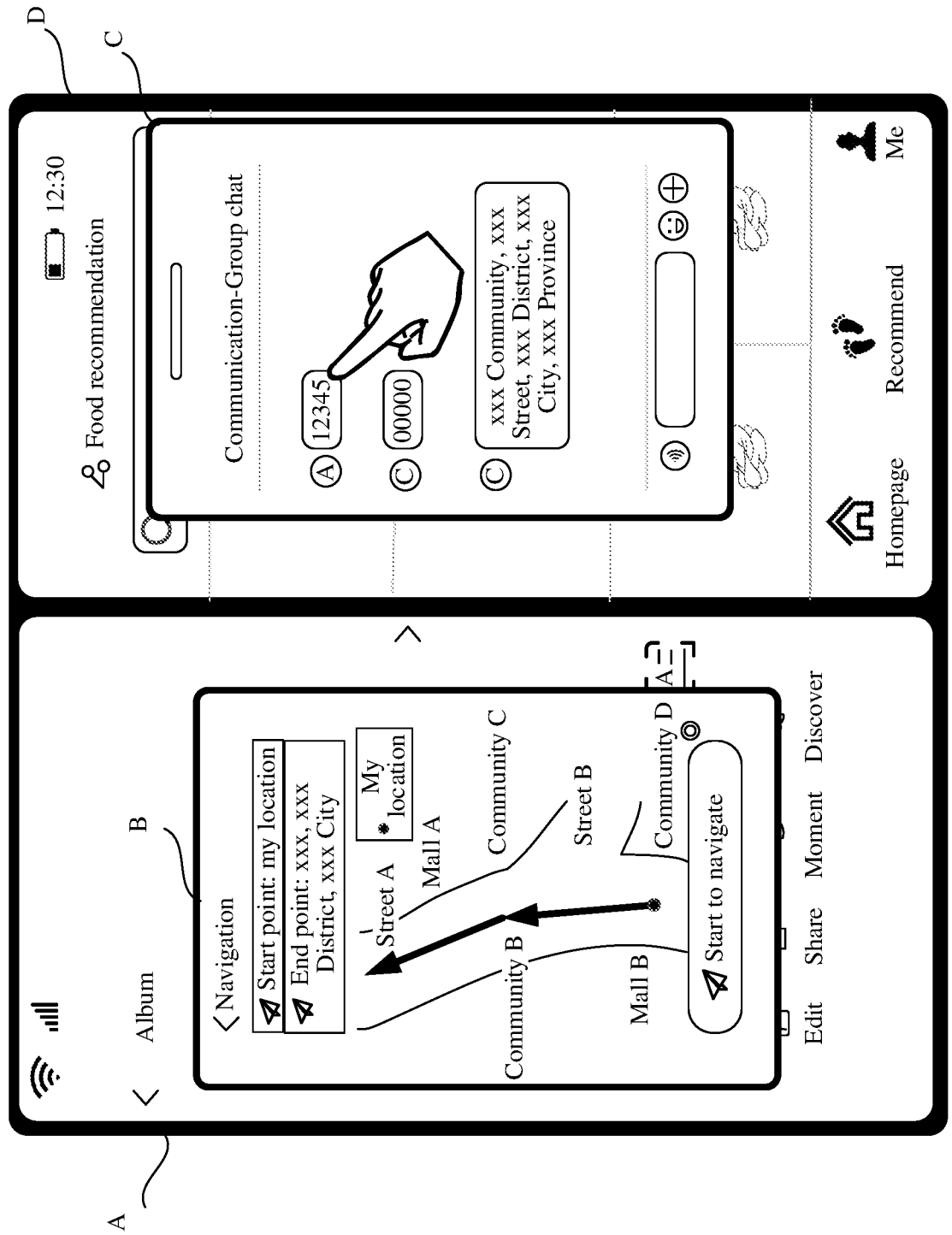
FIG. 11(a) ~ TO FIG. 11(b)

(a) Enabling of split-screen display may be prompted in a case that two APPs are frequently switched (c) Enabling of floating-window display may be prompted in a case that two APPs are frequently switched Enable split-screen display ⇒ TO FIG. 14B Enable floating-window display ⇒ TO FIG. 14B (b)

(a)            (b)

Folded state
When frequently switching interfaces of two APPs, an outer screen
may be prompted to be unfolded for split-screen display A foldable screen unfolds

TO FIG. 17B (c)

Folded state
When receiving a new message while displaying an interface 1, an outer screen may be prompted to be unfolded for split-screen display A foldable screen unfolds

TO FIG. 19B

APPLICATION INTERFACE DISPLAY METHOD AND ELECTRONIC DEVICE

This application is a national stage of International Application No. PCT/CN2022/115556 filed on Aug. 29, 2022, which claims priority to Chinese Patent Application No. 202111471122.5, filed on Dec. 3, 2021. The disclosures of both the aforementioned applications are incorporated by reference in their entireties.

TECHNICAL FIELD

This application relates to the field of communication technologies, and in particular, to an application interface display method and an electronic device.

BACKGROUND

With the continuous development of electronic devices and screen technologies, more electronic devices including a display screen have been applied to people's daily life and work, and the display screen of the electronic device becomes larger in size, which may provide users with richer information and better user experience.

Currently, an electronic device such as a foldable display device, a tablet computer, and the like including a larger display screen is used by the user, and the electronic device usually has a split-screen function. However, the user may not know how and when to use the split-screen function, affecting the user experience.

SUMMARY

This application provides an application interface display method and an electronic device, to resolve a problem that an electronic device with a larger display screen is not convenient to apply a split-screen function.

According to a first aspect, this application provides an application interface display method, the method including:
  displaying, by an electronic device, an interface of a first application on a display screen;
  receiving, by the electronic device, a first operation performed by a user on a target object in the interface of the first application;
  displaying, by the electronic device, a second application identifier on the display screen in response to the first operation, a second application corresponding to the second application identifier being an application recommended based on the target object;
  receiving, by the electronic device, a second operation performed by the user on the second application identifier; and
  simultaneously displaying, by the electronic device, the interface of the first application and an interface of the second application on the display screen in response to the second operation.

By using the solution of this application, according to an operation (for example, selection or copy) performed by the user on an object (for example, text or a picture) displayed on a current interface, a related application may be recommended, based on the target object, to the user for selection. When selecting a recommended application, the user may trigger simultaneous display (for example, split-screen display or floating-window display) of the current interface and an interface of the recommended application. In this application, a split-screen requirement may be determined according to a scenario behavior of the user, and then a recommended application and an intelligent split-screen service may be actively provided in a targeted manner, to achieve more efficient task parallel experience, thereby improving user experience.

In some possible implementations, the simultaneously displaying, by the electronic device, the interface of the first application and an interface of the second application on the display screen in response to the second operation includes:
  displaying, by the electronic device in response to the second operation, the interface of the first application and the interface of the second application on the display screen in a split-screen manner in a case that both the first application and the second application support split-screen display.

By using the foregoing solutions, for an application that supports split-screen display, after the user selects the recommended application, the electronic device may preferentially display the current interface and the interface of the recommended application in a split-screen manner, thereby improving a display effect and facilitating the user in viewing.

In some possible implementations, the simultaneously displaying, by the electronic device, the interface of the first application and an interface of the second application on the display screen in response to the second operation includes:
  displaying, by the electronic device in response to the second operation, the interface of the second application on the interface of the first application in a form of a floating window in a case that the first application and/or the second application does not support split-screen display, and the second application supports floating-window display.

By using the foregoing solutions, for an application that does not support split-screen display but supports floating-window display, after the user selects the recommended application, the electronic device may display an interface of an application selected by the user on the current interface in a form of a floating window, thereby improving the display effect and facilitating the user in viewing.

In some possible implementations, the simultaneously displaying, by the electronic device, the interface of the first application and an interface of the second application on the display screen in response to the second operation includes:
  in response to the second operation and in a case that the first application and/or the second application does not support split-screen display, and the first application supports floating-window display, displaying, by the electronic device, the interface of the second application on the display screen in a full-screen manner and displaying the interface of the first application on the interface of the second application in a form of a floating window.

By using the foregoing solutions, for an application that does not support split-screen display but supports floating-window display, after the user selects the recommended application, the electronic device may display the interface of the application selected by the user in a full-screen manner and display the current display interface in the form of a floating window, thereby improving the display effect and facilitating the user in viewing.

In some possible implementations, after the receiving, by the electronic device, a second operation performed by the user on the second application identifier, the method further includes:
  displaying, by the electronic device in response to the second operation, the interface of the second application on the display screen in a full-screen manner in a case that the first application and/or the second application does not support split-screen display, and both the first application and the second application do not support floating-window display.

By using the foregoing solutions, for an application that does not support split-screen display and floating-window display, after the user selects the recommended application, the electronic device may display the interface of the application selected by the user in the full-screen manner, thereby facilitating the user in viewing.

According to the solutions of this application, different window forms may be recommended according to a current state of the user and a recommended service, thereby improving the user experience.

In some possible implementations, the target object may be text or a picture, or certainly may be content in another form.

In some possible implementations, the first operation is a selection or copy operation on the target object in a case that the target object is text; or the first operation includes a text recognition operation on the target object and a selection or copy operation on text content of a text recognition result in a case that the target object is a picture.

In some possible implementations, the displaying, by an electronic device, an interface of a first application on a display screen includes:
 displaying, by the electronic device, the interface of the first application on the display screen in a full-screen or split-screen manner; or
 displaying, by the electronic device, the interface of the first application and an interface of a third application on the display screen in a split-screen manner.

In some possible implementations, in a case that the electronic device displays a first sub-interface and a second sub-interface of the first application on the display screen in a split-screen manner, the first operation is an operation performed by the user on the target object in the first sub-interface; and
 the simultaneously displaying, by the electronic device, the interface of the first application and an interface of the second application on the display screen includes:
  displaying, by the electronic device, the first sub-interface and the interface of the second application in a split-screen manner in a case that the second application supports split-screen display; and
  displaying, by the electronic device, the second sub-interface in a form of a floating ball or hiding the second sub-interface.

By using the foregoing solutions, in a split-screen display scenario, in a case that the user selects the recommended application, the interface of the application selected by the user may replace an application interface of one of split-screen windows, and the replaced application interface may be displayed in a form of a floating ball, thereby improving the display effect and facilitating the user in viewing.

In some possible implementations, in a case that the electronic device displays a first sub-interface and a second sub-interface of the first application on the display screen in a split-screen manner, the first operation is an operation performed by the user on the target object in the first sub-interface; and
 the simultaneously displaying, by the electronic device, the interface of the first application and an interface of the second application on the display screen includes:
  in a case that the second application does not support split-screen display but supports floating-window floating-window display, maintaining, by the electronic device display of the first sub-interface and the second sub-interface of the first application in a split-screen manner, and displaying the interface of the second application on the second sub-interface in the form of a floating window.

By using the foregoing solutions, in the split-screen display scenario, in a case that the user selects the recommended application, the interface of the application selected by the user may be displayed on split-screen windows in a form of a floating ball, thereby improving the display effect and facilitating the user in viewing.

In some possible implementations, in a case that the electronic device displays the interface of the first application and the interface of the third application in a split-screen manner, the simultaneously displaying, by the electronic device, the interface of the first application and an interface of the second application on the display screen includes:
 displaying, by the electronic device, the interface of the first application and the interface of the second application in a split-screen manner in a case that the second application supports split-screen display; and
 displaying, by the electronic device, the interface of the third application in a form of a floating ball or hiding the interface of the third application.

By using the foregoing solutions, in a split-screen display scenario, in a case that the user selects the recommended application, the interface of the application selected by the user may replace an application interface of one of split-screen windows, and the replaced application interface may be displayed in a form of a floating ball, thereby improving the display effect and facilitating the user in viewing.

In some possible implementations, in a case that the electronic device displays the interface of the first application and the interface of the third application in a split-screen manner, the simultaneously displaying, by the electronic device, the interface of the first application and an interface of the second application on the display screen includes:
 in a case that the second application does not support split-screen display but supports floating-window floating-window display, maintaining, by the electronic device display of the interface of the first application and the interface of the third application in a split-screen manner, and displaying the interface of the second application on the interface of the third application in the form of a floating window.

By using the foregoing solutions, in the split-screen display scenario, in a case that the user selects the recommended application, the interface of the application selected by the user may be displayed on split-screen windows in a form of a floating ball, thereby improving the display effect and facilitating the user in viewing.

In some possible implementations, the second application identifier includes at least one of the following: an icon, text, a preview, or a thumbnail. Certainly, an application identifier in another form may also be included.

In some possible implementations, the second application identifier includes a pull-down control. The method further includes:
 displaying, by the electronic device, a recommended menu bar in a case that the electronic device receives an operation performed by the user on the pull-down control, the recommended menu bar including the second application identifier and a fourth application identifier, and a fourth application corresponding to the fourth application identifier being an application recommended based on the target object; and
 simultaneously displaying, by the electronic device, the interface of the first application and an interface of the fourth application on the display screen in a case that the electronic device receives an operation performed by the user on the fourth application identifier.

By using the foregoing solutions, according to an operation (for example, selection or copy) by the user on an object (for example, text or a picture) displayed on a current interface, a plurality of related applications may be recommended, based on the target object, to the user for selection, thereby facilitating the user in viewing.

According to a second aspect, this application provides an application interface display method, the method including:

displaying, by an electronic device, an interface of a first application through an outer screen of a foldable screen in a case that the foldable screen of the electronic device is in a folded state;

displaying, by the electronic device, split-screen prompt information through the outer screen in a case that the first application and a second application meet a preset condition, the split-screen prompt information being used for prompting that split-screen display is capable of being triggered by unfolding the foldable screen; and displaying, by the electronic device, the interface of the first application and an interface of the second application through an inner screen of the foldable screen in a split-screen manner in a case that the electronic device receives an operation of unfolding the foldable screen by a user.

By using the solution of this application, whether there is a split-screen requirement may be determined according to a scenario behavior of the user, and an intelligent split-screen service may be actively provided in a targeted manner after it is determined that there is a split-screen requirement, thereby achieving more efficient task parallel experience.

In some possible implementations, the preset condition includes any one of the following:

a quantity of times of switching display between the first application and the second application within a preset duration is greater than or equal to a preset quantity of times; or the electronic device receives a new message notification from the second application when displaying the interface of the first application.

By using the foregoing solutions, in a case that the foldable screen is in the folded state, the split-screen requirement may be determined when it is detected that two applications are frequently switched within the preset duration or a new message notification is received, to prompt the user that split-screen display is capable of being triggered by unfolding the foldable screen, thereby actively providing the intelligent split-screen service in a targeted manner, and achieving more efficient task parallel experience.

In some possible implementations, the method further includes:

displaying, by the electronic device, floating-window prompt information through the outer screen in a case that the preset condition is met, the floating-window prompt information being used for prompting that display of a floating window is capable of being triggered by unfolding the foldable screen; and in a case that the electronic device receives the operation of unfolding the foldable screen by the user, displaying, by the electronic device, the interface of the first application through the inner screen of the foldable screen in a full-screen manner, and displaying, the interface of the second application in a form of a floating window.

By using the solution of this application, the actively providing the intelligent split-screen service to the user in a targeted manner may display interfaces of two applications in a split-screen manner, or simultaneously display the interfaces of the two applications in a form of a floating window, thereby improving the display effect and facilitating the user in viewing.

In some possible implementations, the method further includes:

in a case that the electronic device receives the operation of unfolding the foldable screen by the user, switching, by the electronic device, the inner screen to a screen-on state, and switching the outer screen to a screen-off state.

By using the solution of this application, in a case that full-screen display on the outer screen is switched to split-screen display on the inner screen, the outer screen may be screen-off while the inner screen is screen-on, thereby saving power consumption.

In some possible implementations, the method further includes:

in a case that the foldable screen is in an unfolded state, and the electronic device receives an operation of folding the foldable screen by the user, switching, by the electronic device, the outer screen to a screen-on state, and switching the inner screen to a screen-off state; and continuing, by the electronic device, to display the interface of the first application through the outer screen.

By using the solution of this application, in a scenario in which the user triggers to switch from split-screen display on the inner screen to full-screen display on the outer screen, the inner screen may be screen-off while the outer screen is screen-on, thereby saving power consumption.

According to a third aspect, this application provides an application interface display apparatus. The apparatus includes units configured to perform the method according to the first aspect. The apparatus may correspondingly perform the method described in the first aspect. For relevant description of the units in the apparatus, reference may be made to the description of the first aspect. For brevity, details are not described herein again.

The method according to the first aspect may be implemented by hardware or may be implemented by hardware executing corresponding software. The hardware or the software includes one or more modules or units corresponding to the function. for example, a processing module or unit, a display module or unit, and the like.

According to a fourth aspect, this application provides an electronic device including a processor, where the processor is coupled to a memory, the memory being configured to store a computer program or instructions, and the processor is configured to execute the computer program or instructions stored in the memory, to cause the method according to the first aspect to be performed.

For example, the processor is configured to execute the computer program or instructions stored in the memory, to cause the apparatus to perform the method according to the first aspect.

According to a fifth aspect, this application provides a computer-readable storage medium storing a computer program (which may also be referred to as instructions or code) configured to implement the method according to the first aspect.

For example, the computer program, when executed by a computer, causes the computer to perform the method according to the first aspect.

According to a sixth aspect, this application provides a chip, including a processor. The processor is configured to read and execute a computer program stored in a memory, to perform the method according to the first aspect and any possible implementation thereof.

Optionally, the chip further includes a memory, where the memory is connected to the processor through a circuit or a wire.

According to a seventh aspect, this application provides a chip system, including a processor. The processor is configured to read and execute a computer program stored in a memory, to perform the method according to the first aspect and any possible implementation thereof.

Optionally, the chip system further includes a memory, where the memory is connected to the processor through a circuit or a wire.

According to an eighth aspect, this application provides a computer program product. The computer program product includes a computer program (also referred to as an instruction or a code), and the computer program, when executed by a computer, causes the computer to implement the method according to the first aspect.

It may be understood that, for beneficial effects of the third aspect to the eighth aspect, reference may be made to the relevant description in the first aspect and the second aspect, and details are not described herein again.

BRIEF DESCRIPTION OF DRAWINGS

FIG. 7A to FIG. 7C are a schematic diagram of a user interface to which an application interface display method is applicable according to an embodiment of this application.

FIG. 11(a) to FIG. 11(c) are a schematic diagram of a user interface to which an application interface display method is applicable according to an embodiment of this application.

DESCRIPTION OF EMBODIMENTS

Figure 1:
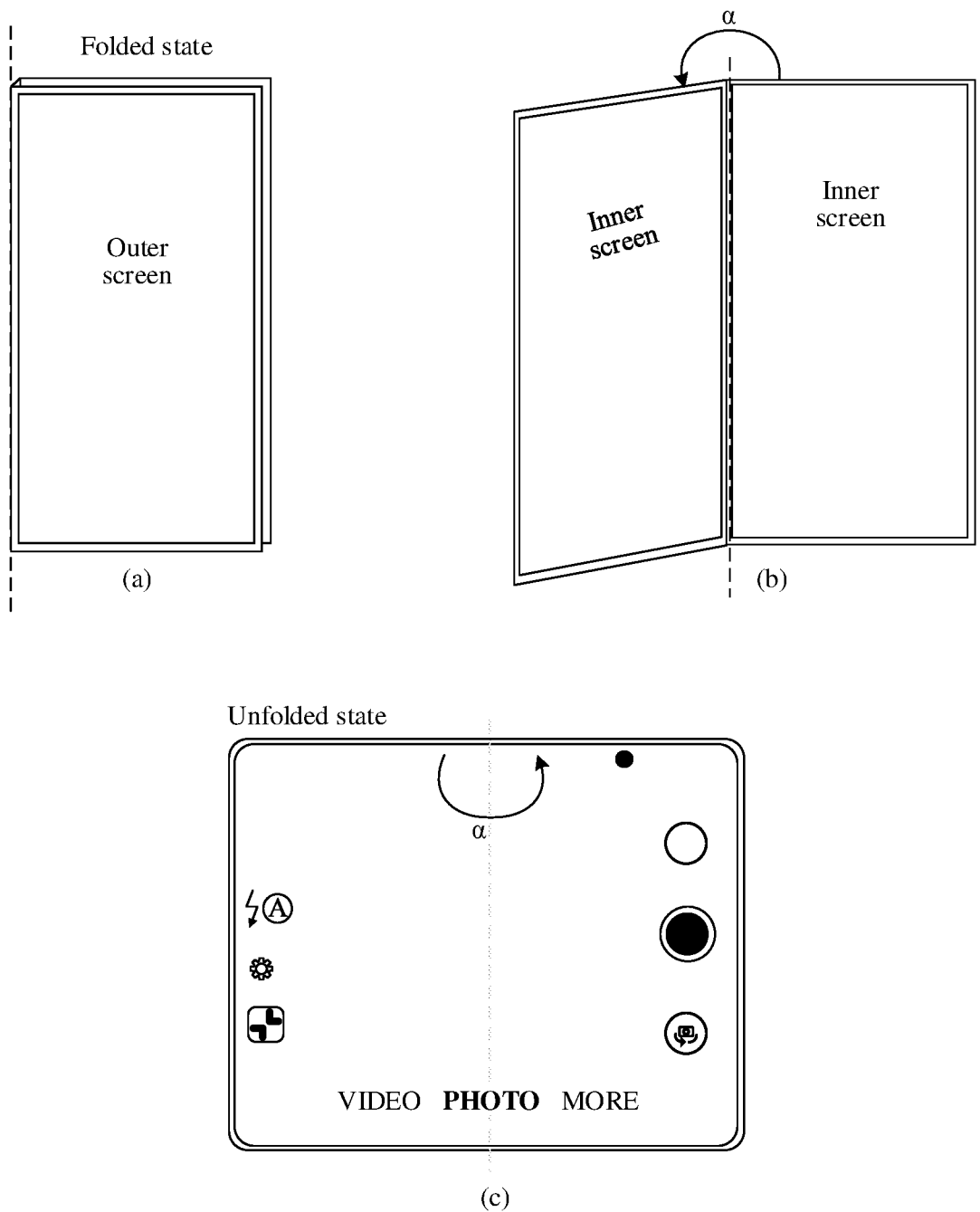
FIG. 1 is a schematic diagram of a form of a foldable screen of an electronic device according to an embodiment of this application.

In order to make objectives, technical solutions, and advantages of embodiments of this application clearer, the technical solutions in the embodiments of this application will be clearly and completely described below with reference to the accompanying drawings in the embodiments of this application. Apparently, the embodiments to be described are only a part rather than all of the embodiments of this application. All other embodiments obtained by a person of ordinary skill in the art based on the embodiments of this application without creative efforts shall fall within the protection scope of this application.

The term "and/or" used herein describes only an association relationship for describing associated objects and represents that three relationships may exist. For example, A and/or B may represent the following three cases: Only A exists, both A and B exist, and only B exists. The symbol "/" in this specification represents an "or" relationship between associated objects. For example, "A/B" means A or B.

In the specification and claims in the embodiments of this application, the terms such as "first" and "second" are intended to distinguish between different objects, but do not indicate a particular order of the objects. For example, a first APP and a second APP are used to distinguish between different APPs, but are not intended to indicate a particular order of the APPs.

In the embodiments of this application, the term such as "exemplarily" or "for example" is used to represent giving an example, an illustration, or a description. Any embodiment or design solution described as an "exemplarily" or "for example" in the embodiments of this application should not be explained as being more preferred or having more advantages than another embodiment or design solution. Exactly, the term such as "exemplarily" or "for example" is intended to present a related concept in a specific manner.

In the description of the embodiments of this application, unless otherwise stated, "a plurality of" means two or more. For example, "a plurality of processing units" means two or more processing units. "A plurality of elements" means two or more elements.

Currently, an electronic device such as a foldable display device, a tablet computer, and the like including a larger display screen is used by the user, and the electronic device usually has a split-screen function. However, the user may not know how and when to use the split-screen function, affecting the user experience. In view of this, according to the embodiments of this application, whether there is a split-screen requirement may be determined according to a scenario behavior of the user, and an intelligent split-screen service may be actively provided in a targeted manner after it is determined that there is a split-screen requirement, thereby achieving more efficient task parallel experience. In addition, in the solutions of this application, different window forms may be recommended according to a current state of the user and a recommended service, thereby improving the user experience.

An embodiment of this application provides an application interface display method. The method may be applied to an electronic device including a foldable screen, or may be applied to an electronic device including a conventional display screen, the conventional display screen being a display screen not supporting folding a screen.

For ease of description, the application interface display method provided in this embodiment of this application is exemplarily described by using the electronic device including a foldable screen as an example. A product form of the foldable screen may be first described in detail, to better understand the application interface display method provided in this embodiment of this application.

FIG. 1 is a schematic diagram of a product form of an electronic device including a foldable screen according to an embodiment of this application. The electronic device in this embodiment of this application includes a foldable screen. The foldable screen may be unfolded or folded along a folding axis, so that different display regions may be displayed in different states.

(a) of FIG. 1 is a schematic diagram of a form of an electronic device in a folded state. As shown in FIG. 1, an electronic device 1 may be unfolded along a folding axis (as shown by a dashed line in the figure). (b) of FIG. 1 is a schematic diagram of a form of an electronic device in an unfolded state, and (c) of FIG. 1 is a schematic diagram of an electronic device in a fully unfolded state.

It is to be noted that, an angle α between two screens of the foldable screen may be in a range of [0°, 180°]. Exemplarily, in this embodiment of this application, the electronic device is in a folded state (or referred to as a bar-type state) in a case that the angle α is 0°. The electronic device is an unfolded state in a case that the angle α is 1800.

The application interface display method provided in this embodiment of this application is exemplarily described below in this application by using a scenario in which the foldable screen of the electronic device is in an unfolded state or a scenario in which the foldable screen of the electronic device is in a folded state as an example.

In some embodiments, in a case that the electronic device is in an unfolded state, an inner screen of the electronic device may display a desktop interface or interfaces of one or more APPs in the electronic device in a screen-on state for the user to use. In this case, in a case that the inner screen of the electronic device meets a preset split-screen condition (for example, the electronic device receives an operation of selecting text or a picture by the user) during full-screen display and split-screen display, the electronic device may display on the inner screen in a split-screen manner or change a split-screen combination, to prompt the user that split-screen display of the foldable screen of the electronic device may be triggered by performing an operation on a split-screen control.

In some embodiments, in a case that the electronic device is in an unfolded state, an inner screen of the electronic device may display a desktop interface or interfaces of one or more APPs in the electronic device in a screen-on state for the user to use. In this case, the electronic device may display the split-screen control on the inner screen in a case that the inner screen of the electronic device meets a preset split-screen condition (for example, the electronic device detects that two APPs are frequently switched) during full-screen display, to prompt the user that split-screen display of the inner screen of the electronic device may be triggered by performing an operation on the split-screen control.

In some embodiments, in a case that the electronic device is in an unfolded state, the outer screen of the electronic device may display a desktop interface or interfaces of one or more APPs in the electronic device in a screen-on state for the user to use. In a case that the outer screen of the electronic device meets a preset split-screen condition (for example, the electronic device receives a short message, or the electronic device detects that two APPs are frequently switched) during display in a screen-on state, the electronic device may prompt the user to unfold the foldable screen of the electronic device, to achieve split-screen display through the inner screen of the electronic device.

A preset split-screen condition in a case that the electronic device is in an unfolded state is different from a preset split-screen condition in a case that the electronic device is in a folded state. The preset split-screen condition in a case that the electronic device is in an unfolded state and the preset split-screen condition in a case that the electronic device is in a folded state are described in detail below.

In some embodiments, the foldable screen of the electronic device may be a flexible foldable screen. The flexible foldable screen includes a folding edge made of a flexible material. The flexible foldable screen is partially or entirely made of a flexible material. Two screens formed by folding the flexible foldable screen are integrally formed into a complete screen, and the two screens may be two display regions.

In some embodiments, the foldable screen of the electronic device may be a multi-screen foldable screen. The multi-screen foldable screen may include multiple (two or more) screens. The multiple screens may be a plurality of separate display screens. The multiple screens may be sequentially connected through a folding axis. Each screen is rotatable around the folding axis connected, to fold the multi-screen foldable screen.

It is to be noted that, the foldable screen in this embodiment of this application is described by using an example in which the foldable screen is a flexible foldable screen. In addition, the application interface display method provided in this embodiment of this application may be described in subsequent embodiments of this application also by using an example the foldable screen is a flexible foldable screen.

An execution entity of the application interface display method provided in the embodiments of this application may be the electronic device mentioned above, or may be functional modules and/or functional entities in the electronic device that can implement the capture control method based on a foldable screen. In addition, the solutions of this application can be implemented in a hardware and/or software manner. Details may be determined according to an actual use requirement, and this is not limited in the embodiments of this application. By using the electronic device as an example, the capture control method based on a foldable screen provided in the embodiments of this application is exemplarily described with reference to the accompanying drawings.

It is to be noted that, the application interface display method provided in this embodiment of this application may not only be applied to a foldable screen, but also be applied to an electronic device with a conventional display screen such as a mobile phone, a tablet computer, and the like. For ease of description, an exemplary description is made below by using an example in which the display screen is a foldable screen.

In this embodiment of this application, for the foldable screen, split-screen display of the display screen is supported in a case that the foldable screen is in an unfolded state, or split-screen display of the display screen may be triggered in a case that the foldable screen is in a folded state.

The application interface display method provided in this embodiment of this application is exemplarily described below separately by using a scenario (first embodiment) in which split-screen display of the display screen is triggered in a case that the foldable screen is in an unfolded state and a scenario (second embodiment) in which split-screen display of the display screen is triggered in a case that the foldable screen is in a folded state as examples.

First Embodiment

Figure 2:
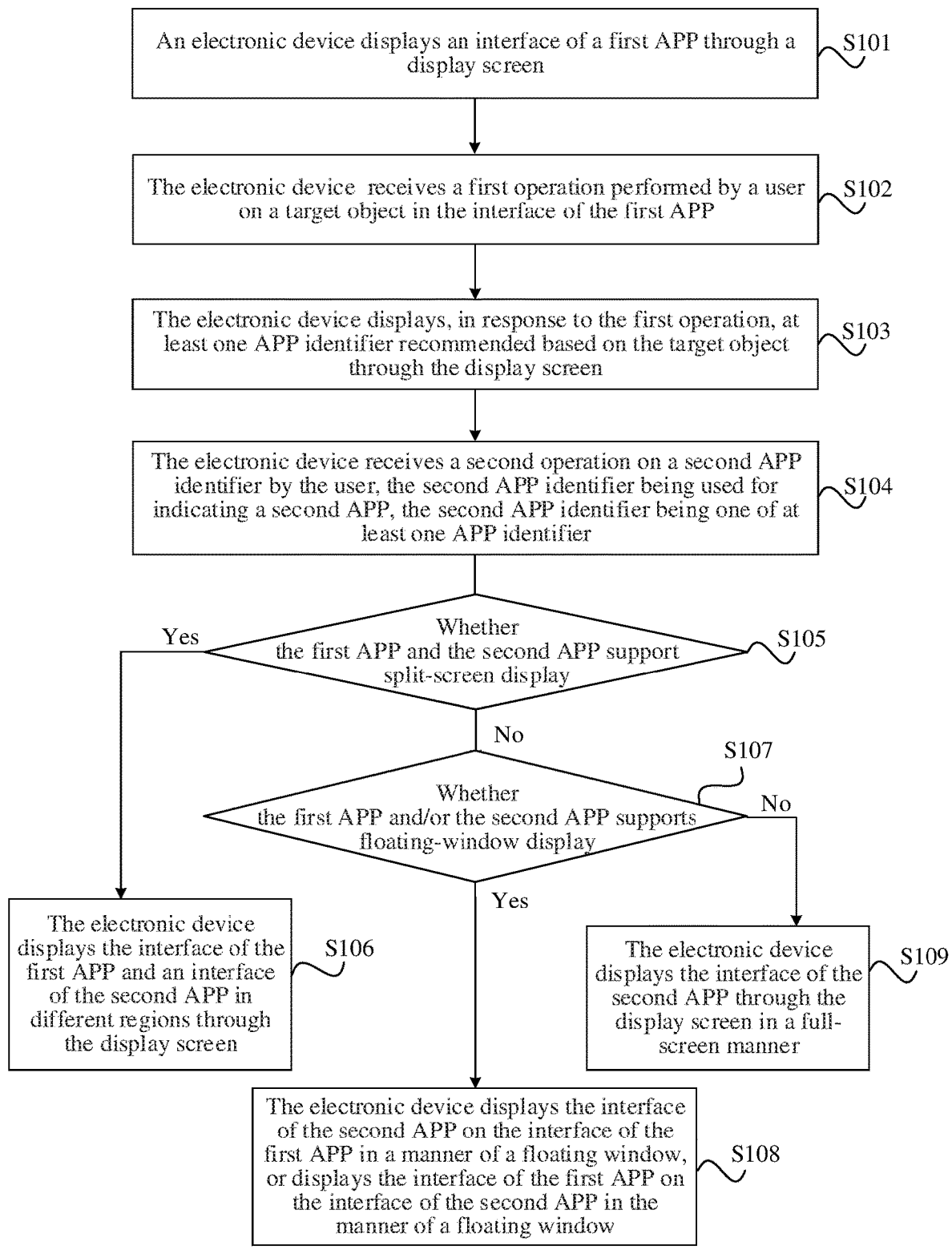
FIG. 2 is a schematic flowchart of an application interface display method according to an embodiment of this application.

FIG. 2 is a schematic flowchart of an application interface display method according to a first embodiment of this application. As shown in FIG. 2, the method includes steps S101 to S109.

S101. An electronic device displays an interface of a first APP through a display screen.

Optionally, the display screen of the electronic device may be a foldable screen, or may be a conventional display screen, i.e., a display screen that does not support folding a screen. Details may be determined according to an actual use requirement, and this is not limited in the embodiments of this application.

In this embodiment of this application, the display screen may support full-screen display and split-screen display. Optionally, the display screen may further support floating-window display.

In some embodiments, in a case that the foldable screen of the electronic device is in an unfolded state, the electronic device may display the interface of the first APP through the foldable screen, or the electronic device may display the interface of the first APP and an interface of another APP through the foldable screen.

Optionally, the interface of the first APP may be a desktop interface, or an interface of an APP running on the electronic device, or may be an interface of a mini program. Details may be determined according to an actual use requirement, and this is not limited in the embodiments of this application.

S102. The electronic device receives a first operation performed by a user on a target object in the interface of the first APP.

Optionally, the first operation may be a long-press operation (for example, a press operation whose press duration is longer than a certain duration) on the target object, or a click/tap operation (for example, single-clicking/tapping or double-clicking/taping) on the target object, or may be any other possible operation. Details may be determined according to an actual use requirement, and this is not limited in the embodiments of this application.

Optionally, the target object may be text or a picture, or may be any other object meeting an actual use requirement, which may be set according to an actual use requirement. This is not limited in the embodiments of this application.

Exemplarily, by using the target object as an example, the target object may be text representing an address, or a uniform resource locator (uniform resource locator, URL), or a phone number, or an Email address.

In another example, by using an example in which the target object is a picture, assuming that the picture includes text such as text representing an address, a URL, a phone number, or an Email address, when detecting an operation of selecting the picture by the user, the electronic device may perform text recognition on the picture by using a text recognition technology, to extract text on the picture.

S103. The electronic device displays, in response to the first operation and through the display screen, at least one APP identifier recommended based on the target object.

Optionally, the at least one APP identifier may be an APP icon, or text for describing the APP, or an interface thumbnail of the APP, or an interface preview window of the APP, or certainly may be an APP entry in any other possible form. Details may be determined according to an actual use requirement, and this is not limited in the embodiments of this application.

The at least one APP identifier may be displayed in a form of a list (for example, an application list) or in a form of a window. Alternatively, the at least one APP identifier may present a service preview card. It is to be noted that, APP access or support is required in this case.

Optionally, identifiers of all recommended APPs are displayed in the form of a list or window, or some identifiers of all the recommended APPs are displayed in the form of a list or window and other identifiers are hidden, where the hidden identifiers may be displayed after the user triggers the list or the window to be unfolded.

Optionally, the recommended at least one APP may be sequentially displayed in descending order of priorities. The priority of the APP may be determined according to a degree of association between the APP and an object selected by the user, a frequency or duration of using the APP by the user, or the like.

Exemplarily, a higher degree of association between the APP and the object selected by the user indicates a higher priority of the APP. For example, the object selected by the user is address information, the APP has a higher degree of association with the address information is a navigation APP, and therefore the navigation APP has a highest priority.

In another example, a higher frequency of using the APP by the user indicates a higher priority of the APP.

It may be understood that, the user performs an operation on a current display interface, so that a target object in the interface may be selected, and the electronic device is triggered to recommend an APP associated with the target object, thereby facilitating the user to quickly find an entry of a required APP.

S104. The electronic device receives a second operation on a second APP identifier by the user, the second APP identifier being used for indicating the second APP.

The second APP identifier is one of the at least one APP identifier.

Optionally, in some embodiments, an APP that supports split-screen display is preferentially displayed in a split-screen manner.

Optionally, in some embodiments, an APP that does not support split-screen display but supports floating-window display is preferentially opened in a form of a floating window.

Optionally, in some embodiments, an APP that does not support split-screen display and floating-window display is opened in a full-screen manner.

Application scenarios of split-screen display, floating-window display, and full-screen display are respectively described below from three branches.

S105. The electronic device determines whether the first APP and the second APP support split-screen display.

The following step S106 is performed in a case that the electronic device determines that both the first APP and the second APP support split-screen display. The following step S107 is performed in a case that the electronic device determines that any one of the first APP or the second APP does not support split-screen display.

S106. The electronic device displays the interface of the first APP and an interface of the second APP in different regions through the display screen.

From the perspective of the user, the interface of the first APP and the interface of the second APP may be simultaneously viewed from the display screen.

Optionally, the first APP and the second APP may be the same or different. the interface of the first APP and the interface of the second APP may be different interfaces of a same APP in a case that the first APP and the second APP are the same.

Optionally, in some embodiments, the electronic device may trigger split-screen display in a scenario of single-tasking full-screen display. Single-tasking full-screen display may be displaying an interface of a single APP in a foreground.

Exemplarily, in a case that the electronic device displays an interface of an application A in a full-screen manner and an identifier B of an application B that recommends split-screen display is displayed in the interface, the electronic device displays the interface of the application A and an interface of the application B when detecting an operation on the identifier of the application B by the user. Such a scenario may be simply represented as "A->A| B", that is, display of the application A in a full-screen manner is changed to display of the application A and application B in a split-screen manner.

A| B may represent a split-screen combination or a split-screen pair.

Optionally, in some embodiments, the electronic device may further trigger change of the split-screen combination in a scenario of single-tasking split-screen display. Single-tasking split-screen display may be displaying a main interface and a sub-interface of the single APP in the foreground.

Exemplarily, in a case that the electronic device displays two interfaces (for example, a main interface A and a sub-interface A1, where it is assumed that the identifier of the application B that recommends split-screen display is displayed in the sub-interface A1) of the application A in a split-screen manner, the electronic device displays the sub-interface A1 and the interface of the application B in a split-screen manner when detecting an operation on the identifier of the application B by the user. Such a scenario may be simply represented as "A|A1->A1|B", that is, a split-screen combination A|A1 is changed to a split-screen combination A1|B.

Optionally, in some embodiments, the electronic device may further trigger change of the split-screen combination in a scenario of multitasking split-screen display. Multitasking split-screen display may be displaying two sub-interfaces of an APP in the foreground or displaying respective interfaces of two APPs in the foreground.

Exemplarily, when displaying two sub-interfaces (for example, the sub-interface A1 and a sub-interface A2) of the application A in a split-screen manner, the electronic device may prompt or recommend the user to change the split-screen combination in a case that the electronic device detects that the sub-interface A1 and an application C are frequently switched in the foreground (where display of the sub-interface A2 is maintained in this case), to display the sub-interface A1 and an interface of the application C in a split-screen manner. Such a scenario may be simply represented as "A1|A2->A1|C", that is, a split-screen combination A1|A2 is changed to a split-screen combination A1| C.

In another example, when displaying the interface of the application A and the interface of the application B in a split-screen manner, the electronic device may prompt or recommend the user to change the split-screen combination in a case that the electronic device detects that the application A and the application C are frequently switched in the foreground (where display of the interface of the application B is maintained in this case), to display the interface of the application A and the interface of the application C in a split-screen manner. Such a scenario may be simply represented as "A1|B->A1|C", that is, a split-screen combination A1|A2 is changed to a split-screen combination A1|C.

It is to be noted that, the foregoing descriptions are exemplary, and there may be another scenario of recommending split-screen display or scenario of prompting to switch the split-screen combination. Details may be determined according to an actual use requirement, and this is not limited in the embodiments of this application.

S107. The electronic device determines whether the first APP and the second APP supports floating-window display.

In this embodiment of this application, after determining that any one of the first APP or the second APP does not support split-screen display, the electronic device continues to determine whether the first APP and the second APP supports floating-window display.

The following step S108 is performed in a case that the electronic device determines that the first APP and/or the second APP supports floating-window display. The following step S109 is performed in a case that the electronic device determines that both the first APP and the second APP do not support floating-window display.

S108. The electronic device displays the interface of the second APP on the interface of the first APP in a form of a floating window, or displays the interface of the first APP on the interface of the second APP in the form of a floating window.

In this embodiment of this application, the electronic device may simultaneously display the interface of the first APP and the interface of the second APP through a foldable screen, and an interface of one APP is displayed on an interface of the other APP in a form of a floating window. From the perspective of the user, the interface of the first APP and the interface of the second APP may be simultaneously viewed from the foldable screen.

According to an aspect, the electronic device displays the interface of the first APP on the interface of the second APP in a form of a floating window in a case that the electronic device determines that the first APP supports floating-window display but the second APP does not support floating-window display.

According to another aspect, the electronic device displays the interface of the second APP on the interface of the first APP in a form of a floating window in a case that the electronic device determines that the second APP supports floating-window display but the first APP does not support floating-window display.

According to still another aspect, the electronic device may display the interface of the second APP on the interface of the first APP in a form of a floating window by default in a case that the electronic device determines that both the first APP and the second APP support floating-window display.

Optionally, the floating window may support position movement. For example, the electronic device may correspondingly move a display position of the floating window on a second interface in response to a drag operation on the floating window by the user.

Optionally, in some embodiments, the electronic device may further trigger to create a new floating window or replace the floating window in a scenario of floating-window display.

Exemplarily, when displaying an interface C on a desktop in a floating window, in a case that the electronic device detects that the user selects or copies content in the interface C, the electronic device may prompt or recommend the user to open an interface A recommended based on the content in a floating window. Such a scenario may be simply represented as "desktop [C]->desktop [A] [C]", that is, the desktop is increased from one floating window [C] to two floating windows [A] [C].

In another example, when displaying an interface C (A [C]) on the interface A (which is a full-screen interface of the application A) in a floating window, in a case that the electronic device detects that the user selects or copies content in the interface C, the electronic device may prompt or recommend the user to open an interface B recommended based on the content in a floating window. Such a scenario may be simply represented as "A [C]->A [B] [C]", that is, a full-screen interface of the application A is increased from one floating window [C] to two floating windows [B][C].

In another example, when displaying the interface A and the interface B in a split-screen manner and displaying an interface C (A| B [C]) on the interface B in a floating window, in a case that the electronic device detects that the user selects or copies content in the interface A, the electronic device may prompt or recommend the user to open an interface D recommended based on the content in a floating window. Such a scenario may be simply represented as "A| B [C]->A [D] | B [C]", that is, floating windows may respectively exist on two interfaces displayed in a split-screen manner.

In still another example, when displaying the interface A and the interface B in a split-screen manner, displaying the interface D on the interface A in a floating window, and display an interface C (A [D] B [C]) on the interface B, in a case that the electronic device detects that the user selects or copies content in the interface B, the electronic device may prompt or recommend the user to open an interface E recommended based on the content in a floating window. Such a scenario may be simply represented as "A [D] B [C]->A [D] | B [E]", that is, the floating windows of the two interfaces displayed in a split-screen manner may be replaced according to requirements.

It is to be noted that, the foregoing descriptions are exemplary, and there may be another floating-window recommendation scenario or scenario of prompting to switch the floating-window. Details may be determined according to an actual use requirement, and this is not limited in the embodiments of this application.

S109. The electronic device displays a second interface through the display screen in a full-screen manner.

It may be understood that, in a case that the second APP does not support both split-screen display and floating-window display, the electronic device may display the interface of the second APP through a foldable screen in a full-screen manner, to present an interface of a required APP to the user in a full-screen manner. From the perspective of the user, the interface of the second APP may be viewed from the foldable screen, and the first APP exits and runs on a background in this case.

By using the solution of this application, the electronic device may determine an intention of the user according to content selected or copied by the user, for example, in a case that the user selects telephone information, it may be speculated that the user may intend to make a call. In another example, in a case that the user selects address information, it may be speculated that the user may intend to navigate to the address. Then, the electronic device may pop up an identifier (for example, an APP icon) of a recommended APP based on the content selected or copied by the user, after the user taps the identifier of the APP, the electronic device may display a current display interface and an interface of the APP in a split-screen manner, or display one of the current display interface or the interface of the APP in a form of a floating window, or display the interface of the APP in a full-screen manner.

A possible implementation of the application interface display method provided in the first embodiment is exemplarily described with reference to FIGS. 3(a) to 3(e) to FIGS. 5(a) to 5(d).

Figure 3A:
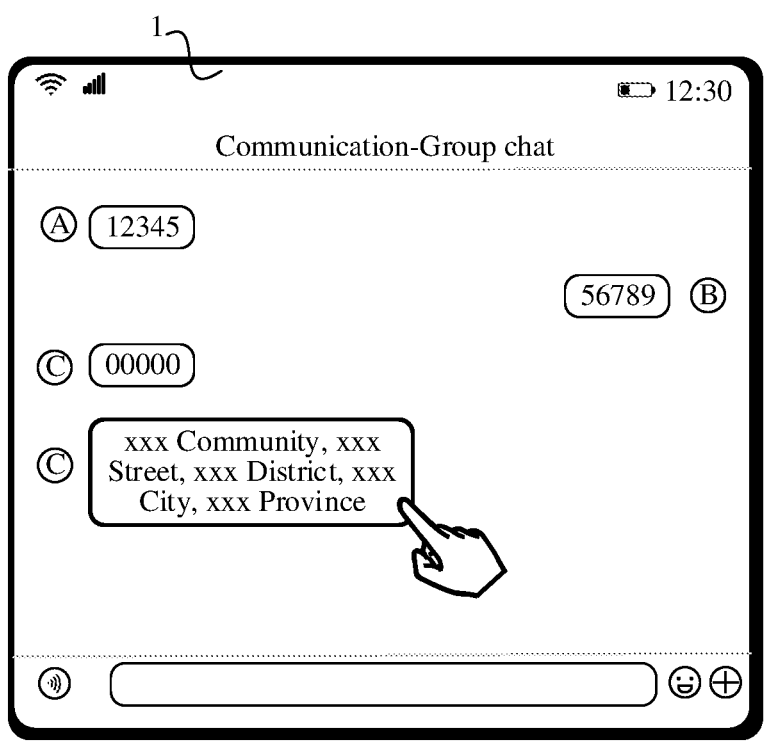
FIG. 3(a) to FIG. 3(e) are a schematic diagram of a user interface to which an application interface display method is applicable according to an embodiment of this application.
Figure 3B:
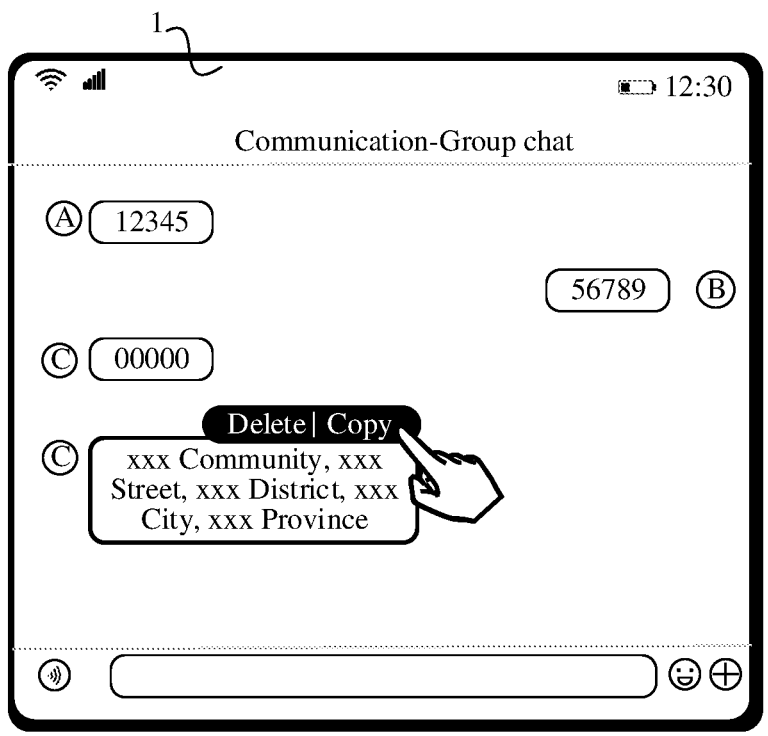
Figure 3C:
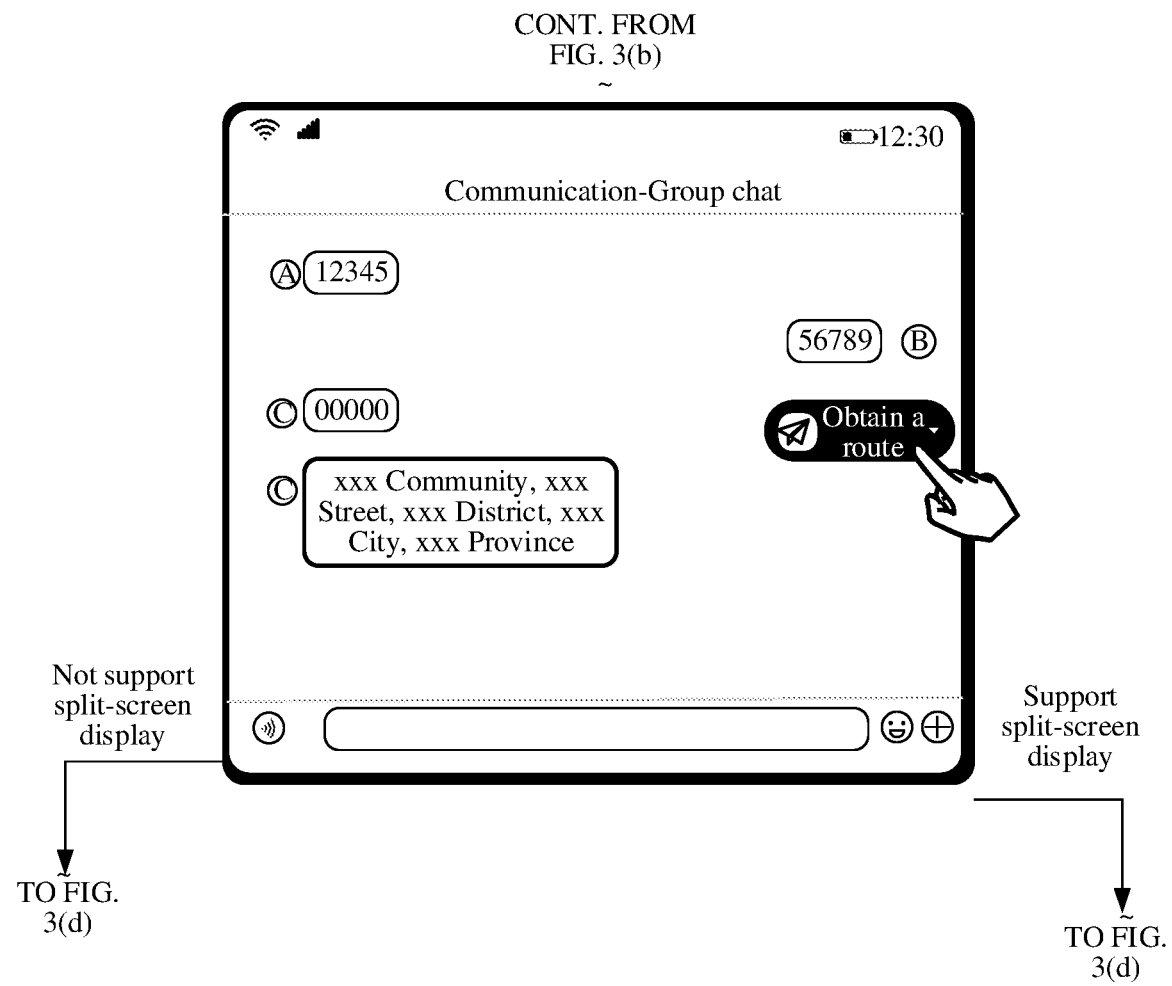

As shown in FIG. 3(a), the electronic device displays a chat interface of a messaging APP in a full-screen manner through a display screen 1. In a case that the user selects text or a picture (by using the address information as an example herein) on the chat interface of the messaging APP in a long-press manner, as shown in FIG. 3(b), the electronic device displays a copy control on the chat interface of the messaging APP. In a case that the user taps the copy control, as shown in FIG. 3(c), the electronic device displays a split-screen function recommendation window (for example, capsule-shaped) on the chat interface of the messaging APP, and the split-screen function recommendation window displays an icon or text (for example, "obtain a route") of a navigation APP that is recommended based on the address information selected by the user. Certainly, the split-screen function recommendation window may further display icons or text of other APPs associated with the address information selected by the user, or display some icons or text and hide other identifiers or text.

Figure 3D:
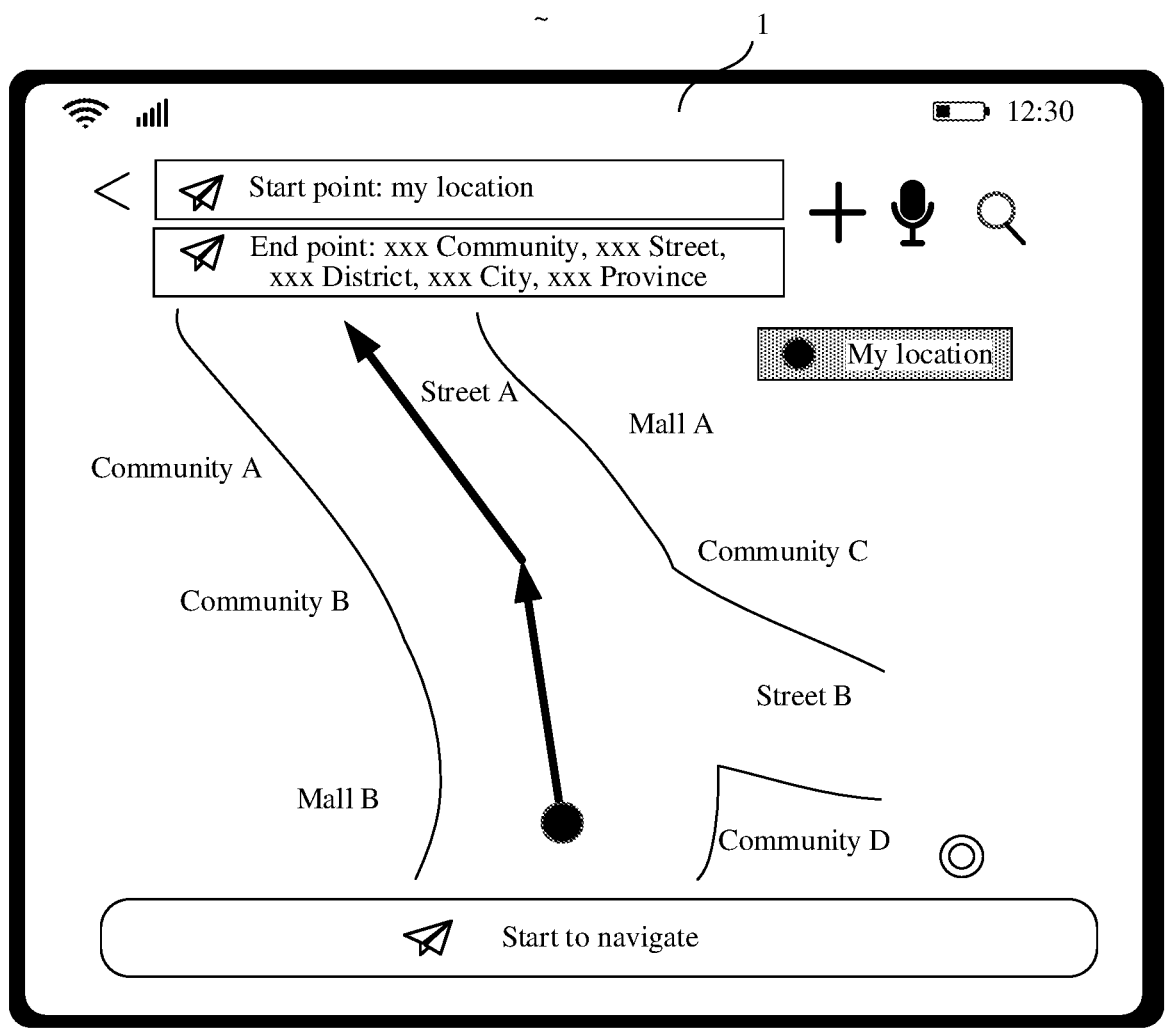

In some embodiments, when the user taps the icon of the navigation APP, as shown in FIG. 3(d), the electronic device may display an interface of the navigation APP in a full-screen manner in a case that any one of the messaging APP or the navigation APP does not support split-screen display, and the messaging APP exits and runs on the background in this case.

Figure 3E:
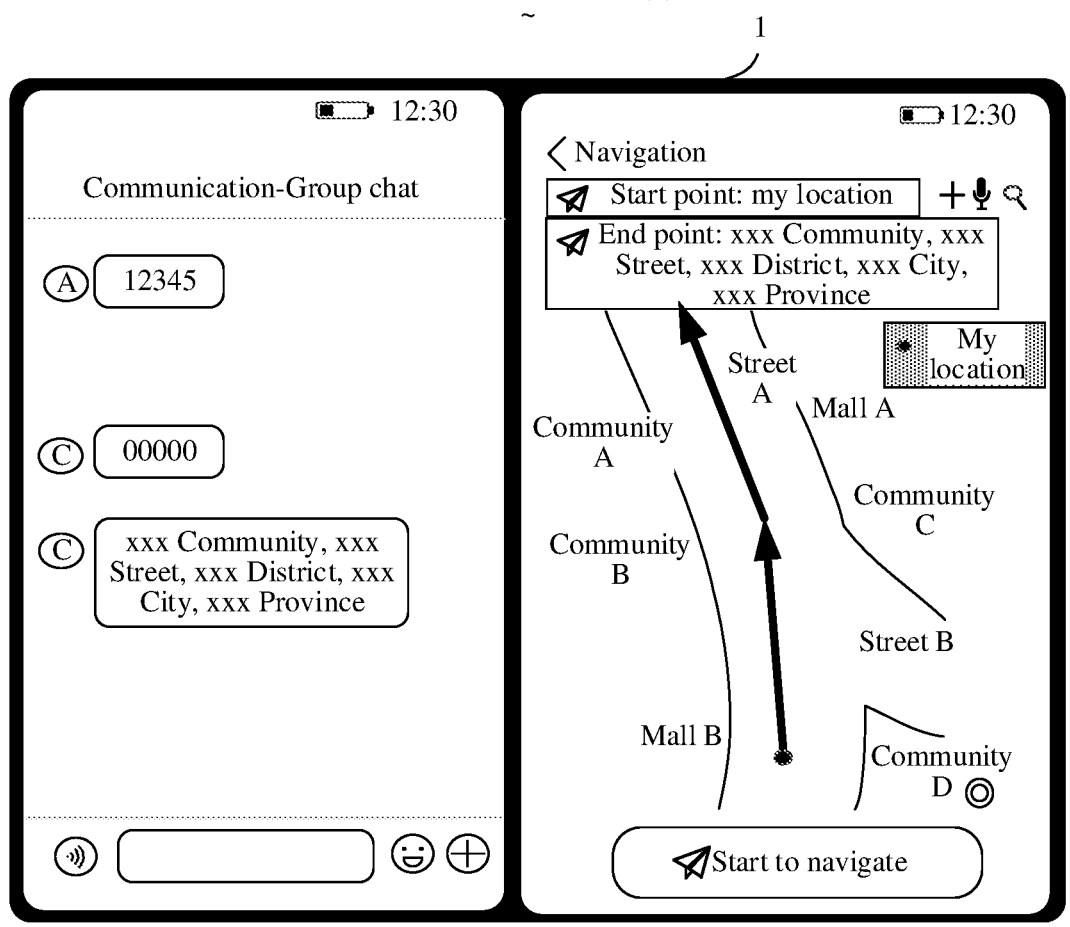

In some other embodiments, when the user taps the icon of the navigation APP, as shown in FIG. 3(e), the electronic device may display an interface of the messaging APP and the interface of the navigation APP in different regions (that is, in a split-screen manner) in a case that both the messaging APP and the navigation APP support split-screen display.

In this way, split-screen display of the display screen may be achieved based on a trigger operation on the display screen by the user.

It is to be noted that, FIG. 3(a) to FIG. 3(e) are illustrated by using an example the user triggers display of the split-screen function recommendation window after copying the address information. Certainly, a manner of triggering display of the split-screen function recommendation window is not limited thereto. For example, the user may trigger display of the split-screen function recommendation window by selecting the address information in a single-tap manner.

It is to be further noted that, FIG. 3(a) to FIG. 3(e) are illustrated by using an example in which split-screen display is triggered in a scenario of full-screen display, a case that change of a split-screen combination is further triggered in the scenario of full-screen display is described below by using FIGS. 4A and 4B and FIGS. 5(a) to 5(d).

Figures 4A, 4B:
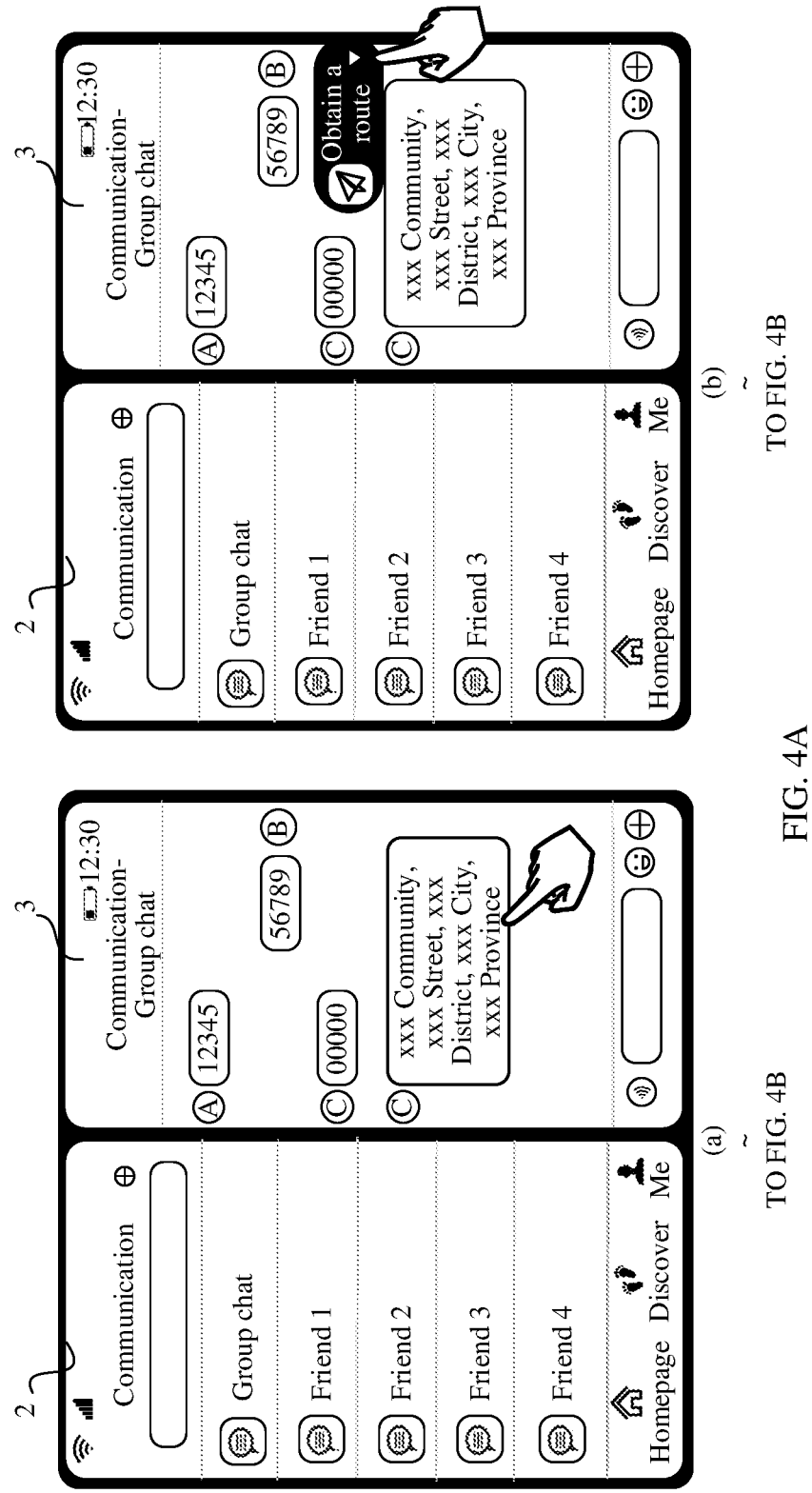
FIG. 4A and FIG. 4B are a schematic diagram of a user interface to which an application interface display method is applicable according to an embodiment of this application.

As shown in (a) of FIG. 4A, the electronic device displays two interfaces of an APP in different regions of the display screen (that is, in a split-screen manner), where a main interface of the messaging APP is displayed in one region (which is referred to as a region 2) of the display screen, and the chat interface of the messaging APP is displayed in the other region (which is referred to as a region 3) of the display screen.

In a case that the user selects text or a picture (still by using the address information as an example herein) on the chat interface of the messaging APP in a single-tap manner, as shown in (b) of FIG. 4A, the electronic device displays a split-screen function recommendation window (for example, capsule-shaped) on the chat interface of the messaging APP, and the split-screen function recommendation window displays an icon or text (for example, "obtain a route") of a navigation APP that is recommended based on the address information selected by the user. As shown in (b) of FIG. 4A, only the icon of the navigation APP is displayed. As shown in (c) of FIG. 4B, an expand button (a pull-down arrow on a recommendation window shown in (b) of FIG. 4A) is tapped and expanded on the window to display another recommended APP (for example, a food recommendation APP).

When the user taps an icon of the food recommendation APP, as shown in (d) of FIG. 4B, the electronic device may display the chat interface of the messaging APP and an interface of the food recommendation APP in a case that both the messaging APP and the food recommendation APP support split-screen display.

In this way, the display screen may change the split-screen combination based on a trigger operation on the display screen by the user, where the chat interface of the messaging APP is displayed in the region 2 of the display screen, and the interface of the food recommendation APP is displayed in the region 3 of the display screen.

Figure 5A:
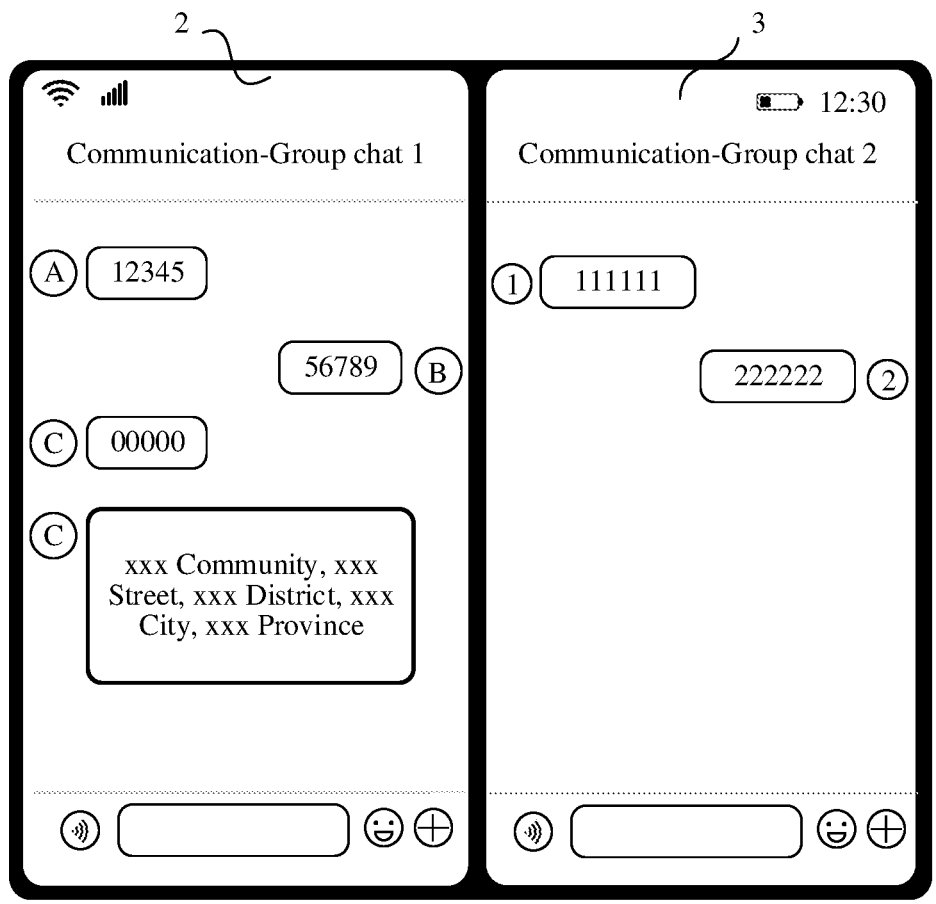
FIG. 5(a) to FIG. 5(d) are a schematic diagram of a user interface to which an application interface display method is applicable according to an embodiment of this application.
Figure 5B:
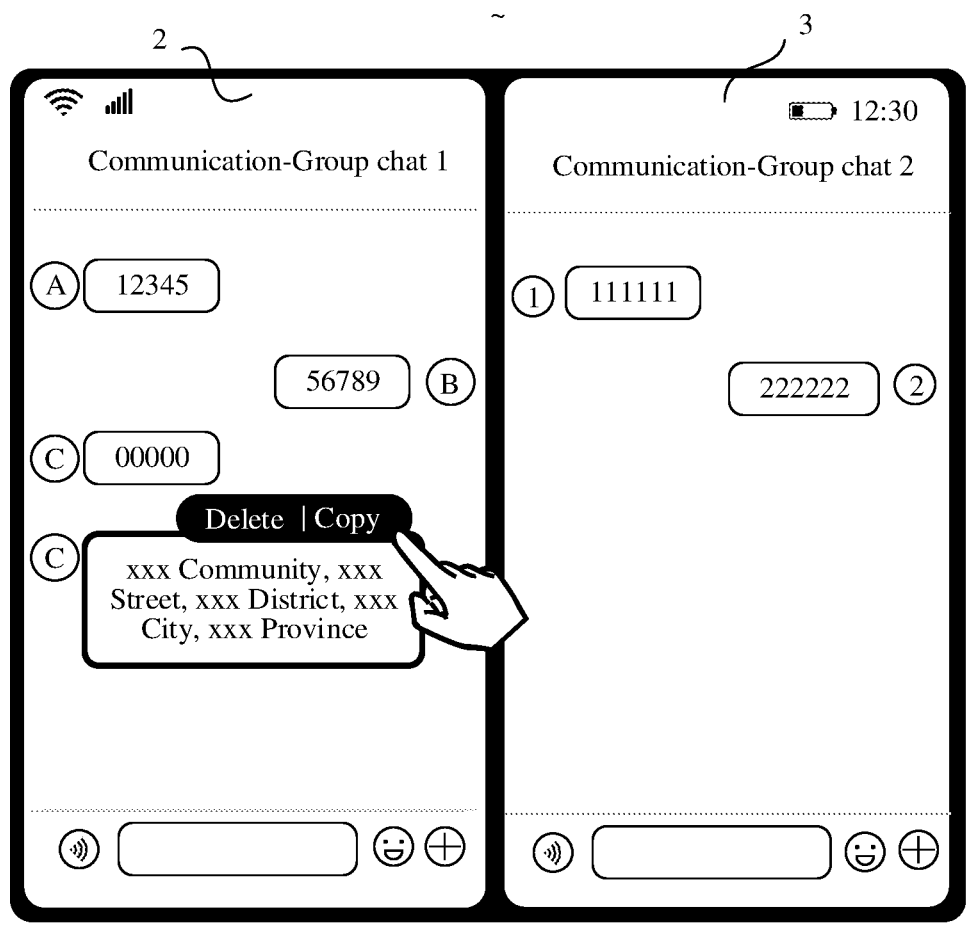
Figure 5C:
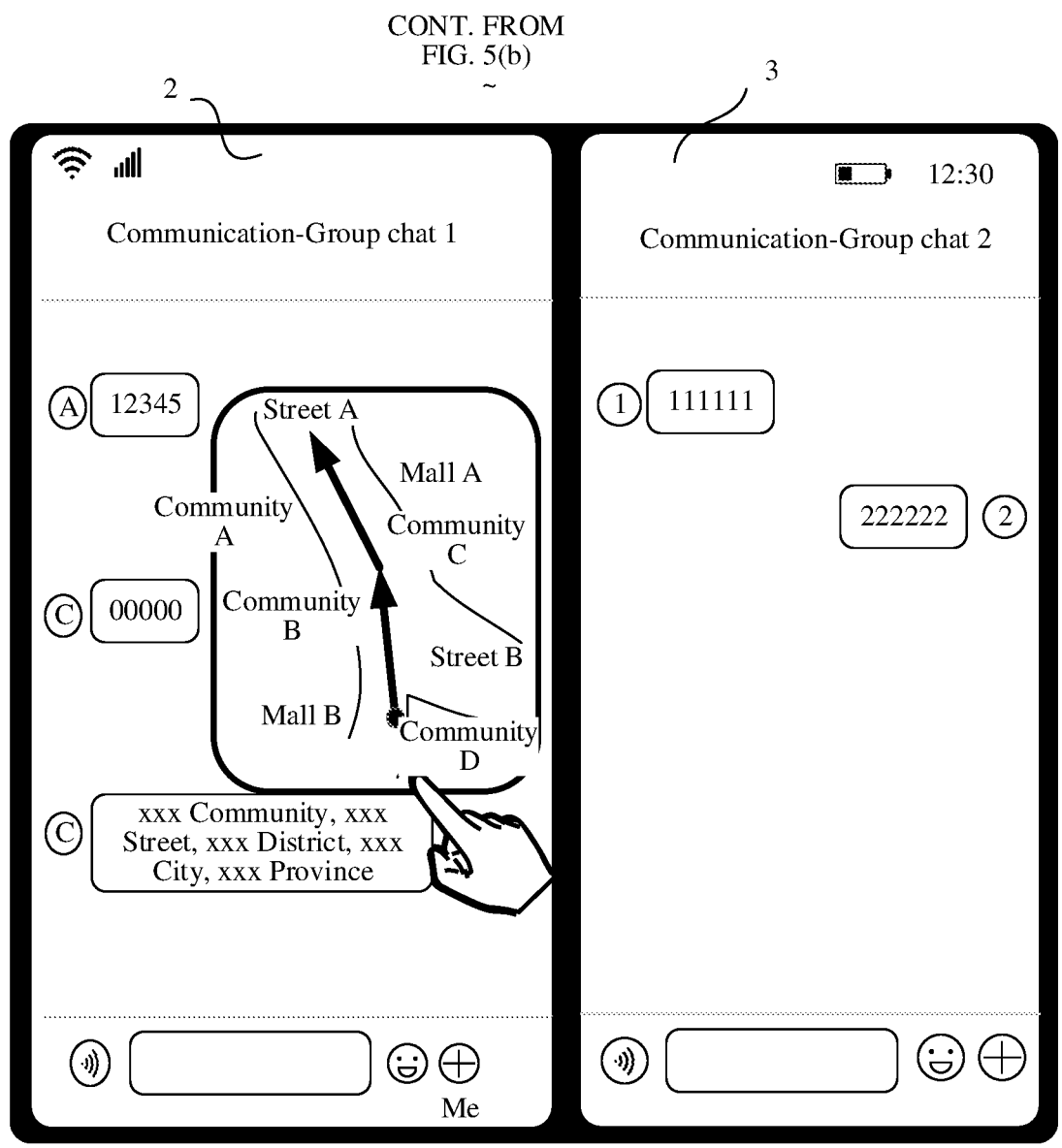

As shown in FIG. 5(a), the electronic device displays a chat interface of a messaging APP in a full-screen manner through a display screen 1. In a case that the user selects text or a picture (by using the address information as an example herein) on the chat interface of the messaging APP in a long-press manner, as shown in FIG. 5(b), the electronic device displays a copy control on the chat interface of the messaging APP. In a case that the user taps the copy control, as shown in FIG. 5(c), the electronic device displays a split-screen function recommendation window on the chat interface of the messaging APP, and the split-screen function recommendation window displays a preview or thumbnail of the interface of the navigation APP that is recommended based on the address information selected by the user.

Figure 5D:
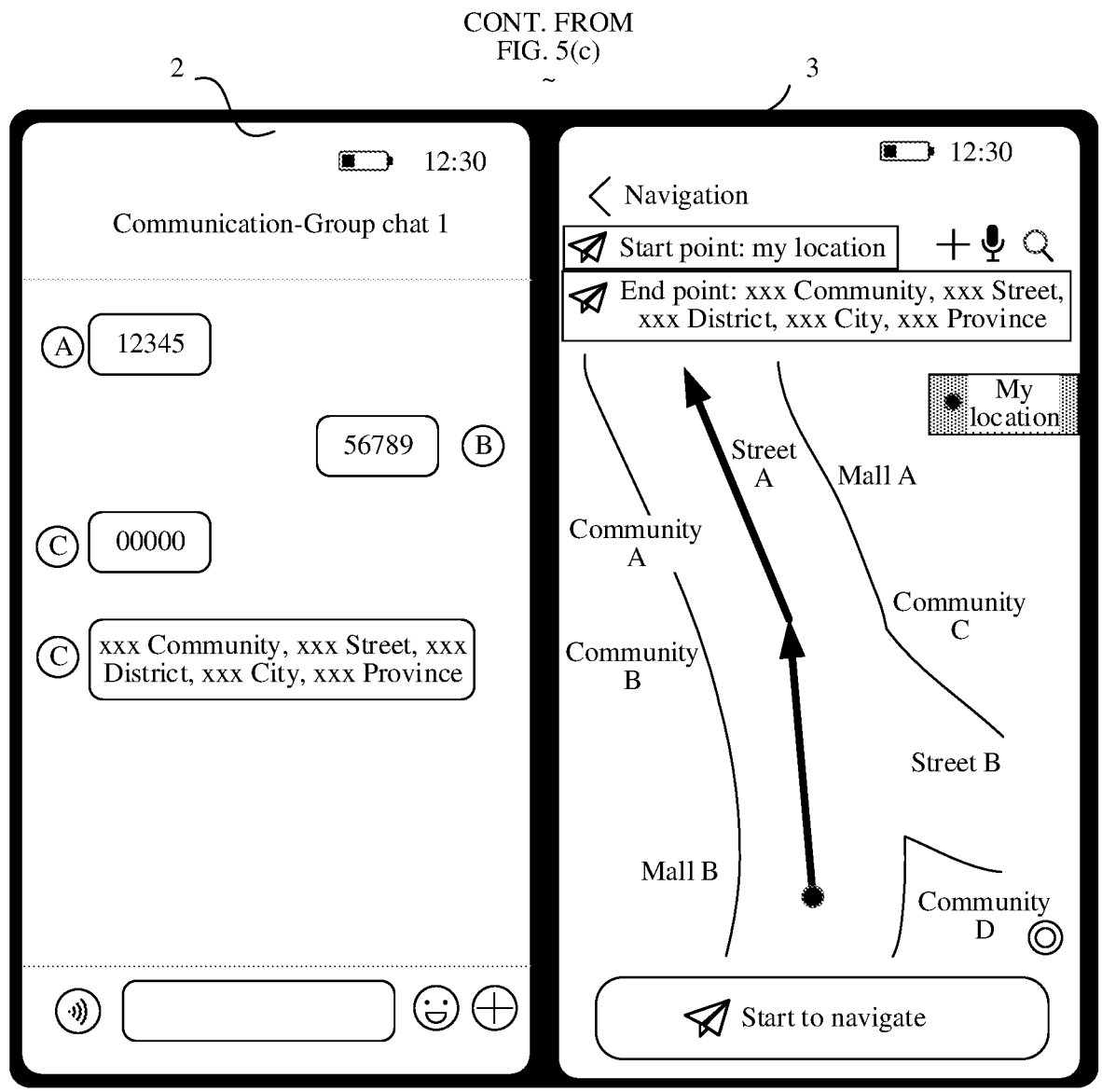

In some embodiments, when the user taps the preview or the thumbnail of the interface of the navigation APP, as shown in FIG. 5(d), the electronic device may display an interface of the messaging APP and the interface of the navigation APP in different regions (that is, in a split-screen manner) in a case that both the messaging APP and the navigation APP support split-screen display.

In this way, split-screen display of the display screen may be achieved based on a trigger operation on the display screen by the user.

In some other embodiments, when the user taps the preview or the thumbnail of the interface of the navigation APP, the electronic device may display the interface of the navigation APP in a full-screen manner in a case that any one of the messaging APP or the navigation APP does not support split-screen display, and the messaging APP exits and runs on the background in this case.

It may be found through comparison of FIGS. 3(a) to 3(e) and FIGS. 5(a) to 5(d) that scenarios of two figures are different, where a scenario shown in FIG. 3(a) to FIG. 3(e) is a scenario in which full-screen display is changed to split-screen display, and a scenario shown in FIG. 5(a) to FIG. 5(d) is a scenario in which split-screen display is further changed to replacing a split-screen combination. In addition, information of the displayed split-screen function recommendation window is of different forms. The split-screen function recommendation window shown in FIG. 3(a) to FIG. 3(e) displays the icon or text of the navigation APP that is recommended based on the address information selected by the user, and the split-screen function recommendation window shown in FIG. 3(a) to FIG. 3(e) displays the preview or the thumbnail of the interface of the navigation APP that is recommended based on the address information selected by the user.

It is to be noted that, the forms of the split-screen function recommendation window shown in FIG. 3(a) to FIG. 3(e) and FIG. 5(a) to FIG. 5(d) is interchangeable. For example, in the scenario shown in FIG. 3(a) to FIG. 3(e) in which full-screen display is changed to split-screen display, the split-screen function recommendation window may be displayed in a form of a preview or a thumbnail, and in the scenario shown in FIG. 5(a) to FIG. 5(d) in which split-screen display is changed to replacing one of split-screens, the split-screen function recommendation window is displayed in a form of an icon or text. Alternatively, split-screen recommendation windows in FIG. 3(a) to FIG. 3(e) and FIG. 5(a) to FIG. 5(d) may be in the form shown in FIG. 4A and FIG. 4B. This is not limited in this application. In other words, interface display forms provided in the embodiments of this application may be combined with the forms of the split-screen function recommendation window.

A case that change of the split-screen combination is triggered in a scenario of split-screen display, that is, A| B->A| C is described with reference to FIG. 6(a) to FIG. 6(d).

When displaying the interface of the application A and the interface of the application B in a split-screen manner, the electronic device may prompt or recommend the user to change the split-screen combination in a case that the electronic device detects that the application A and the application C are frequently switched in the foreground (where display of the interface of the application B is maintained in this case), to display the interface of the application A and the interface of the application C in a split-screen manner. Such a scenario may be simply represented as "A|B->A|C", that is, a split-screen combination A|B is changed to a split-screen combination A|C.

Figure 6A:
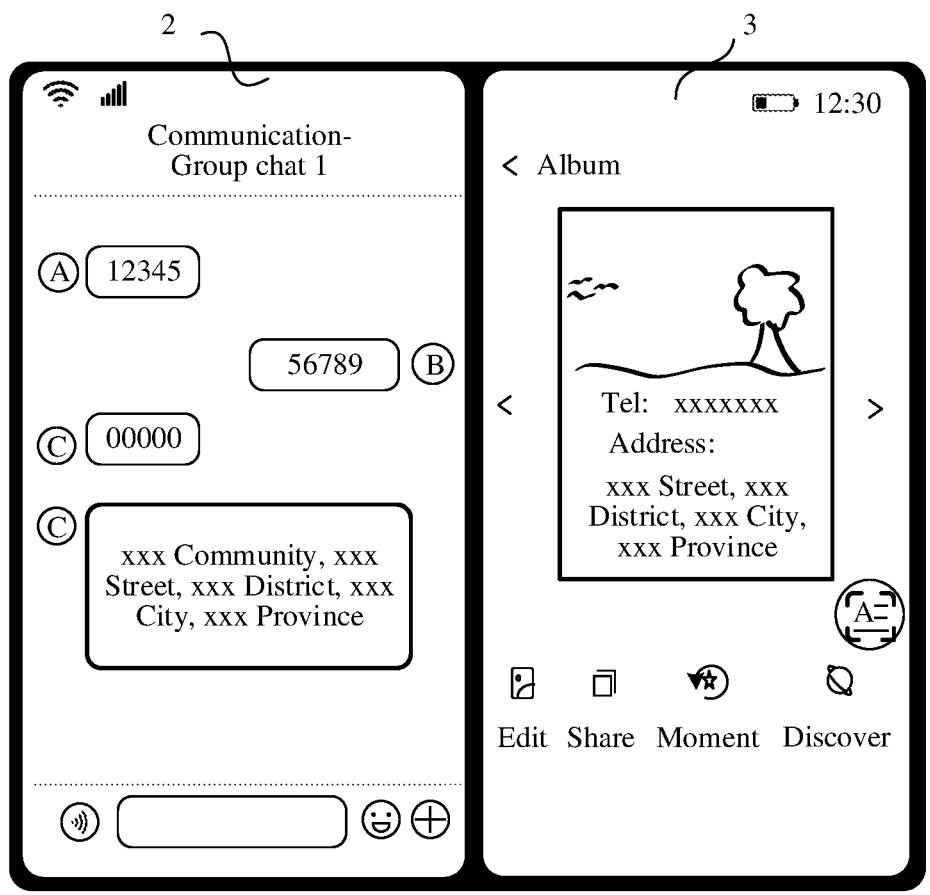
FIG. 6(a) to FIG. 6(d) are a schematic diagram of a user interface to which an application interface display method is applicable according to an embodiment of this application.
Figure 6B:
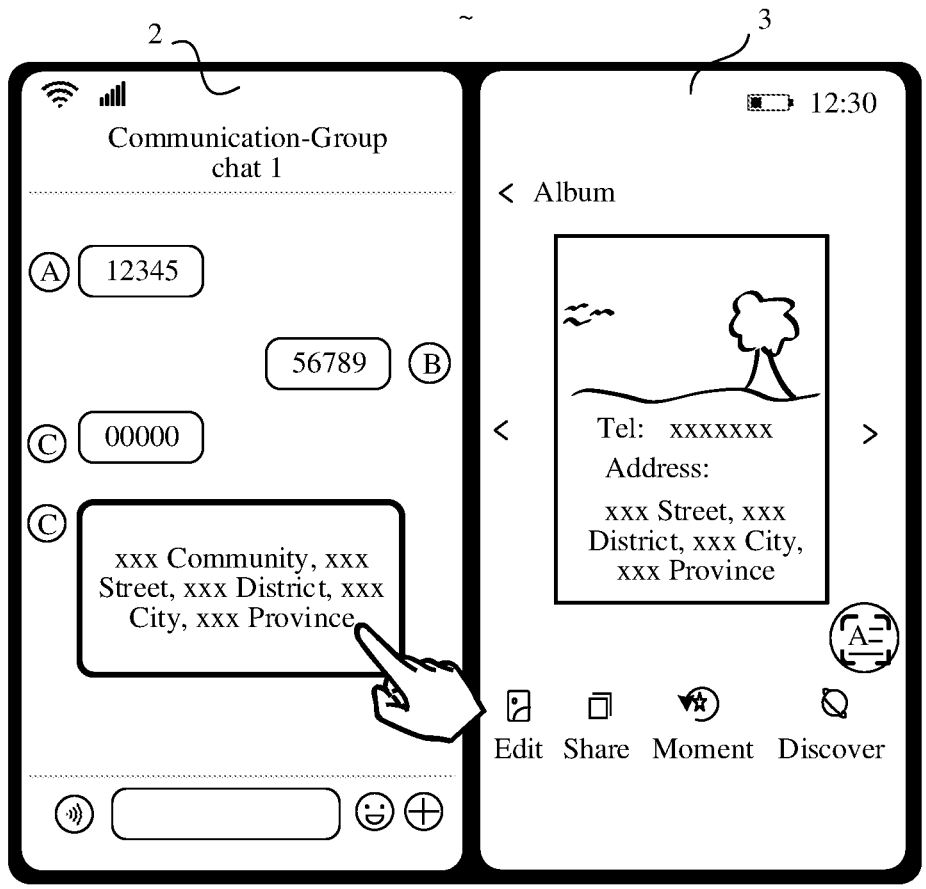

As shown in FIG. 6(a), the electronic device displays two interfaces of an APP in different regions of the display screen (that is, in a split-screen manner), where a chat interface of a messaging APP is displayed in a region 2 of the display screen, and an interface of an album APP is displayed in a region 3 of the display screen.

Figure 6C:
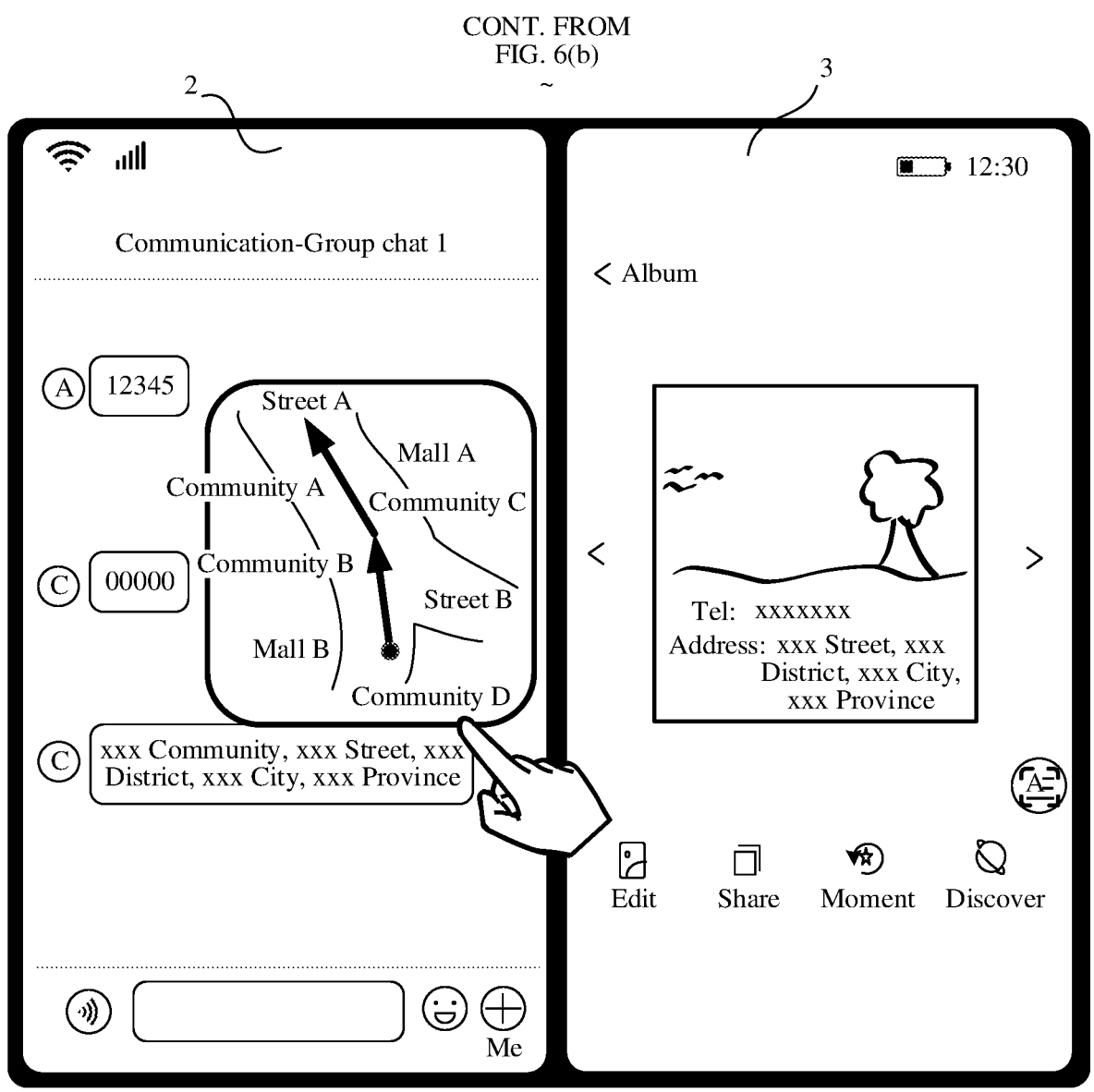

As shown in FIG. 6(a), in a case that the user selects text or a picture (still by using the address information as an example herein) on the chat interface of the messaging APP in a single-tap manner, as shown in FIG. 6(c), the electronic device displays a split-screen function recommendation window (for example, capsule-shaped) on the chat interface of the messaging APP, and the split-screen function recommendation window displays a thumbnail of a navigation APP that is recommended based on the address information selected by the user.

Figure 6D:
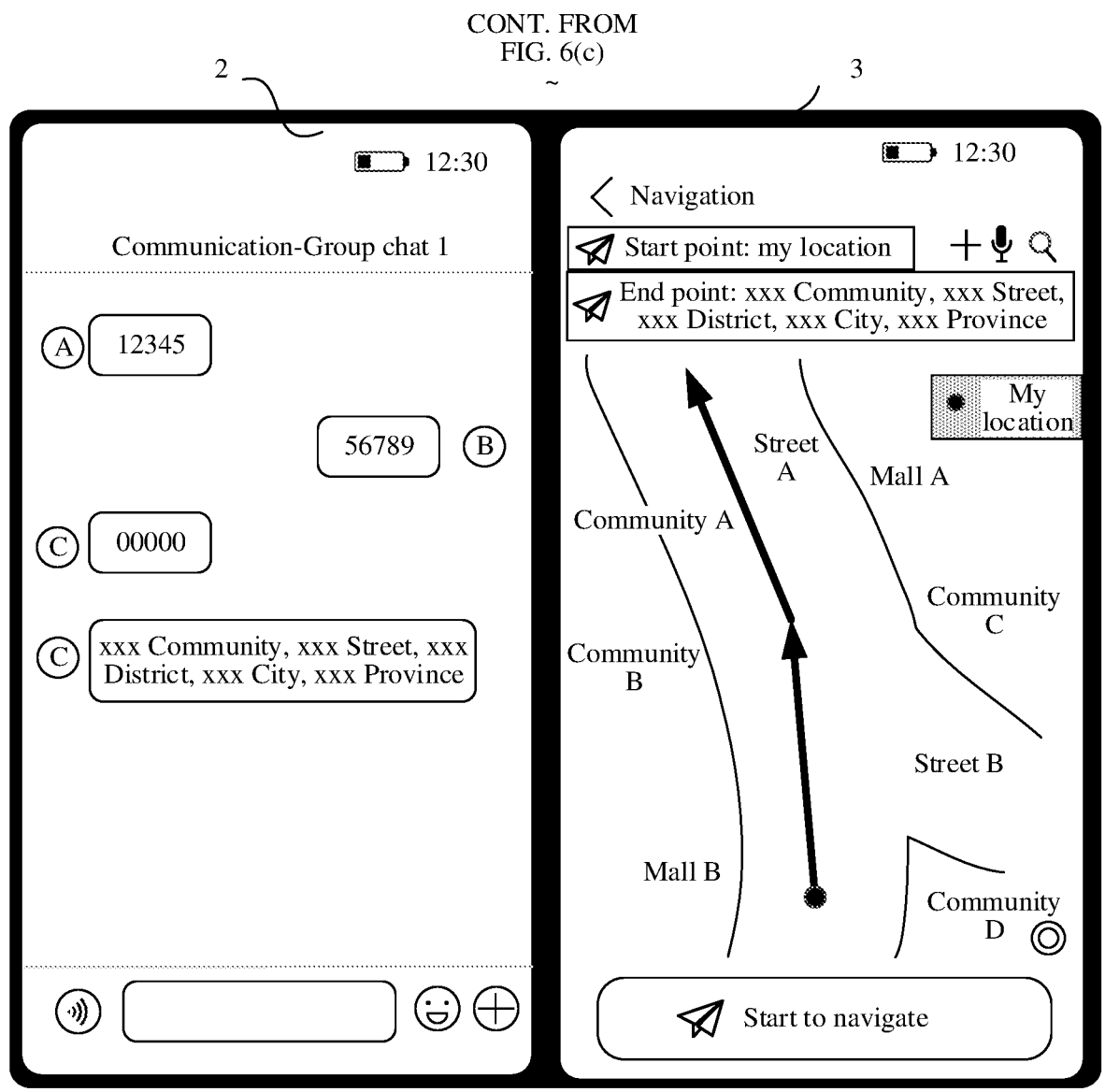

When the user taps the thumbnail of the navigation APP, as shown in FIG. 6(d), the electronic device may display the chat interface of the messaging APP and the interface of the navigation APP in a split-screen manner in a case that both the messaging APP and the navigation APP support split-screen display.

In this way, change of the split-screen combination of the display screen may be achieved based on a trigger operation on the display screen by the user.

It is to be noted that, FIGS. 3(a) to 3(e) to FIGS. 6(a) to 6(d) respectively illustrate scenarios in which the user triggers split-screen display by selecting text, and a scenario in which the user triggers split-screen display by selecting a picture is exemplarily illustrated below with reference to FIG. 7A to FIG. 7C.

Figure 7A:
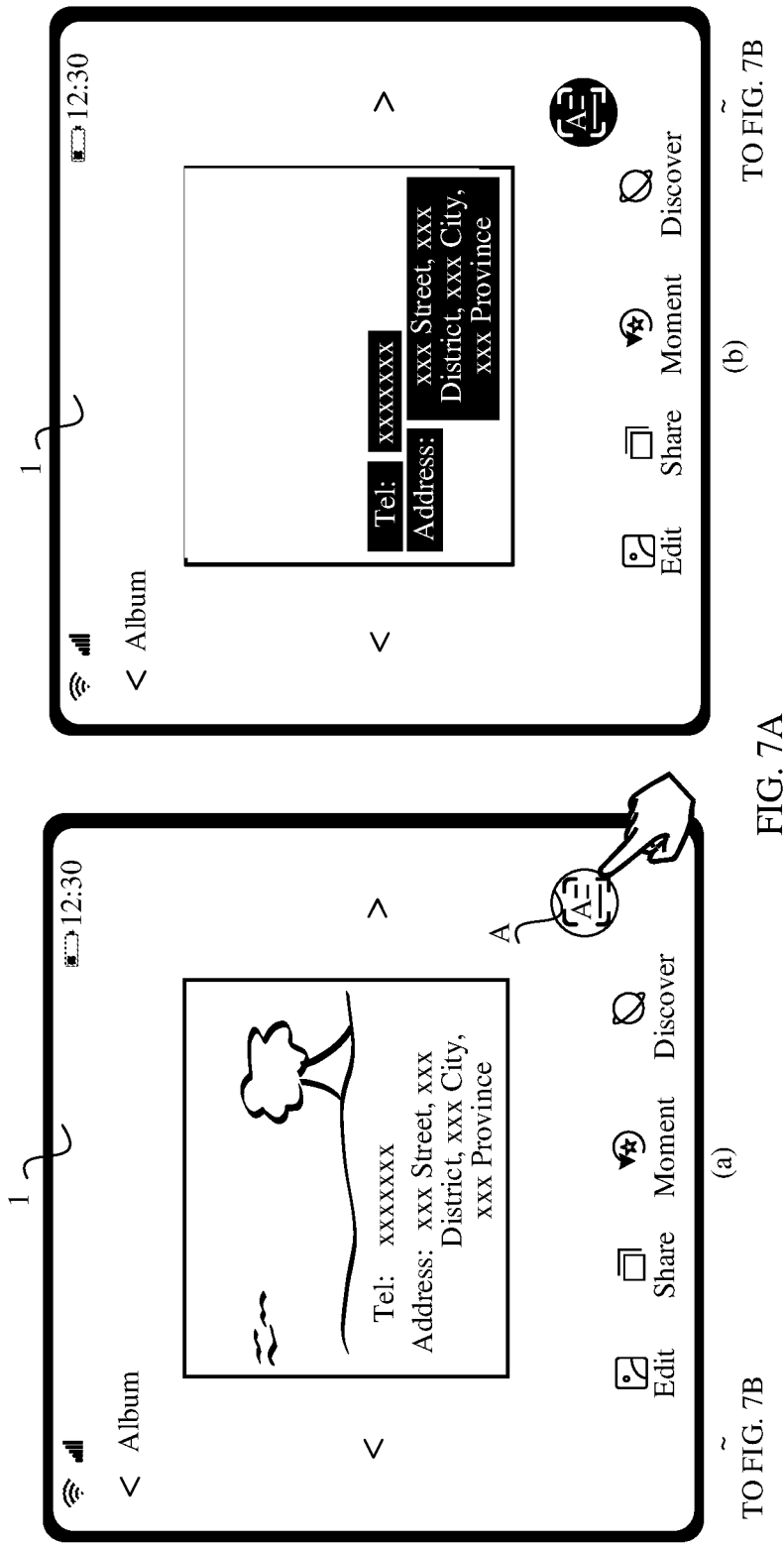

As shown in (a) of FIG. 7A, the electronic device displays an interface of an album APP in a full-screen manner through a display screen 1, a picture of a current interface including text content. In a case that the user taps a text recognition control A in the interface of the album APP, as shown in (b) of FIG. 7A, the electronic device recognizes the text content included in the picture, for example, Tel: xxxxxxx, and Address: xxx Street, xxx District, xxx City, xxx Province.

Figure 7B:
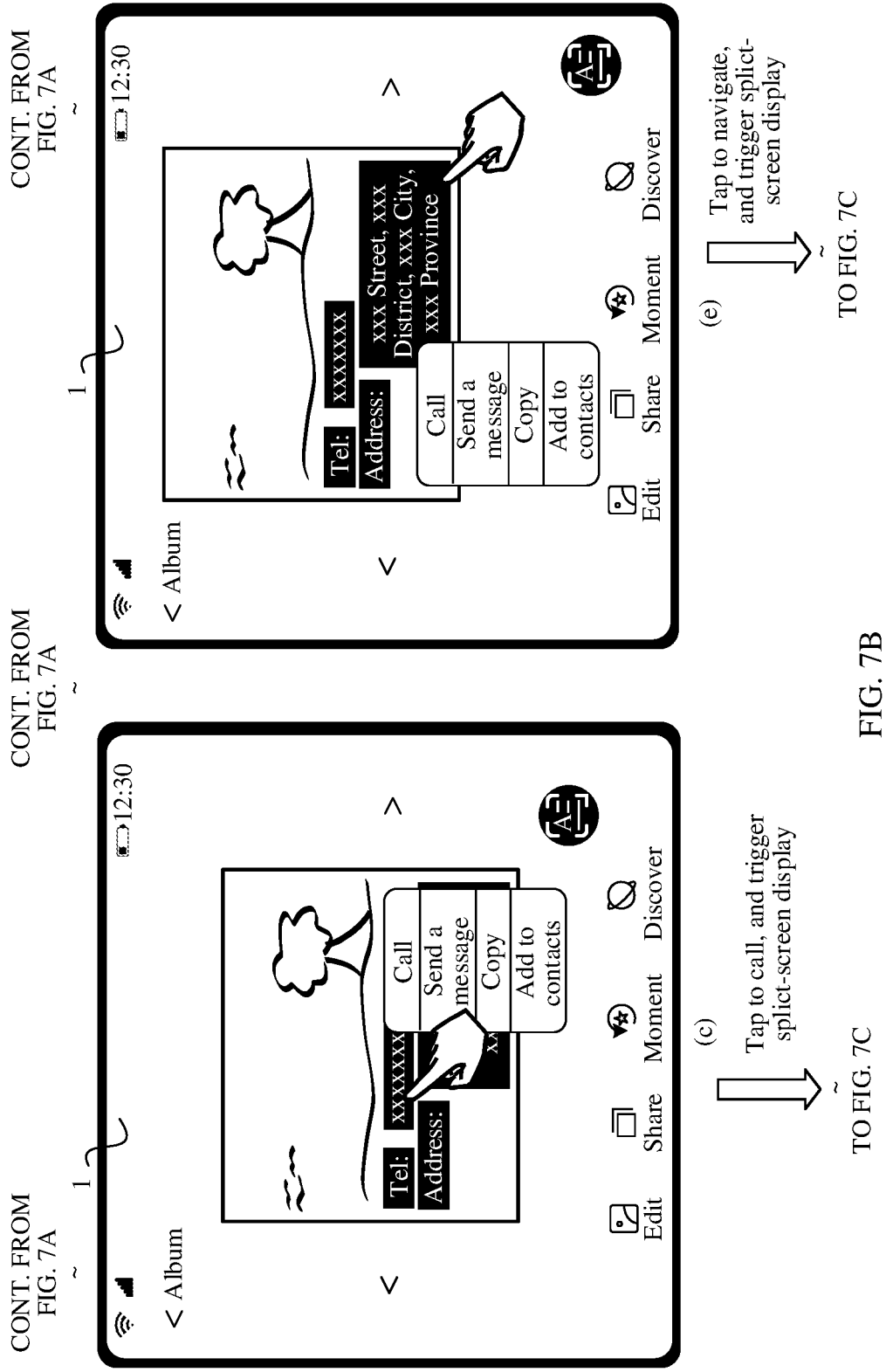

As shown in (c) of FIG. 7B, in a case that the user selects recognized text content "xxxxxxx", the electronic device displays recommended content such as a function control, an APP icon, or the like that is recommended based on the text content "xxxxxxx". Optionally, the recommended content may be in a form of a list. For example, the recommended content includes a function of making a call, a function of sending a message, a copy function, a function of adding to phone contacts, and the like.

As shown in (d) of FIG. 7C, in a case that the user selects the function of making a call, the electronic device displays an interface of an album APP in a region 2 of the display screen and an interface of a calling APP in a region 3 of the display screen in a split-screen manner.

In another example, as shown in (e) of FIG. 7B, in a case that the user selects recognized text content "xxx Street, xxx District, xxx City, xxx Province", the electronic device displays recommended content such as a function control, an APP icon, or the like that is recommended based on the text content "xxx Street, xxx District, xxx City, xxx Province". For example, the recommended content includes a navigation function, a food recommendation APP, a copy function, a sharing function, and the like.

As shown in (f) of FIG. 7C, in a case that the user selects the navigation function, the electronic device displays an interface of an album APP in a region 2 of the display screen and an interface of a navigation APP in a region 3 of the display screen in a split-screen manner.

It is to be noted that, FIG. 7A to FIG. 7C are exemplarily illustrated by using an example in which all of the album APP, the calling APP, and the navigation APP support split-screen display.

It is to be noted that, a possible form of the split-screen function recommendation window is exemplarily listed above. It may be understood that, the embodiments of this application include but are not limited to the foregoing split-screen function recommendation window during actual implementation, and the split-screen function recommendation window may further include any other possible form. Details may be determined according to an actual use requirement, and this is not limited in the embodiments of this application.

Optionally, in some embodiments, a system switch may be configured to provide a do-not-disturb mode. Exemplarily, a system-level intelligent split-screen switch may be configured to trigger to disable or enable an intelligent split-screen function. The electronic device may no longer trigger recommendation of a split-screen function according to a user behavior after the user manually disables the intelligent split-screen function.

Optionally, in some embodiments, in a case that the electronic device displays the split-screen function recommendation window, the user may trigger the electronic device to close or hide the split-screen function recommendation window based on a preset operation if the split-screen function is not required by the user. Correspondingly, the electronic device may close or hide the split-screen function recommendation window in response to an operation performed by the user. Exemplarily, the electronic device closes the split-screen function recommendation window in response to a slide operation (such as sliding upward) on the split-screen function recommendation window by the user.

Optionally, in some embodiments, in a case that the electronic device displays the split-screen function recommendation window, the electronic device may automatically close or hide the split-screen function recommendation window if the electronic device does not receive any operation performed by the user within a specific duration (for example, 5 seconds).

By using the solution of this application, whether there is a split-screen requirement may be determined according to a scenario behavior of the user, and an intelligent split-screen service may be actively provided in a targeted manner after it is determined that there is a split-screen requirement, thereby achieving more efficient task parallel experience.

A scenario in which a recommended application is displayed in a form of a floating window is exemplarily described with reference to FIGS. 8(a) to 8(c) to FIG. 12.

Figure 8A:
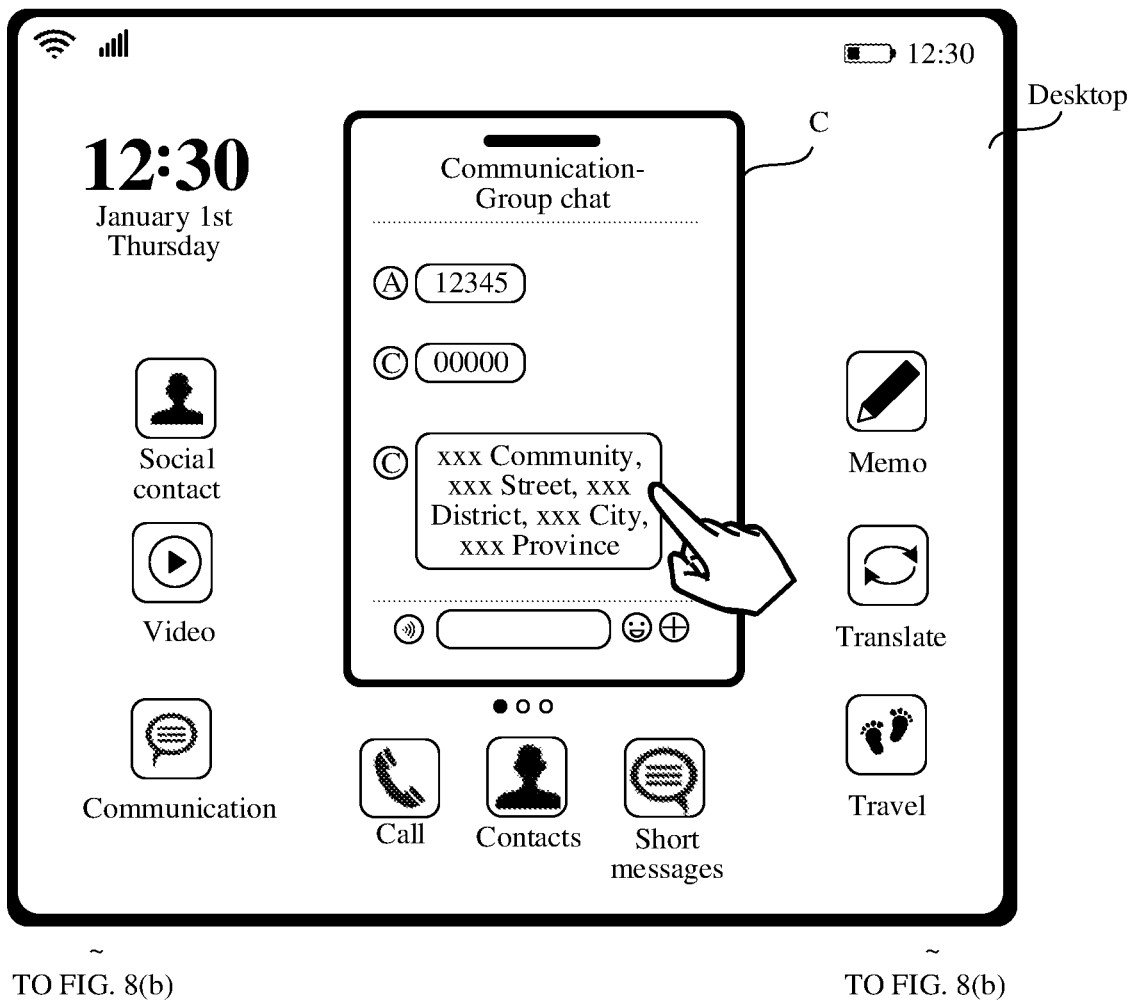
FIG. 8(a) to FIG. 8(c) are a schematic diagram of a user interface to which an application interface display method is applicable according to an embodiment of this application.
Figure 8B:
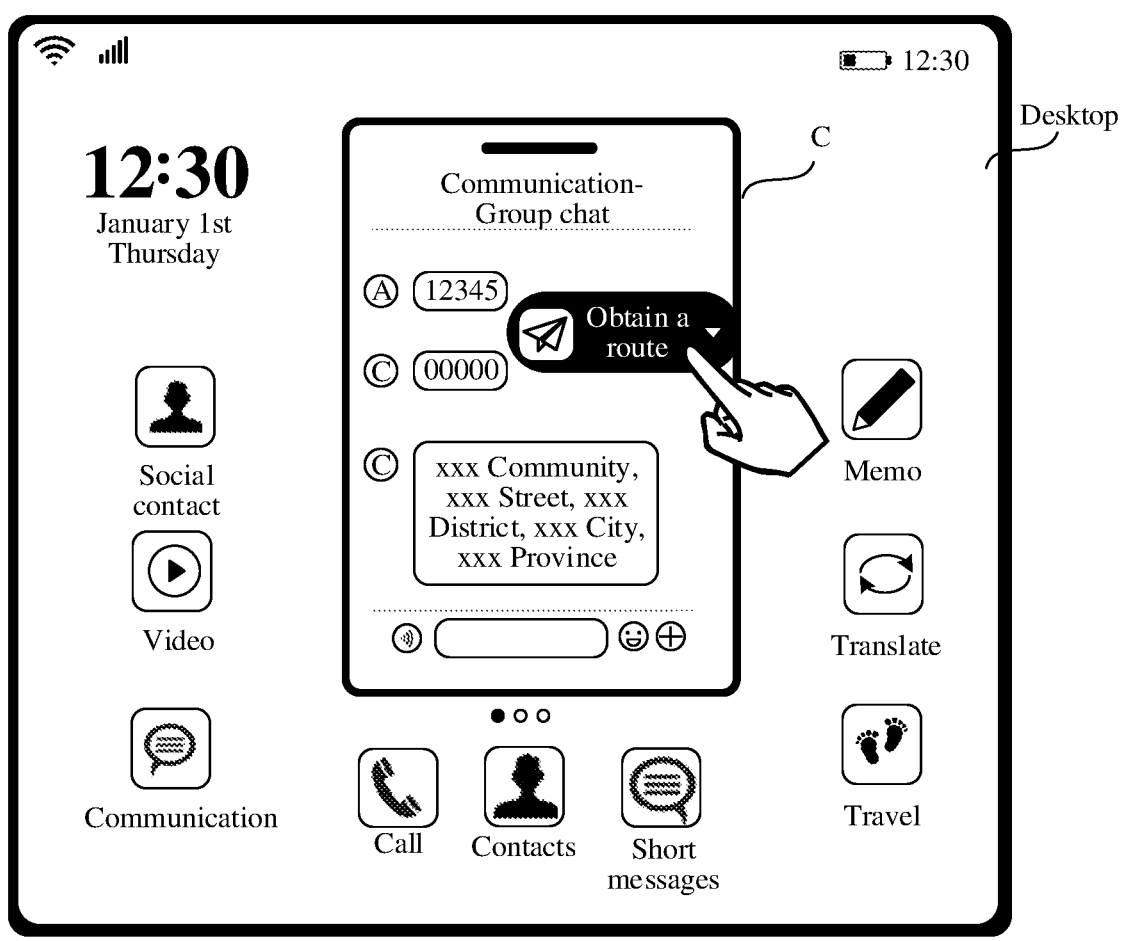
Figure 8C:
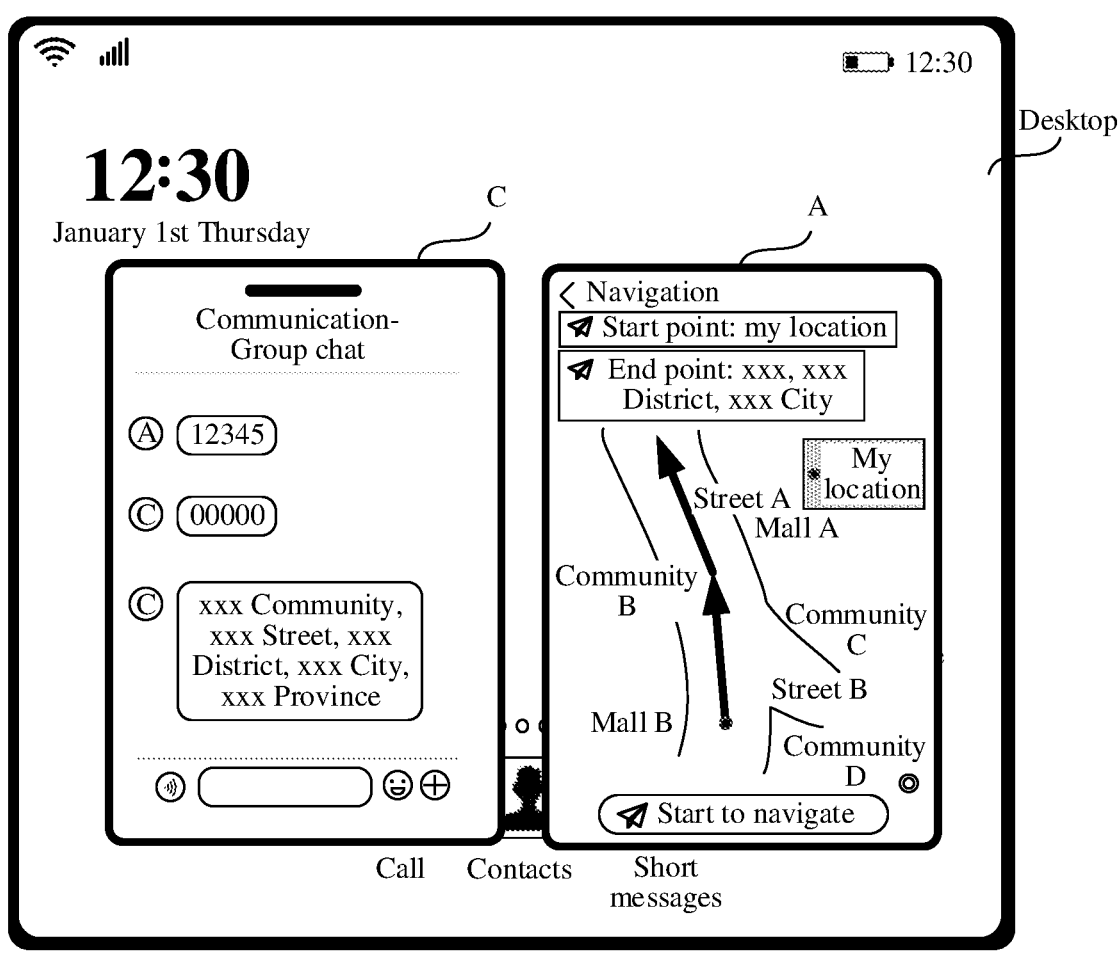

As shown in FIG. 8(a), when the electronic device displays an interface C on a desktop in a form of a floating window, in a case that the electronic device detects that the user selects or copies content in the interface C, as shown in FIG. 8(b), the electronic device may display an identifier (for example, "obtain a route") of an application recommended based on the content. In a case that the electronic device detects an operation on the identifier of the application by the user, as shown in FIG. 8(c), two floating windows are simultaneously displayed on the desktop, where the interface C and an interface A (which is an interface of the recommended application) are respectively displayed.

In this way, "desktop [C]->desktop [A] [C]" is implemented.

Figure 9A:
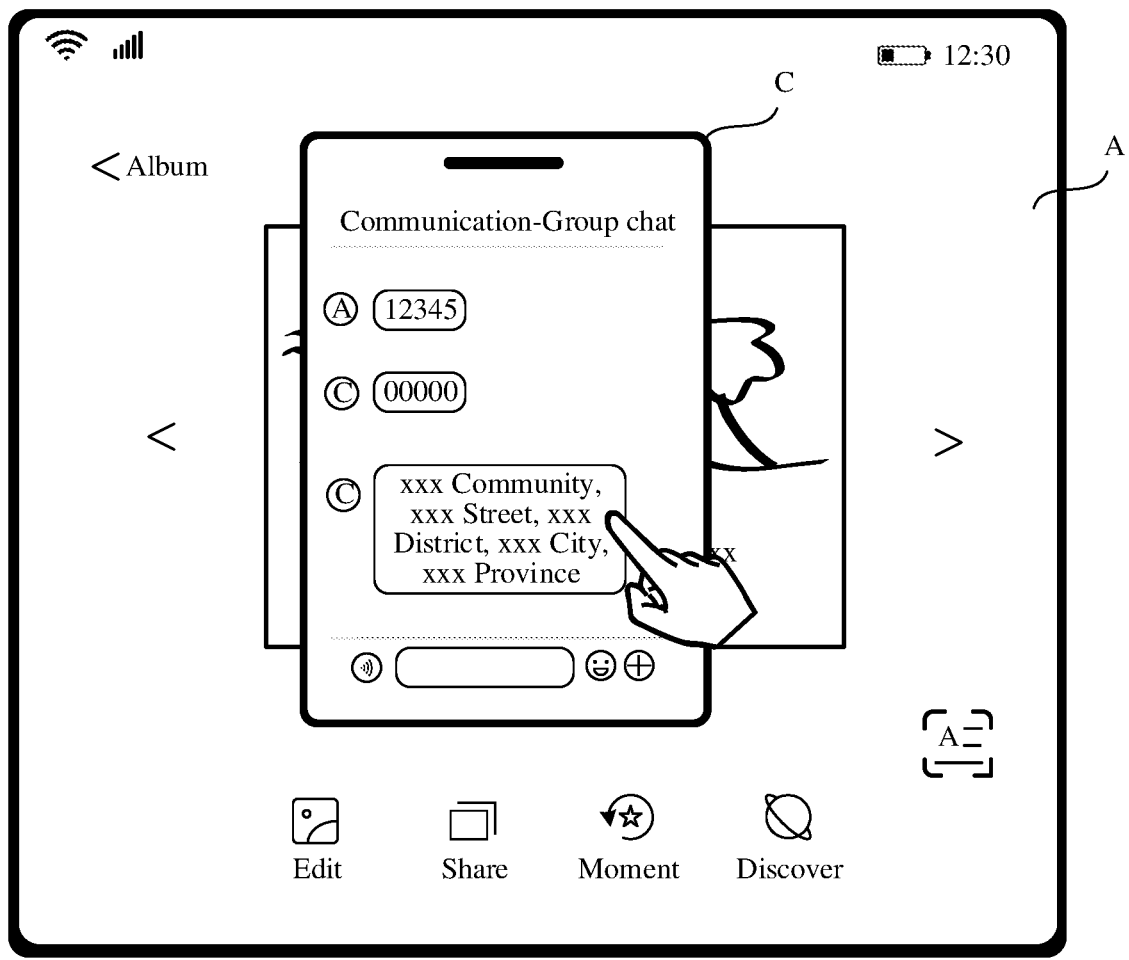
FIG. 9(a) to FIG. 9(c) are a schematic diagram of a user interface to which an application interface display method is applicable according to an embodiment of this application.
Figure 9B:
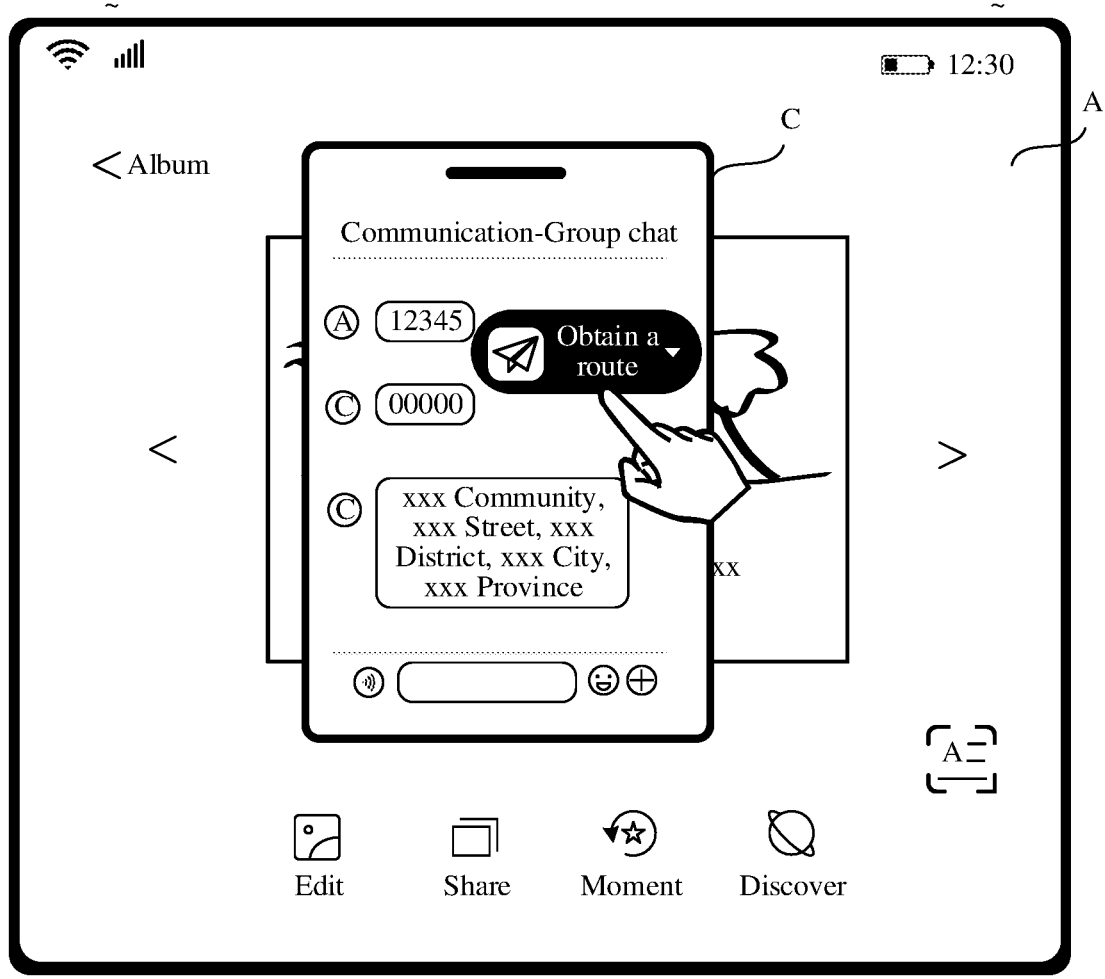
Figure 9C:
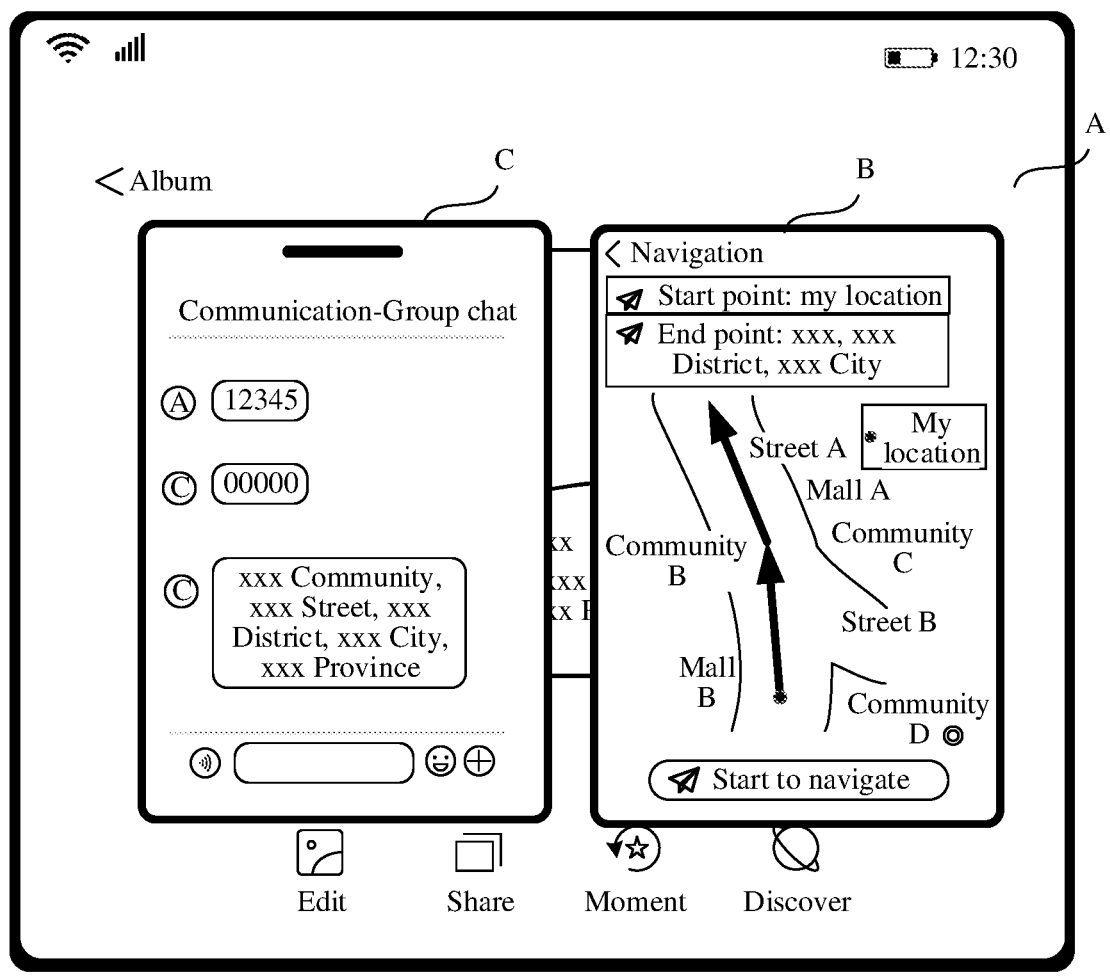

As shown in FIG. 9(a), when the electronic device displays an interface C (which is a full-screen interface of an application A) on an interface A (A [C]) in a form of a floating window, in a case that the electronic device detects that the user selects or copies content in the interface C, as shown in FIG. 9(b), the electronic device may display an identifier (for example, "obtain a route") of an application recommended based on the content. In a case that the electronic device detects an operation on the identifier of the application by the user, as shown in FIG. 9(c), two floating windows are simultaneously displayed on the full-screen interface of the application A, where the interface C and an interface B (which is an interface of the recommended application) are respectively displayed.

In this way, "A [C]->A [B] [C]" is implemented.

Figure 10A:
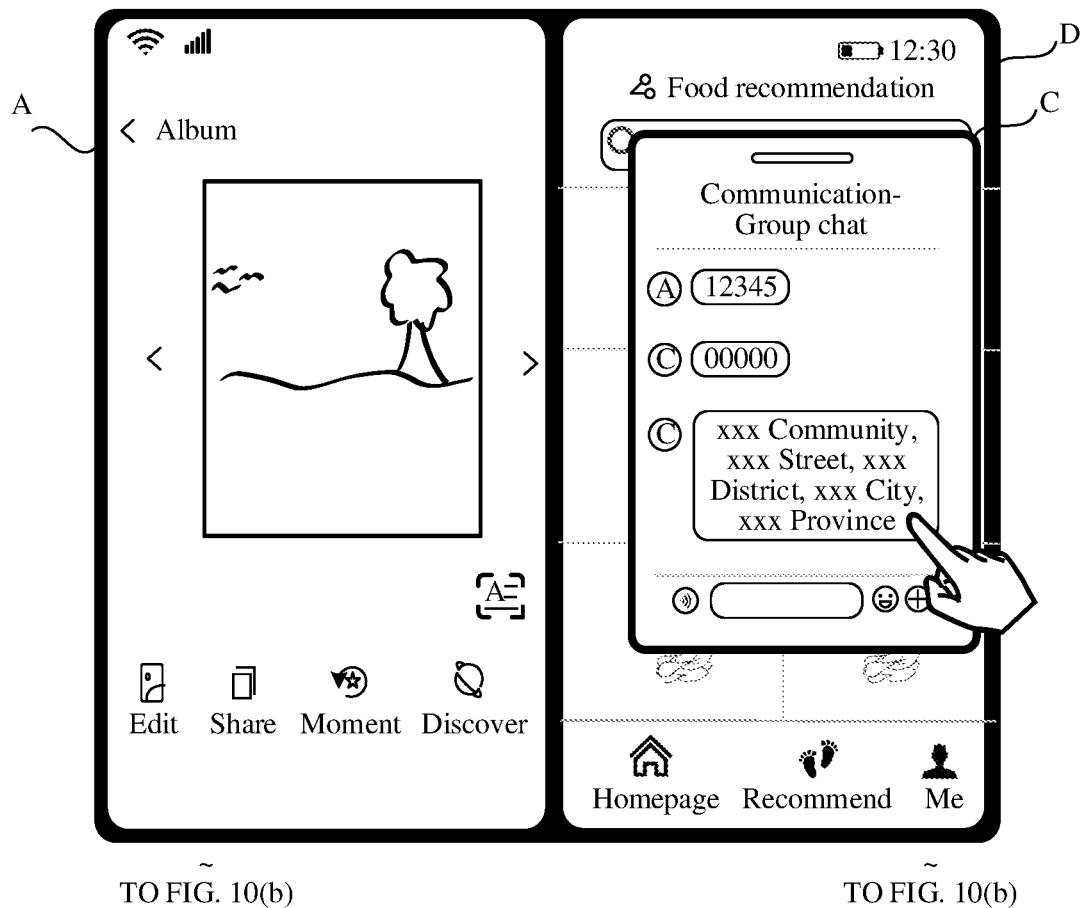
FIG. 10(a) to FIG. 10(c) are a schematic diagram of a user interface to which an application interface display method is applicable according to an embodiment of this application.
Figure 10B:
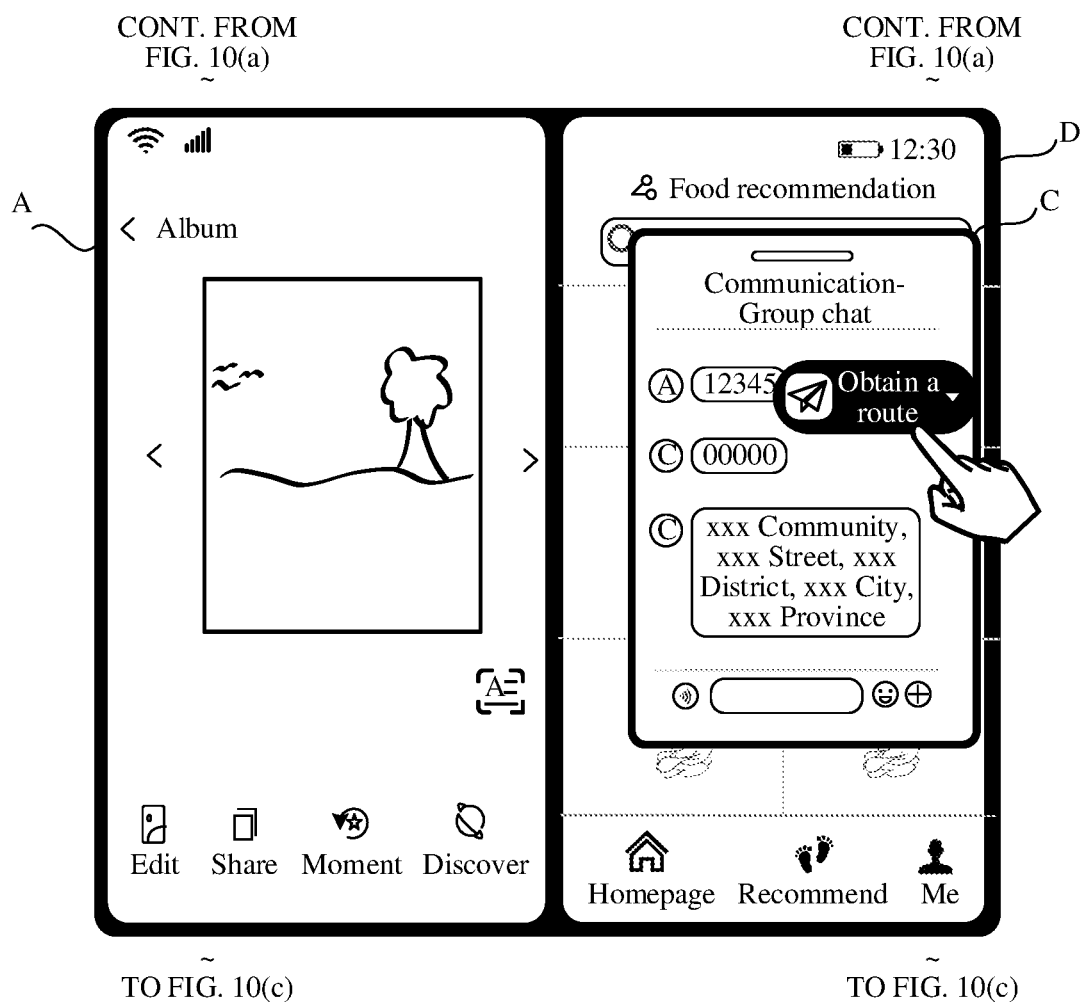
Figure 10C:
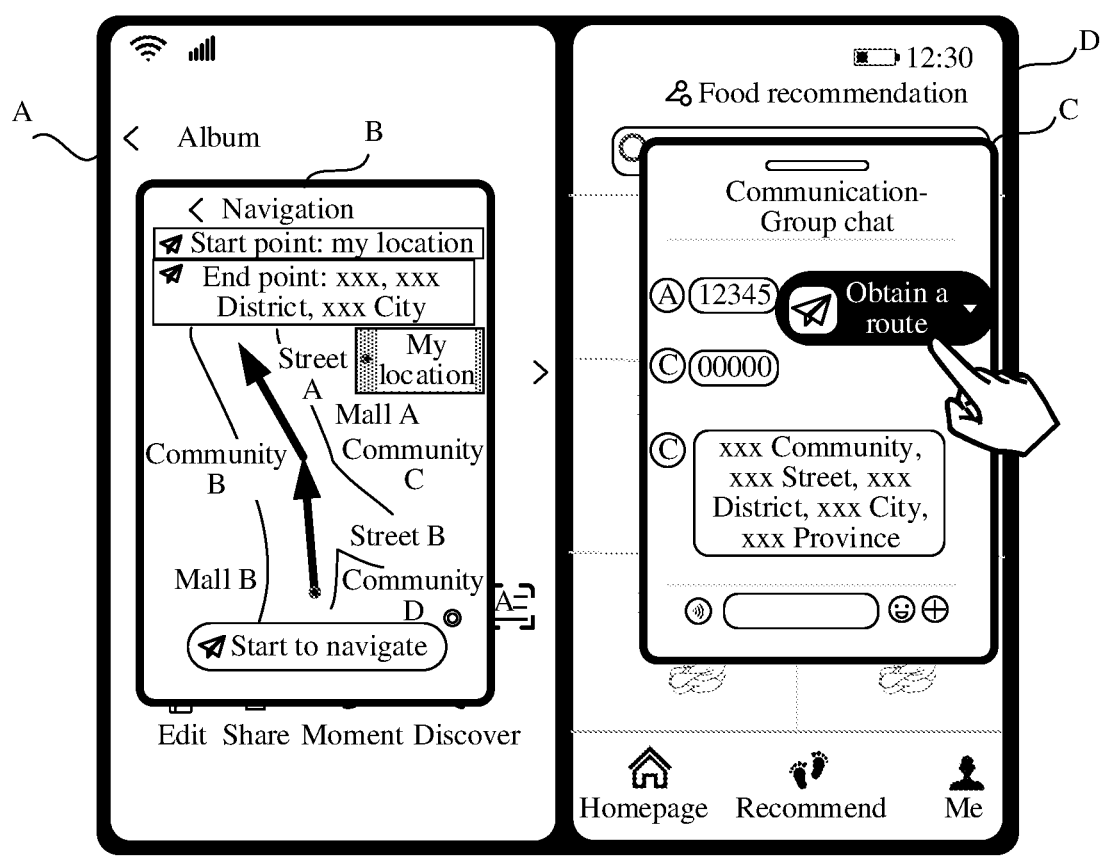

As shown in FIG. 10(a), the electronic device displays an interface A and an interface D in a split-screen manner, and displays an interface C (which is represented as A| D [C]) on the interface D in a form of a floating window. In a case that the electronic device detects that the user selects or copies content in the interface C, as shown in FIG. 10(b), the electronic device may display an identifier (for example, "obtain a route") of an application recommended based on the content. In a case that the electronic device detects an operation on the identifier of the application by the user, as shown in FIG. 10(c), a floating window is displayed on the interface A, where an interface B (which is an interface of the recommended application) is displayed, and the floating window in which an interface C is displayed is maintained on an interface D.

In this way, "A| D [C]->A[B] | D [C]" is implemented.

Figure 11B:
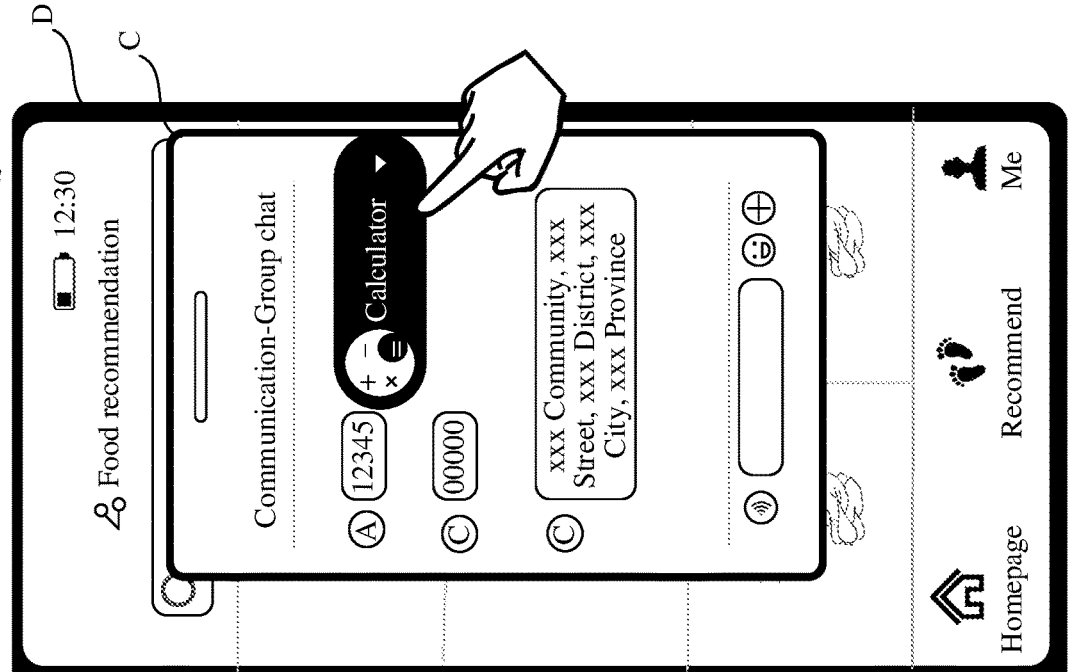
Figure 11B:
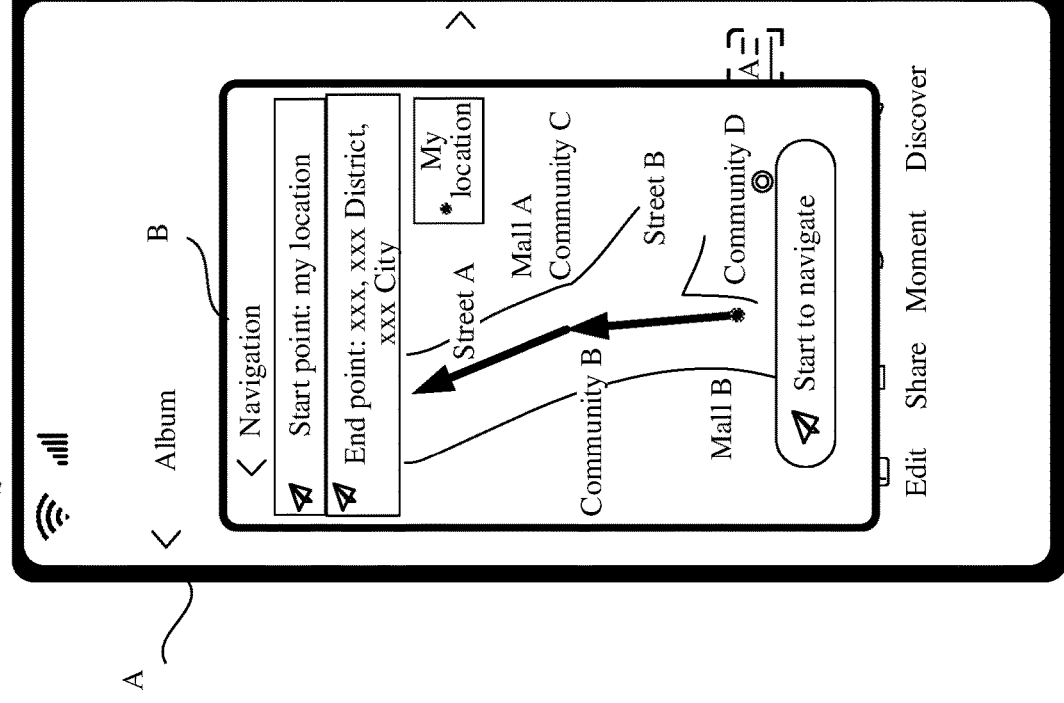
Figure 11C:
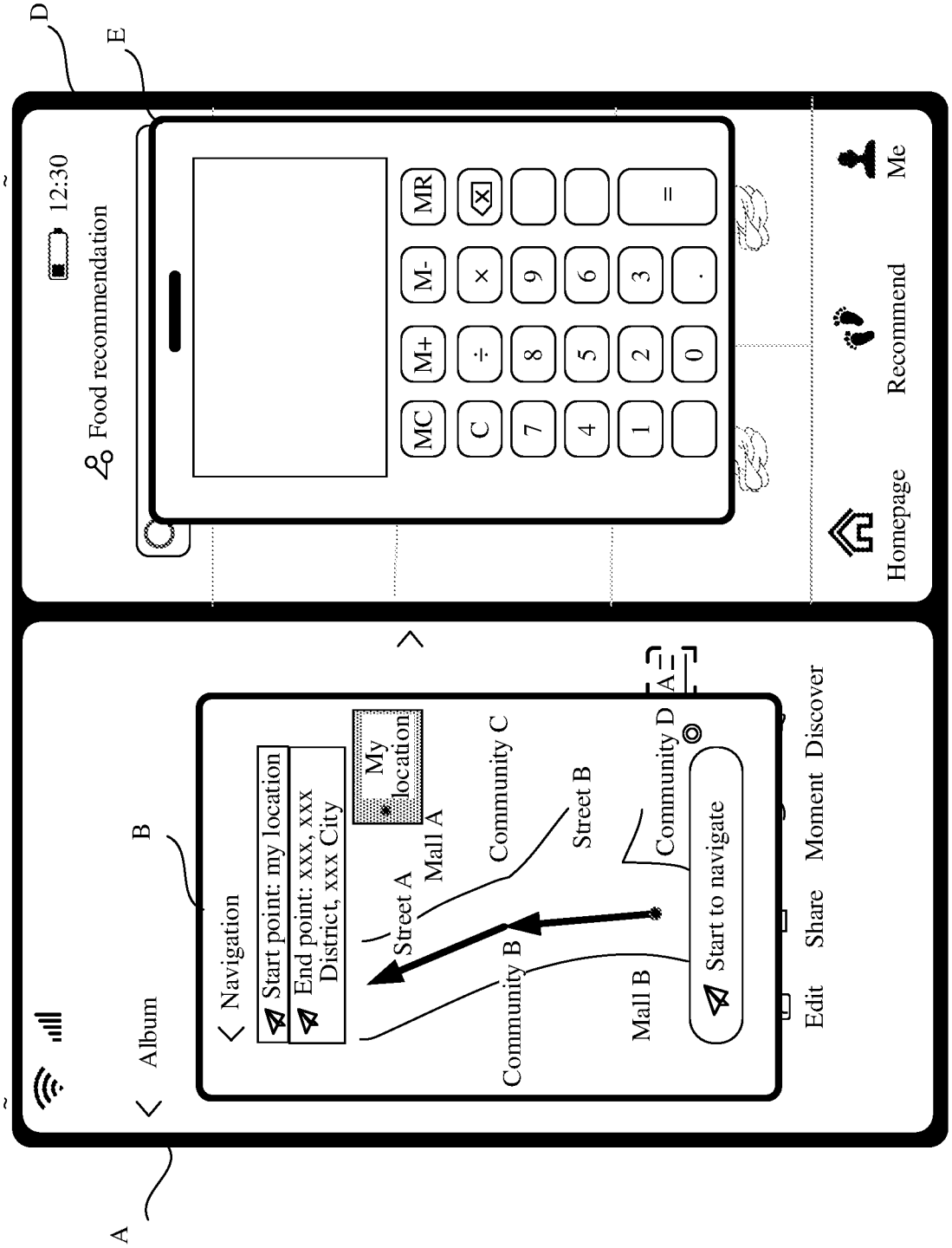

As shown in FIG. 11(a), when the electronic device displays an interface A and an interface D in a split-screen manner, displays an interface B on the interface A in a form of a floating window, and displays an interface C (A[B] | D [C]) on the interface A, in a case that the electronic device detects that the user selects or copies content in the interface C, as shown in FIG. 11(b), the electronic device may display an identifier (for example, a calculator) of an application recommended based on the content. In a case that the electronic device detects an operation on the identifier of the application by the user, as shown in FIG. 11(c), the interface C in the floating window is replaced with an interface B (which is an interface of a calculator application).

In this way, "A[B] D [C]->A[B]| D [E]" is implemented.

Second Embodiment

In this embodiment of this application, in a case that a foldable screen of the electronic device is in an unfolded state or a conventional display screen of the electronic device is in an unlocked screen-on state, the electronic device may speculate a user requirement according to a user behavior, and prompt the user to perform split-screen display when speculating that the user has a split-screen display requirement, thereby improving user experience of using a large-screen device.

Exemplarily, in a case that the electronic device determines that the user triggers two APPs to be switched back and forth, the electronic device may speculate, according to the user behavior, that the user has the split-screen display requirement. Therefore, the electronic device may recommend a split-screen function for the user, for example, prompting one-tap split-screen display to implement intelligent split-screen display.

It is to be noted that, whether the two APPs are frequently switched may be determined in the following manner that a quantity of times of switching between an application A and an application B by the user within a preset duration X is greater than or equal to a preset times Y, where the application A being switched to the application B is considered as one time of switching, and the application B being switched to the application A is considered as one time of switching. X represents a length of a preset time period, the preset time period representing a time period after switch between the applications for the first time is detected, and Y represents a threshold of a quantity of times of switching. X and Y may be used as system service parameters, and specific values may be set according to an actual use requirement, for example, default values of X and Y may be obtained based on big data.

Figure 12:
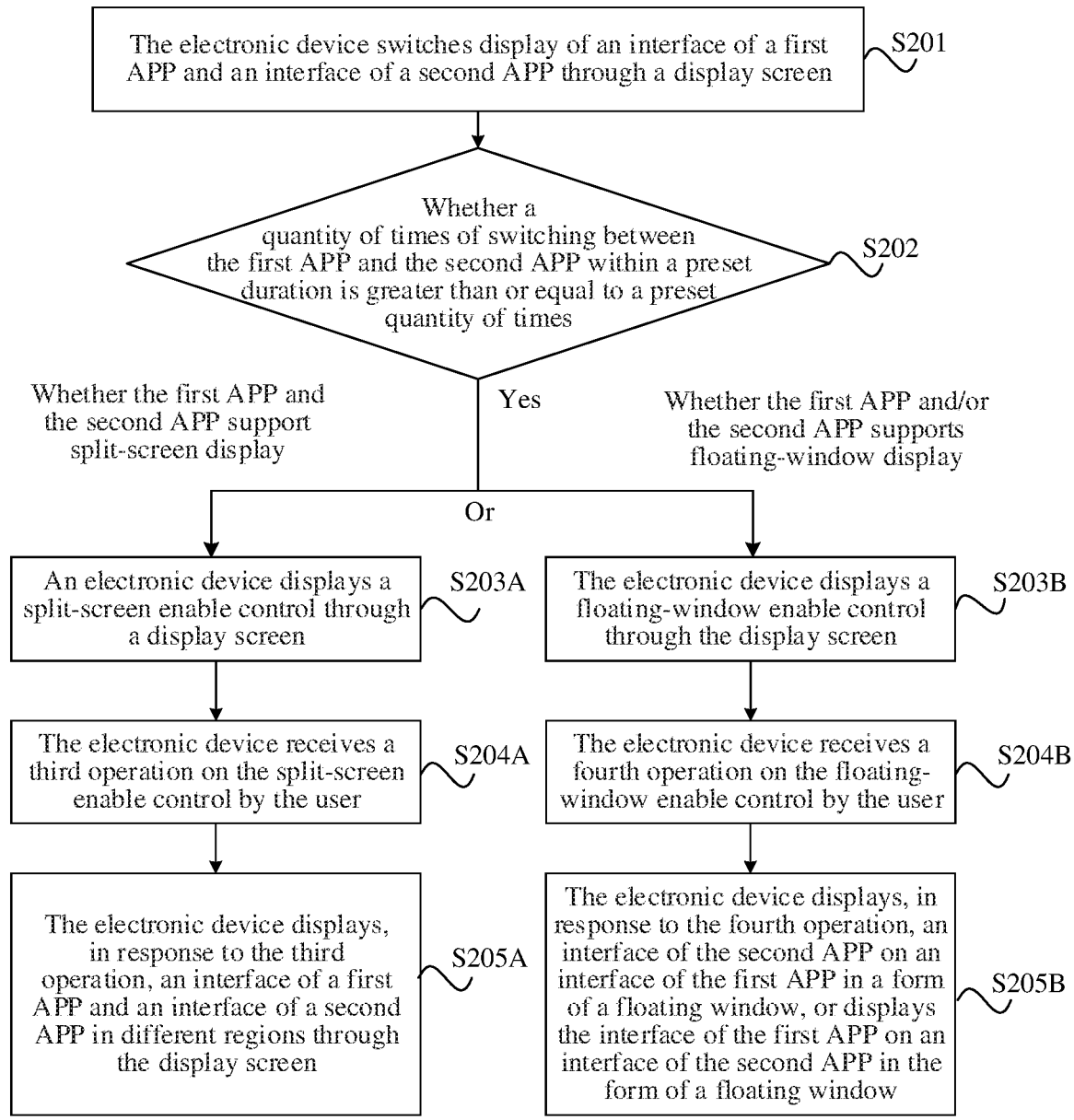
FIG. 12 is a schematic flowchart of another application interface display method according to an embodiment of this application.

FIG. 12 is a schematic flowchart of an application interface display method according to a second embodiment of this application. As shown in FIG. 12, the method includes steps S201, S202, and S203A to S205A, or includes S201, S202, and S203B to S205B.

S201. The electronic device switches display of an interface of a first APP and an interface of a second APP through a display screen.

In some embodiments, assuming that the display screen displays the interface of the first APP in a full-screen manner, the electronic device displays the interface of the second APP in a full-screen manner through the display screen in response to a trigger switching operation performed by the user, where the first APP exits and runs on a background. Then, the electronic device displays the interface of the first APP through the display screen in response to the trigger switching operation performed by the user, where the second APP exits and runs on the background. Such a process is repeated. This is a possible implementation of frequently switching two APPs.

In some embodiments, the electronic device may further switch display between at least three APPs in response to the trigger switching operation performed by the user, and two APPs having highest switching frequency or a maximum quantity of times of switching may be used as two APPs that are displayed in a split-screen manner.

S202. The electronic device determines whether a quantity of times of switching between the first APP and the second APP within a preset duration is greater than or equal to a preset quantity of times.

The electronic device may begin timing after detecting that the display screen switches display of the interface of the first APP and the interface of the second APP, and then calculate, within a subsequent preset duration, a quantity of times of switching display between the interface of the first APP and the interface of the second APP.

It is to be noted that, in a case that the electronic device determines that the quantity of times of switching between the first APP and the second APP within the preset duration is greater than or equal to the preset quantity, it may be determined that a preset split-screen condition is met, and there is a split-screen requirement in a current scenario.

In a case that the electronic device determines that a quantity of times of switching between the first APP and the second APP within a preset duration (for example, 1 minute) is greater than or equal to a preset quantity of times (for example, 3 times), the following steps S203A to S205A are performed, or the following steps S203B to S205B are performed.

In a case that the electronic device determines that the quantity of times of switching display between the first APP and the second APP within the preset duration is less than the preset quantity of times, the electronic device may not perform split-screen recommendation and continues to detect whether APPs are switched for display, and in a case that interfaces of different APPs are switched for display, the electronic device begins timing again and records a quantity of times of switching display between two APPs within a subsequent preset duration.

First manner: the following steps S203A to S205A are performed in a case that the first APP and the second APP support split-screen display.

S203A. An electronic device displays a split-screen enable control through a display screen.

It is to be noted that, a display position, a shape, a size, and the like of the split-screen enable control are not limited in the embodiments of this application. For example, the split-screen enable control may be capsule-shaped and may display an APP icon or text and split-screen prompt information. Optionally, the split-screen enable control enables to be moved on the display screen.

Figure 13:
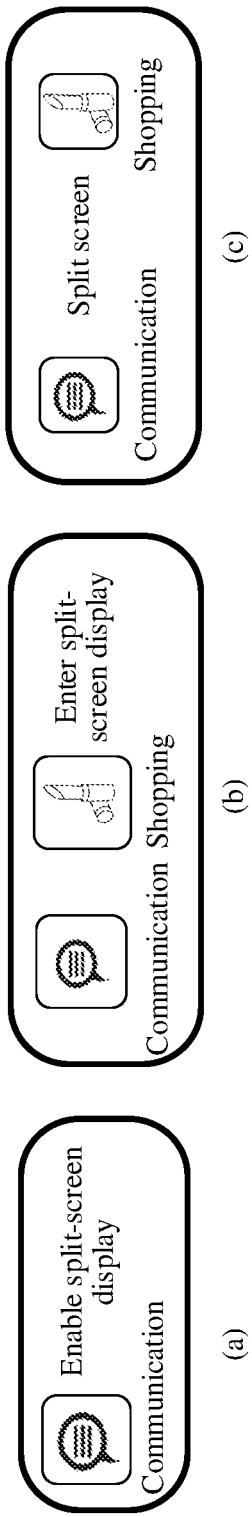
FIG. 13 is a schematic diagram of a split-screen enable control according to an embodiment of this application.

Exemplarily, FIG. 13 shows several possible forms of the split-screen enable control. As shown in (a) of FIG. 13, the split-screen enable control displays an APP icon (for example, a messaging APP icon) and split-screen prompt information (for example, enabling split-screen display). As shown in (b) and (c) of FIG. 13, the split-screen enable control displays two APP icons (for example, a messaging APP icon and a shopping APP icon) and split-screen prompt information (for example, tapping to perform split-screen display, or split-screen display).

It is to be noted that, a possible form of the split-screen enable control is exemplarily listed above. It may be understood that, the embodiments of this application include but are not limited to the foregoing split-screen enable control during actual implementation, and the split-screen enable control may further include any other possible form. Details may be determined according to an actual use requirement, and this is not limited in the embodiments of this application.

Optionally, in some embodiments, a system switch may be configured to provide a do-not-disturb mode. Exemplarily, a system-level intelligent split-screen switch may be configured to trigger to disable or enable an intelligent split-screen function. The electronic device may no longer trigger recommendation of a split-screen function according to a user behavior after the user manually disables the intelligent split-screen function.

Optionally, in some embodiments, in a case that the electronic device displays the split-screen enable control, the user may trigger the electronic device to close or hide the split-screen enable control based on a preset operation if the split-screen function is not required by the user. Correspondingly, the electronic device may close or hide the split-screen enable control in response to an operation performed by the user. For example, the electronic device closes the split-screen enable control in response to a slide operation on the split-screen enable control by the user.

Optionally, in some embodiments, in a case that the electronic device displays the split-screen enable control, the electronic device may automatically close or hide the split-screen enable control if the electronic device does not receive any operation performed by the user within a specific duration (for example, 5 seconds).

S204A. The electronic device receives a third operation on the split-screen enable control by the user.

For example, the third operation is a single-tap operation on the split-screen enable control by the user, or certainly may be any other operation meeting requirements. This is not limited in this application.

S205A. The electronic device displays, in response to the third operation, an interface of a first APP and an interface of a second APP in different regions through the display screen.

Exemplarily, the electronic device is in a state of full-screen display and detects that an application A and an application B are frequently switched in a foreground, and when displaying an interface of the application A in a full-screen manner, the electronic device may prompt or recommend the user to enable a split-screen function, to display the interface of the application A and an interface of the application B in a split-screen manner. Such a scenario may be simply represented as "A->A| B", that is, display of the application A in a full-screen manner is changed to display of the application A and application B in a split-screen manner.

In another example, the electronic device is in the state of full-screen display and detects that the application A and the application B are frequently switched in the foreground, and when displaying the interface of the application B in a full-screen manner, the electronic device may prompt or recommend the user to enable the split-screen function, to display the interface of the application A and the interface of the application B in a split-screen manner. Such a scenario may be simply represented as "B->A| B", that is, display of the application B in a full-screen manner is changed to display of the application A and application B in a split-screen manner.

Exemplarily, when displaying two interfaces (for example, a main interface A and a sub-interface A1) of the application A in a split-screen manner, the electronic device may prompt or recommend the user to change a split-screen combination in a case that the electronic device detects that the sub-interface A1 and the application B are frequently switched in the foreground (where display of the sub-interface A1 is maintained in this case), to display the sub-interface A1 and the interface of the application B in a split-screen manner. Such a scenario may be simply represented as "A A->A1| B", that is, a split-screen combination A| A1 is changed to a split-screen combination A1| B.

In another example, when displaying two sub-interfaces (for example, the sub-interface A1 and a sub-interface A2) of the application A in a split-screen manner, the electronic device may prompt or recommend the user to change the split-screen combination in a case that the electronic device detects that the sub-interface A1 and an application C are frequently switched in the foreground (where display of the sub-interface A2 is maintained in this case), to display the sub-interface A1 and an interface of the application C in a split-screen manner. Such a scenario may be simply represented as "A1|A2->A1|C", that is, a split-screen combination A1|A2 is changed to a split-screen combination A1|C.

In another example, when displaying the interface of the application A and the interface of the application B in a split-screen manner, the electronic device may prompt or recommend the user to change the split-screen combination in a case that the electronic device detects that the application A and the application C are frequently switched in the foreground (where display of the interface of the application B is maintained in this case), to display the interface of the application A and the interface of the application C in a split-screen manner. Such a scenario may be simply represented as "A|B->A|C", that is, a split-screen combination A|B is changed to a split-screen combination A|C.

It is to be noted that, the foregoing descriptions are exemplary, and there may be another scenario of recommending split-screen display or scenario of prompting to switch the split-screen combination. Details may be determined according to an actual use requirement, and this is not limited in the embodiments of this application.

Figure 14A:
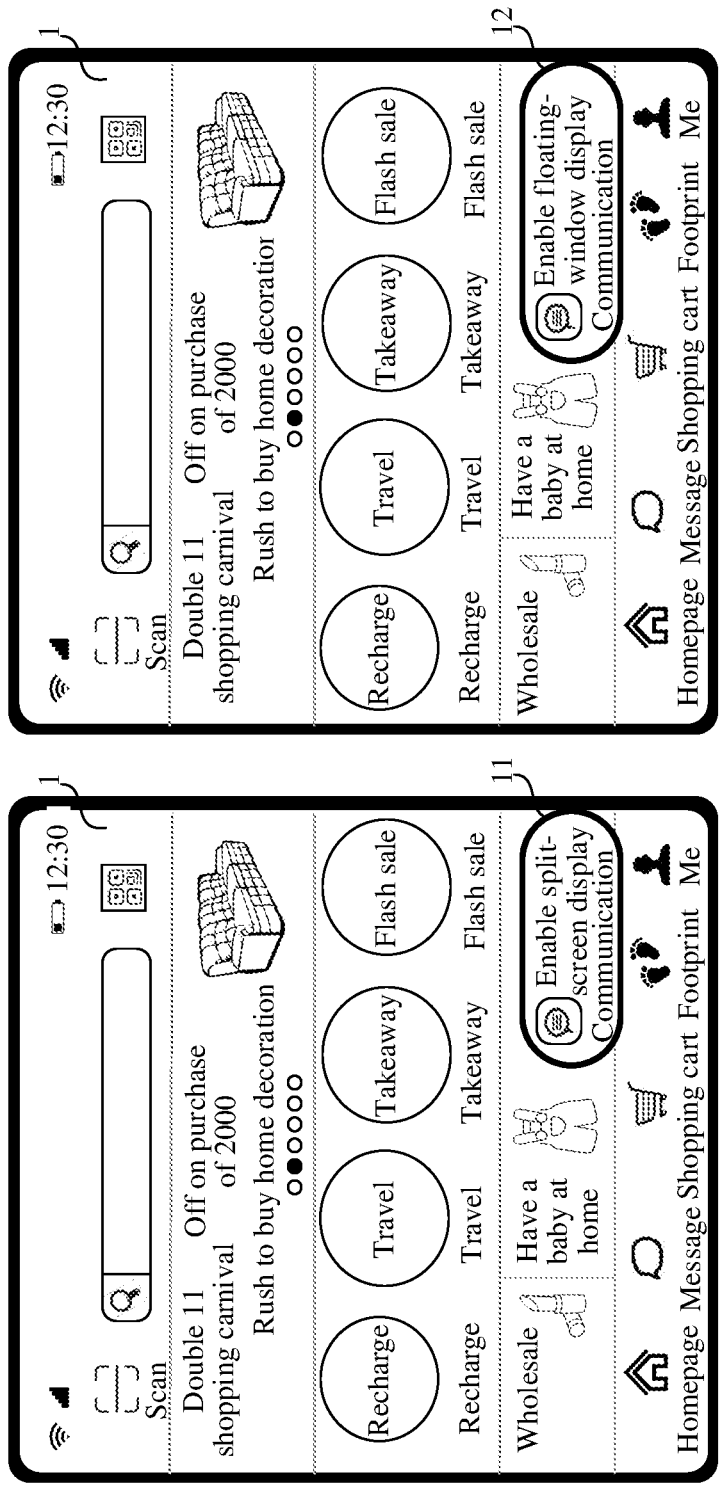
FIG. 14A to FIG. 14C are a schematic diagram of a user interface to which another application interface display method is applicable according to an embodiment of this application.
Figure 14B:
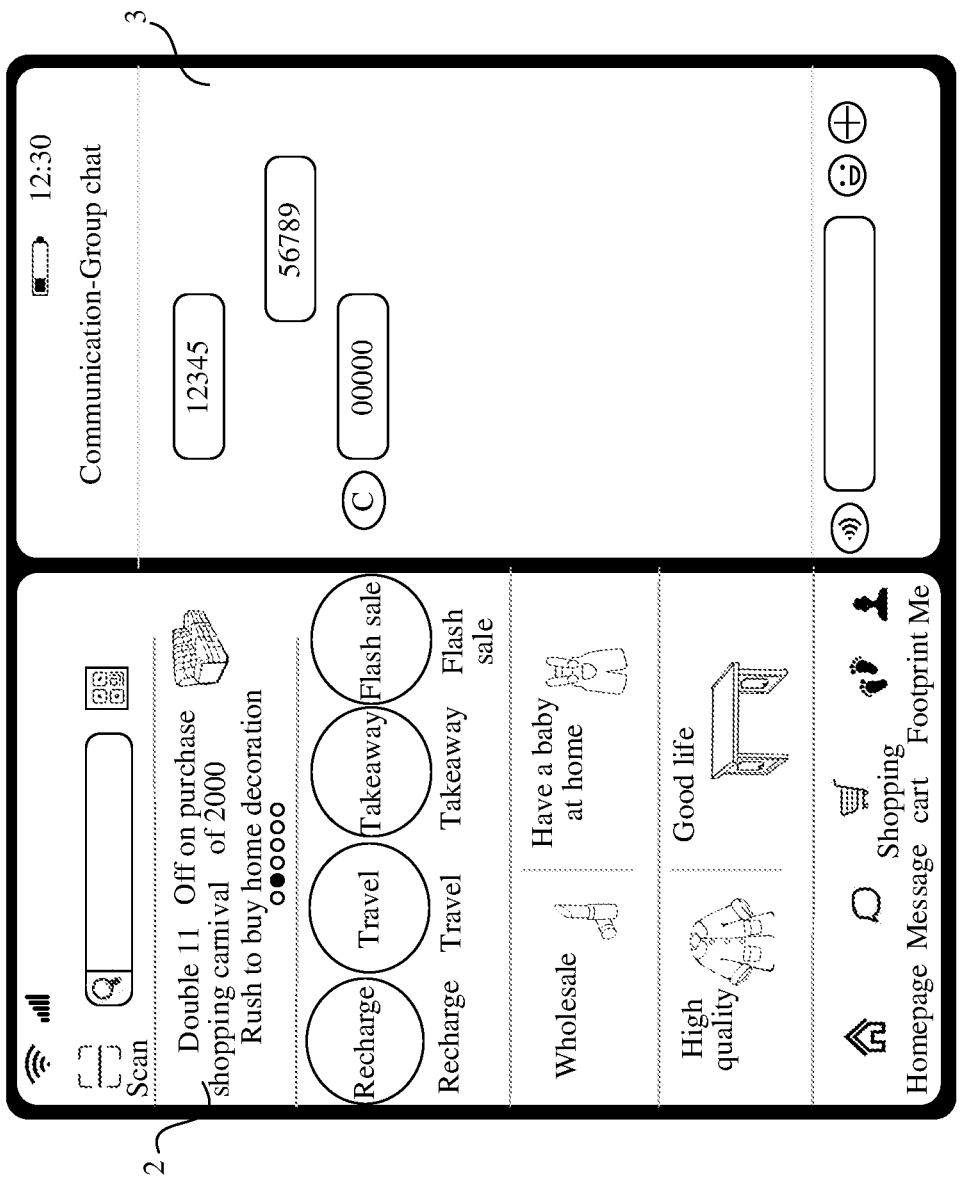
Figure 14C:
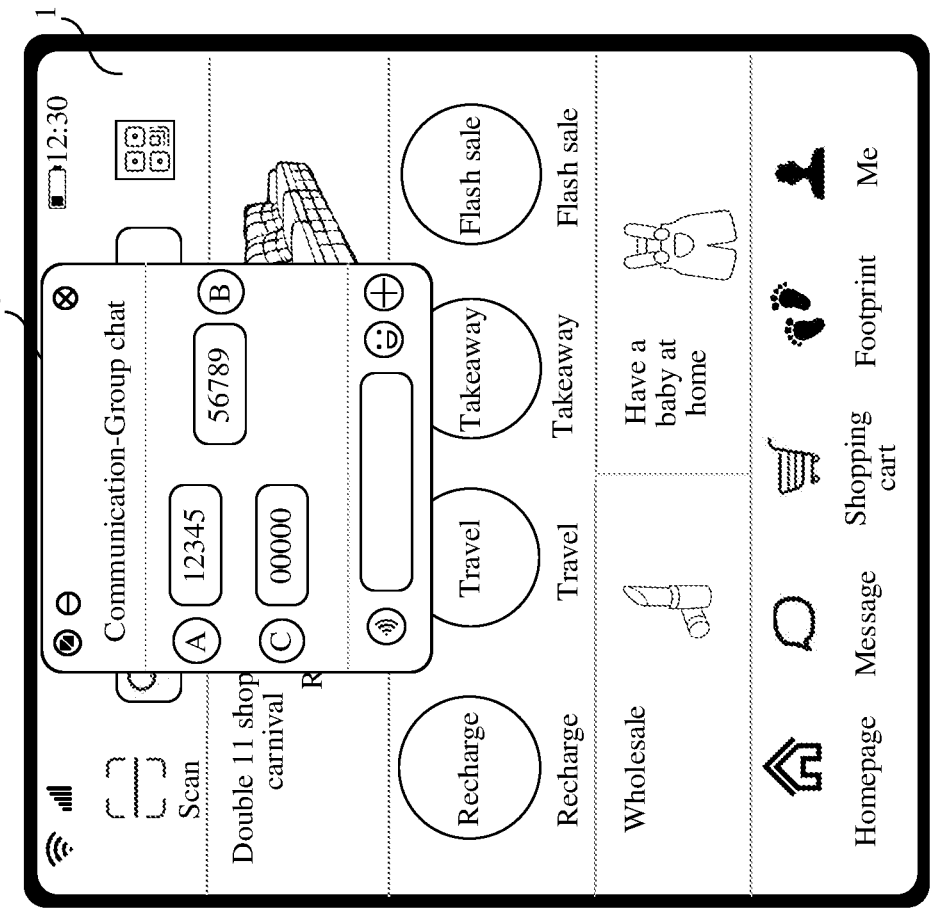

Exemplarily, the description is made with reference to FIG. 14A to FIG. 14C, a display screen 1 of the electronic device switches display of an interface of a shopping APP and an interface of a messaging APP in response to a trigger switching operation performed by the user. In a case that the electronic device determines that a quantity of times of switching between the shopping APP and the messaging APP within a preset duration is greater than or equal to a preset quantity of times, as shown in (a) of FIG. 14A, the electronic device displays a split-screen enable control 11 on the interface of the shopping APP, the split-screen enable control 11 being configured to instruct the user to trigger to enable split-screen display, to display the shopping APP and the messaging APP in a split-screen manner. Certainly, the split-screen enable control may also be displayed on the interface of the messaging APP. This is not limited herein.

Further, in a case that the user taps the split-screen enable control 11, as shown in (b) of FIG. 14B, the electronic device displays the shopping APP and the messaging APP in a split-screen manner, for example, the shopping APP is displayed in a region 2 of the display screen, and the messaging APP is displayed in a region 3 of the display screen. Certainly, the messaging APP may also be displayed in the region 2 of the display screen, and the shopping APP may be displayed in the region 3 of the display screen. This is not limited herein.

Based on the first manner, enabling of split-screen display may be prompted in a case that two APPs are frequently switched; and interfaces of the two APPs are displayed in a split-screen manner after the user triggers to enable split-screen display.

Second manner: the following steps S203B to S205B are performed in a case that a first APP and/or a second APP support floating-window display.

S203B: The electronic device displays a floating-window enable control through a display screen.

The floating-window enable control is similar to the split-screen enable control. For a specific description of the floating-window enable control, reference may be made to the specific description of the split-screen enable control. Details are not described herein again.

S204B: The electronic device receives a fourth operation on the floating-window enable control by the user.

For example, the fourth operation is a single-tap operation on the floating-window enable control by the user, or certainly may be any other operation meeting requirements. This is not limited in this application.

S205B. The electronic device displays, in response to the fourth operation, an interface of the second APP on an interface of the first APP in a form of a floating window, or displays the interface of the first APP on an interface of the second APP in the form of a floating window.

Exemplarily, the description is made with reference to FIG. 14A to FIG. 14C, a display screen 1 of the electronic device switches display of an interface of a shopping APP and an interface of a messaging APP in response to a trigger switching operation performed by the user. In a case that the electronic device determines that a quantity of times of switching between the shopping APP and the messaging APP within a preset duration is greater than or equal to a preset quantity of times, as shown in (c) of FIG. 14A, the electronic device displays a floating-window enable control 12 on the interface of the shopping APP, the floating-window enable control 12 being configured to instruct the user to trigger to enable a floating window, to display the interface of the messaging APP on the interface of the shopping APP in the form of a floating window. Certainly, the floating-window enable control may also be displayed on the interface of the messaging APP. This is not limited herein.

Further, in a case that the user taps the floating-window enable control 12, as shown in (d) of FIG. 14C, the electronic device displays the interface of the messaging APP on the interface of the shopping APP in the form of a floating window 13. Certainly, the interface of the shopping APP may also be displayed on the interface of the messaging APP in the form of a floating window. This is not limited herein.

Based on the second manner, enabling of a floating window may be prompted in a case that two APPs are frequently switched; and one APP interface of interfaces of two APPs is displayed on the other APP interface in the form of a floating window after the user triggers to enable the floating window.

Figure 15:
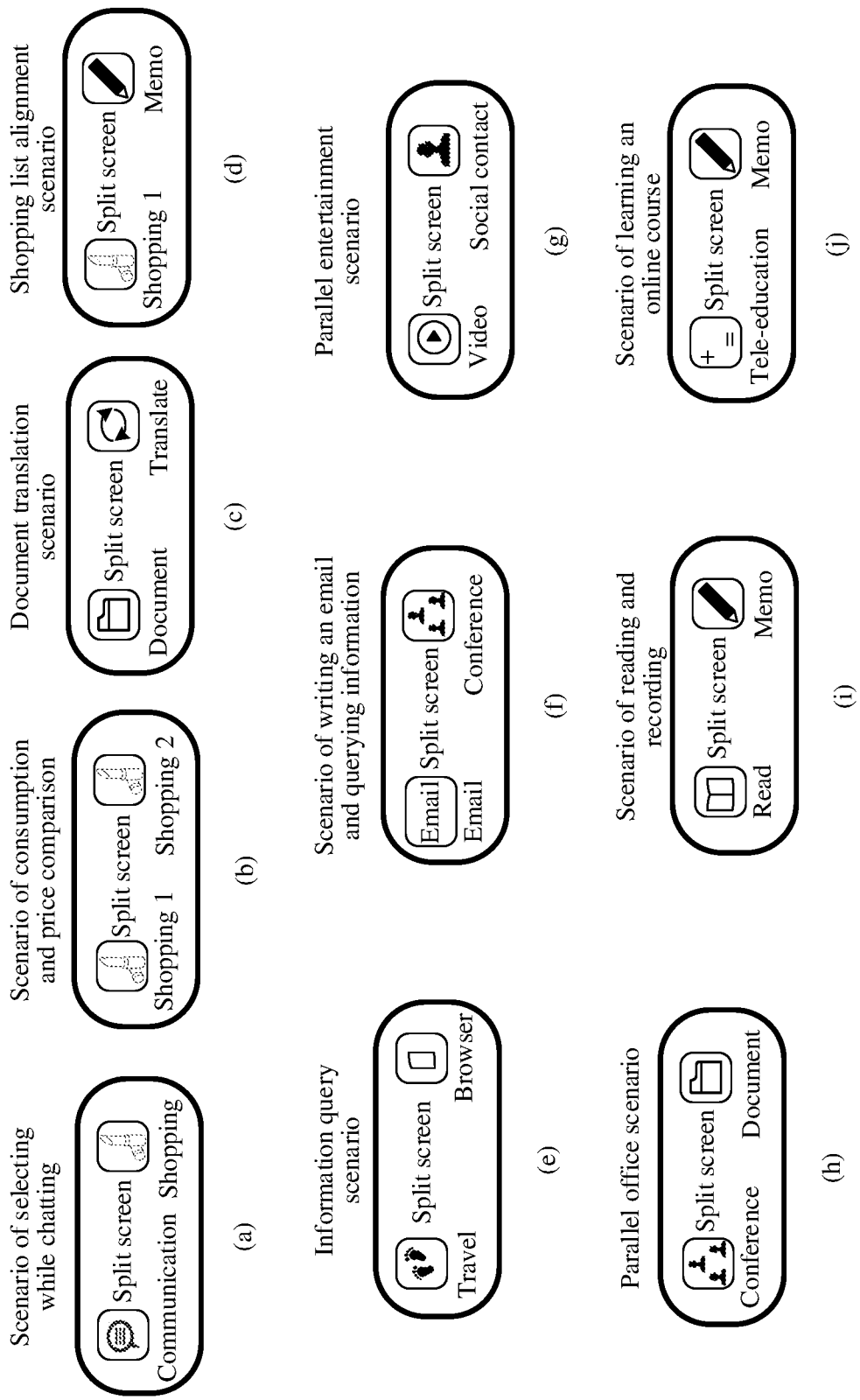
FIG. 15 is a schematic diagram of an application scenario of another application interface display method according to an embodiment of this application.

FIG. 15 exemplarily lists application scenarios of two APPs that may be frequently switched.

As shown in (a) of FIG. 15, the scenario of two APPs that are frequently switched may be a scenario of selecting while chatting, for example, the user may frequently switch between the messaging APP and the shopping APP.

As shown in (b) of FIG. 15, the scenario of two APPs that are frequently switched may be a scenario of consumption and price comparison, for example, the user may frequently switch between a shopping APP 1 and a shopping APP 2.

As shown in (c) of FIG. 15, the scenario of two APPs that are frequently switched may be a document translation scenario, for example, the user may frequently switch between a document APP and a translation APP.

As shown in (d) of FIG. 15, the scenario of two APPs that are frequently switched may be a shopping list alignment scenario, for example, the user may frequently switch between the shopping APP 1 and a memo APP (which records commodities to be bought).

As shown in (e) of FIG. 15, the scenario of two APPs that are frequently switched may be an information query scenario, for example, the user may frequently switch between a travel APP and a browser APP.

As shown in (f) of FIG. 15, the scenario of two APPs that are frequently switched may be a scenario of writing an email and querying information, for example, the user may frequently switch between an email APP and a teleconference APP.

As shown in (g) of FIG. 15, the scenario of two APPs that are frequently switched may be a parallel entertainment scenario, for example, the user may frequently switch between a video APP and a social APP.

As shown in (h) of FIG. 15, the scenario of two APPs that are frequently switched may be a parallel office scenario, for example, the user may frequently switch between the teleconference APP and the document APP.

As shown in (i) of FIG. 15, the scenario of two APPs that are frequently switched may be a scenario of reading and recording, for example, the user may frequently switch between a reading APP and the memo APP.

As shown in (j) of FIG. 15, the scenario of two APPs that are frequently switched may be a scenario of learning an online course, for example, the user may frequently switch between a tele-education APP and the memo APP.

It is to be noted that, some common application scenarios in which APPs are frequently switched are exemplarily listed above. It may be understood that the embodiments of this application include but are not limited to the listed scenarios during actual implementation. Details may be determined according to an actual use requirement, and this is not limited in the embodiments of this application.

By using the solution of this application, whether there is a split-screen requirement may be determined according to a scenario behavior of the user, and an intelligent split-screen service may be actively provided in a targeted manner after it is determined that there is a split-screen requirement, thereby achieving more efficient task parallel experience. In addition, different window form recommendations may be provided according to a current state of the user and a recommended service, thereby improving the user experience.

The first embodiment and the second embodiment are not only applicable to an electronic device including a foldable screen, but also applicable to an electronic device including a conventional display screen. Other possible implementations in which the application interface display method provided in the embodiments of this application is applied to the electronic device including a foldable screen are described below by using a third embodiment and a fourth embodiment.

Third Embodiment

Figure 16:
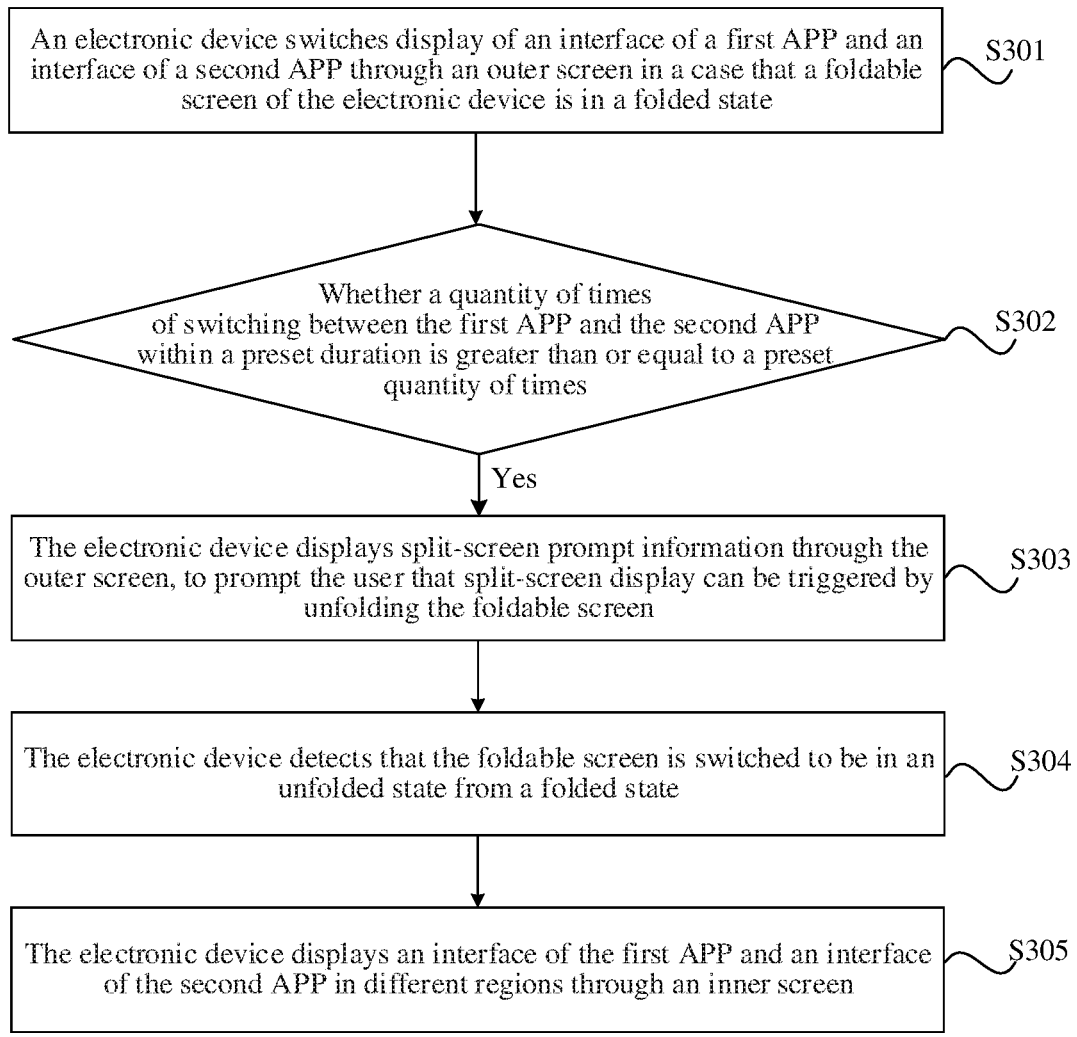
FIG. 16 is a schematic flowchart of still another application interface display method according to an embodiment of this application.

FIG. 16 is a schematic flowchart of an application interface display method according to a third embodiment of this application. As shown in FIG. 16, the method includes steps S301 to S305.

S301. An electronic device switches display of an interface of a first APP and an interface of a second APP through an outer screen in a case that a foldable screen of the electronic device is in a folded state.

S302. The electronic device determines whether a quantity of times of switching between the first APP and the second APP within a preset duration is greater than or equal to a preset quantity of times.

In some embodiments, the electronic device may switch display between at least two APPs in response to the trigger switching operation performed by the user, and two APPs having highest switching frequency or a maximum quantity of times of switching may be used as two APPs that are displayed in a split-screen manner.

The following steps S303 to S305 are performed in a case that the electronic device determines that a quantity of times of switching between the first APP and the second APP within a preset duration (for example, 1 minute) is greater than or equal to a preset quantity of times (for example, 3 times).

S303. The electronic device displays split-screen prompt information through the outer screen, the split-screen prompt information being used for prompting the user that split-screen display is capable of being triggered by unfolding the foldable screen.

Optionally, in some embodiments, in a case that the electronic device displays the split-screen prompt information, the electronic device automatically performs split-screen display if the electronic device receives, within a specific duration (for example, 5 seconds), an operation of unfolding the foldable screen by the user.

Optionally, in some embodiments, in a case that the electronic device displays the split-screen prompt information, the electronic device may automatically close or hide the split-screen function recommendation window if the electronic device does not receive any operation performed by the user within a specific duration (for example, 5 seconds).

Optionally, in some embodiments, in a case that the electronic device displays the split-screen prompt information, the user may trigger the electronic device to disable display of the split-screen prompt information based on a preset operation if the split-screen function is not required by the user. Correspondingly, the electronic device may disable or hide display of the split-screen prompt information in response to an operation performed by the user. Exemplarily, the electronic device disables display of the split-screen prompt information in response to a slide operation (such as sliding upward) on the split-screen prompt information by the user.

S304. The electronic device detects that the foldable screen is switched to an unfolded state from a folded state.

Exemplarily, by using a Hall sensor configured in the foldable screen, the electronic device may detect that the foldable screen is switched to an unfolded state from a folded state. Certainly, the electronic device may further detect state changes of the foldable screen in any other possible manner.

In a possible implementation, the electronic device may detect whether the electronic device is switched to an unfolded state from a folded state within a second preset duration after the prompt information is displayed. Step S305 may be performed in a case that the foldable screen is detected to be switched to an unfolded state from a folded state, and the split-screen function recommendation window may be closed or hidden in a case that the foldable screen is detected not to be switched to an unfolded state from a folded state.

S305. The electronic device displays an interface of the first APP and an interface of the second APP in different regions through an inner screen.

Optionally, the outer screen may be screen-off in a case that the electronic device displays the interface of the first APP and the interface of the second APP in different regions through the inner screen.

By using the solution of this application, whether there is a split-screen requirement may be determined according to a scenario behavior of the user, and an intelligent split-screen service may be actively provided in a targeted manner after it is determined that there is a split-screen requirement, thereby achieving more efficient task parallel experience.

By using the solution provided in the third embodiment, in a case that the outer screen of the foldable screen displays interfaces of APPs in a screen-on state, if the electronic device detects that two APPs are frequently switched, the electronic device may prompt the user to trigger split-screen display by unfolding the foldable screen. Further, the user unfolds the foldable screen. Correspondingly, the electronic device may detect that the foldable screen is unfolded, and then the electronic device turns on the inner screen and displays the two APPs in different regions of the inner screen. In this way, split-screen display may be quickly triggered in a case that there is a split-screen requirement in a folded state.

The application interface display method provided in the third embodiment is exemplarily described below with reference to FIG. 17A and FIG. 17B.

Figure 17A:
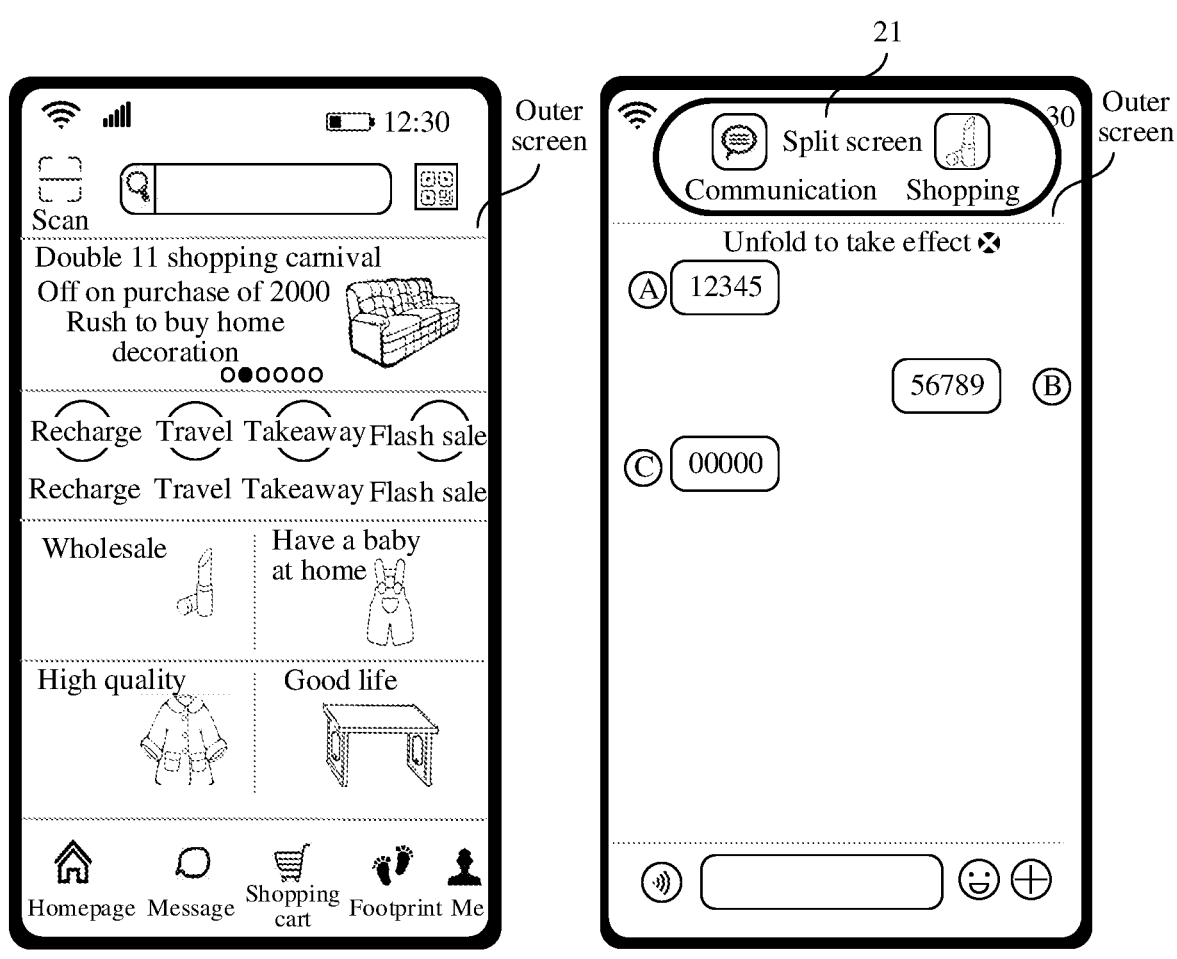
FIG. 17A and FIG. 17B are a schematic diagram of a user interface to which still another application interface display method is applicable according to an embodiment of this application.
Figure 17A:
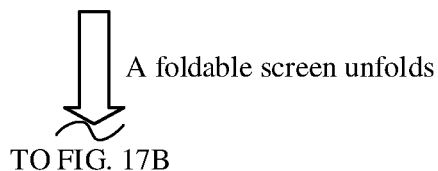

As shown in (a) of FIG. 17A, the foldable screen of the electronic device is in a folded state, and the electronic device displays an interface of an APP such as a shopping APP through the outer screen. In a case that the electronic device detects that the shopping APP and a messaging APP are frequently switched (that is, a quantity of times of switching between the shopping APP and the messaging APP within a preset duration is greater than or equal to a preset quantity of times), as shown in (b) of FIG. 17A, the electronic device may display split-screen prompt information 21 through the outer screen, where the split-screen prompt information 21 displays an icon of the shopping APP and an icon of the messaging APP, and the split-screen prompt information 21 is used for prompting the user that split-screen display may be triggered by unfolding the foldable screen. It is to be noted that, the electronic device may also display the split-screen prompt information 21 in a case that the interface of the shopping APP is switched for display.

Figure 17B:
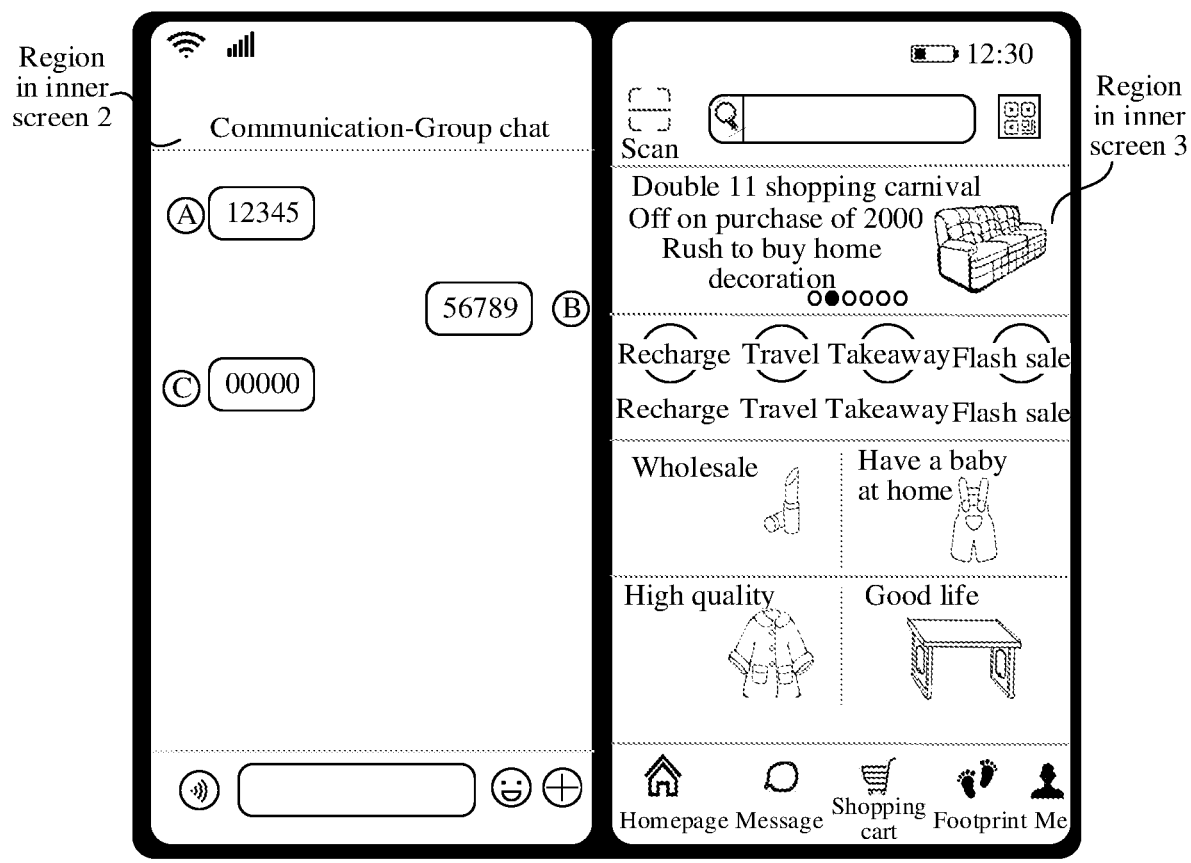

Further, as shown in (c) of FIG. 17B, the electronic device performs split-screen display (that is, displaying in different regions) through the inner screen in a case that the electronic device detects that the foldable screen is switched to an unfolded state from a folded state, for example, the interface of the messaging APP is displayed in a region 2 of the inner screen, and the interface of the shopping APP is displayed in a region 3 of the inner screen. Certainly, the electronic device may also display the interface of the shopping APP in the region 2 of the inner screen, and display the interface of the messaging APP in the region 3 of the inner screen. This is not limited in the embodiments of this application.

Based on the third embodiment, in a case that the electronic device is in a folded state, when detecting that two APPs are frequently switched, the electronic device may determine that there may be a split-screen requirement in a current application scenario and prompt the user that split-screen display of interfaces of the two APPs may be quickly triggered by unfolding the foldable screen, thereby improving convenience and flexibility of using the foldable screen by the user.

The third embodiment describes a scenario in which when determining that there is a split-screen requirement in a folded state, the electronic device prompts the user to quickly trigger split-screen display, and another scenario in which when determining that there is a split-screen requirement in a folded state, the electronic device prompts the user to quickly trigger split-screen display is described below by using a fourth embodiment.

Fourth Embodiment

Figure 18:
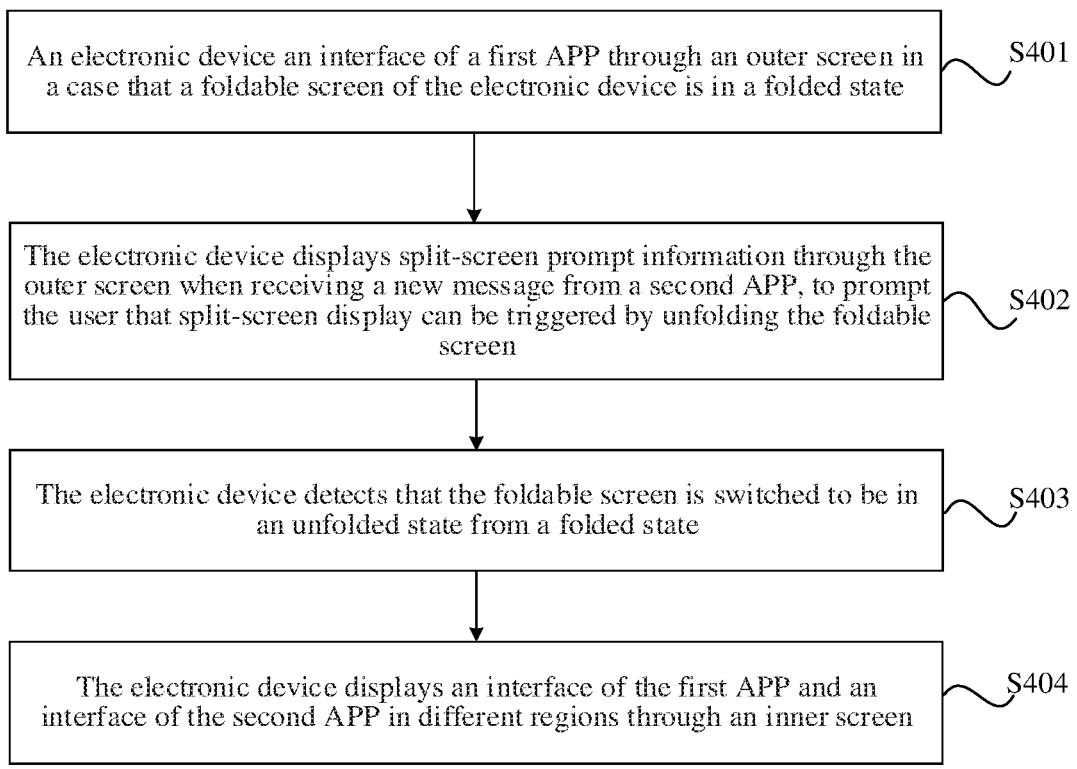
FIG. 18 is a schematic flowchart of yet another application interface display method according to an embodiment of this application.

FIG. 18 is a schematic flowchart of an application interface display method according to a fourth embodiment of this application. As shown in FIG. 18, the method includes steps S401 to S404.

S401. An electronic device displays an interface of a first APP through an outer screen in a case that a foldable screen of the electronic device is in a folded state.

S402. The electronic device displays split-screen prompt information through the outer screen when receiving a new message from a second APP, the split-screen prompt information being used for prompting the user that split-screen display is capable of being triggered by unfolding the foldable screen.

For example, the second APP may be a short message APP, or a messaging APP, or may be another APP that can support sending and receiving messages or pushing messages. Details may be determined according to an actual use requirement, and this is not limited in the embodiments of this application.

S403. The electronic device detects that the foldable screen is switched to an unfolded state from a folded state.

Exemplarily, by using a Hall sensor configured in the foldable screen, the electronic device may detect that the foldable screen is switched to an unfolded state from a folded state. Certainly, the electronic device may further detect state changes of the foldable screen in any other possible manner.

S404. The electronic device displays an interface of the first APP and an interface of the second APP in different regions through an inner screen.

Optionally, the outer screen may be screen-off in a case that the electronic device displays the interface of the first APP and the interface of the second APP in different regions through the inner screen.

In this embodiment of this application, when displaying an application A in a folded state through the outer screen, in a case that the electronic device receives a new message notification or prompt box from an application B (such as social software, a short message, and the like), the electronic device may prompt the user to unfold the foldable screen to trigger split-screen display of the application A and the application B.

Exemplarily, in a case that the electronic device prompts the user to unfold the foldable screen to trigger split-screen display of the application A and the application B, the electronic device detects that the foldable screen is unfolded in 5 seconds, and A/B is displayed in a split-screen manner through the inner screen, so that the user may view or reply new messages without exiting a current application interface.

Exemplarily, in a case that the electronic device prompts the user to unfold the foldable screen to trigger split-screen display of the application A and the application B, the electronic device triggers disappearing of the new message prompt box if the electronic device does not receive an operation performed by the user within 5 seconds. In this case, split-screen display may not be performed on the inner screen in a case that the user unfolds the foldable screen. Optionally, the inner screen displays the application A in a full-screen manner.

Exemplarily, in a case that the electronic device prompts the user to unfold the foldable screen to trigger split-screen display of the application A and the application B, the electronic device triggers disappearing of the new message prompt box if the electronic device receives an upward slide operation on the new message prompt box by the user.

Optionally, the split-screen prompt information may be displayed in the new message prompt box, or may be displayed independently from the new message prompt box. Details may be determined according to an actual use requirement, and this is not limited in the embodiments of this application.

By using the solution provided in the fourth embodiment, in a case that the outer screen of the foldable screen displays interfaces of APPs in a screen-on state, if the electronic device receives a new message, the electronic device may prompt the user to trigger split-screen display by unfolding the foldable screen. Further, the user unfolds the foldable screen. Correspondingly, the electronic device may detect that the foldable screen is unfolded, and then the electronic device turns on the inner screen and displays a current displayed APP and an interface of the new message in different regions of the inner screen. In this way, split-screen display may be quickly triggered in a case that there is a split-screen requirement in a folded state.

The application interface display method provided in the third embodiment is exemplarily described below with reference to FIG. 19A and FIG. 19B.

Figure 19A:
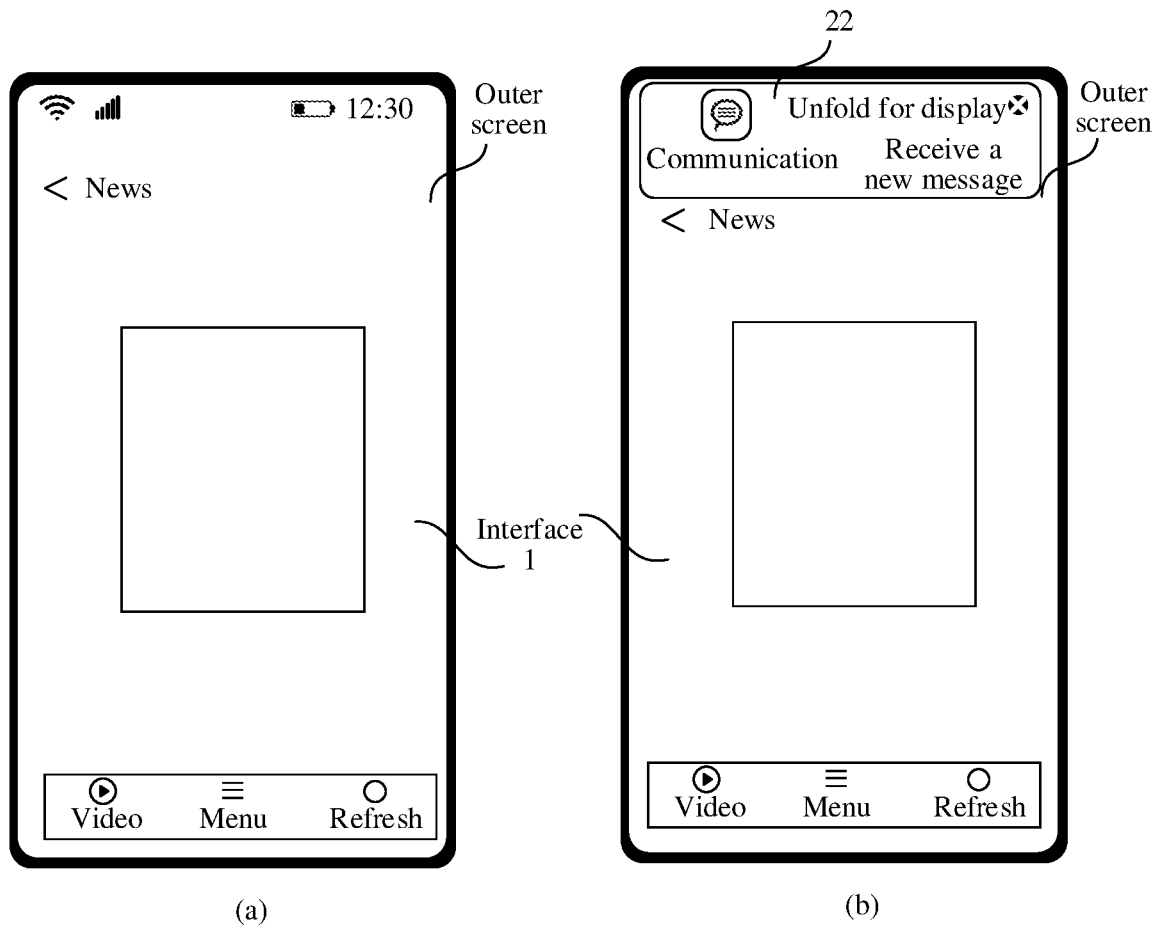
FIG. 19A and FIG. 19B are a schematic diagram of a user interface to which yet another application interface display method is applicable according to an embodiment of this application.
Figure 19A:
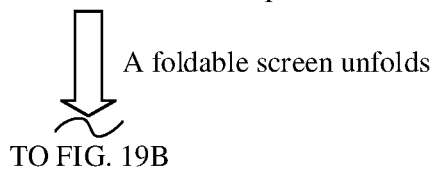

As shown in (a) of FIG. 19A, the foldable screen of the electronic device is in a folded state, and the electronic device displays an interface 1 of an APP such as a browser APP through the outer screen. In a case that the electronic device receives a new message corresponding to a messaging APP, as shown in (b) of FIG. 19A, the electronic device may display split-screen prompt information 22 through the outer screen, where the split-screen prompt information 22 displays an icon of the messaging APP, and the split-screen prompt information 22 may be used for prompting the user that split-screen display may be triggered by unfolding the foldable screen.

Figure 19B:
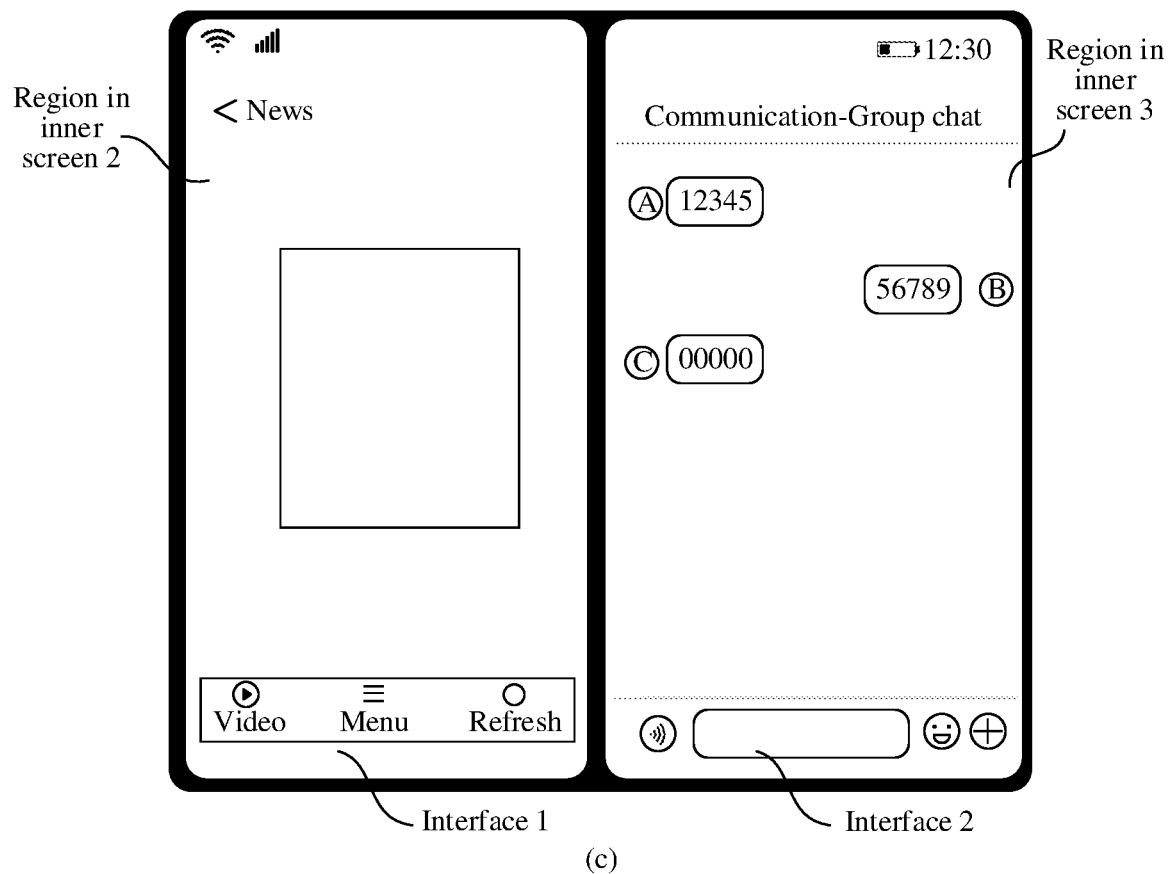

Further, as shown in (c) of FIG. 19B, the electronic device performs split-screen display (that is, displaying in different regions) through the inner screen in a case that the electronic device detects that the foldable screen is switched to an unfolded state from a folded state, for example, an interface 1 of the browser APP is displayed in a region 2 of the inner screen, and an interface 2 (for example, a page on which the new message is received) of the messaging APP is displayed in a region 3 of the inner screen. Certainly, the electronic device may also display the interface of the messaging APP in the region 2 of the inner screen, and display the interface of the browser APP in the region 3 of the inner screen. This is not limited in the embodiments of this application.

By using the solution of this application, whether there is a split-screen requirement may be determined according to a scenario behavior of the user, and an intelligent split-screen service may be actively provided in a targeted manner after it is determined that there is a split-screen requirement, thereby achieving more efficient task parallel experience.

Based on the fourth embodiment, in a case that the electronic device in a folded state displays an APP, when receiving a new message, the electronic device may determine that the user may have a requirement of intending to retain a current interface and view the new message. In other words, there is a split-screen requirement in a current application scenario. In this case, the electronic device may prompt the user that split-screen display may be quickly triggered by unfolding the foldable screen, thereby improving convenience and flexibility of using the foldable screen by the user.

Figure 20:
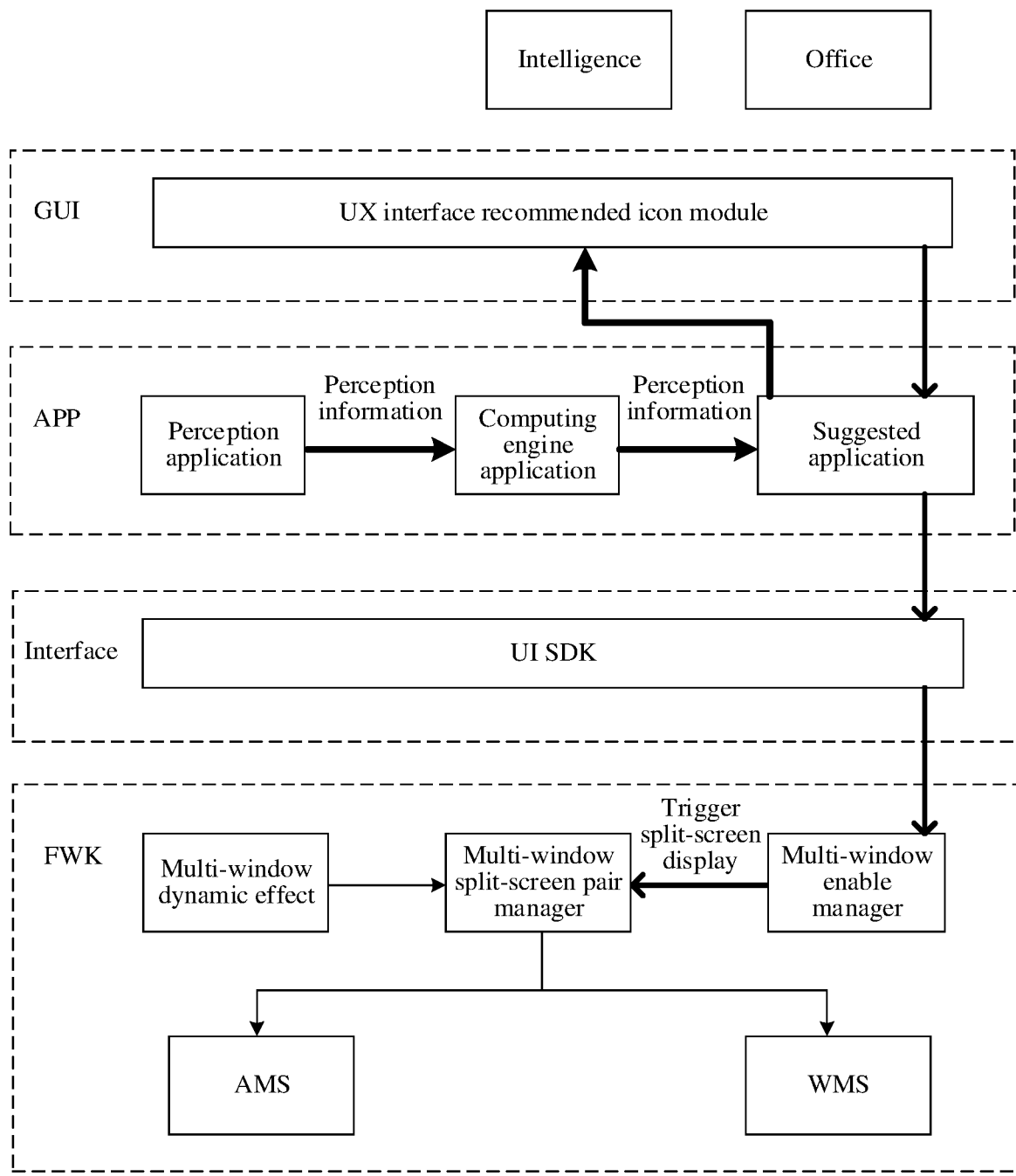
FIG. 20 is a schematic architectural diagram of an operating system to which an application interface display method is applicable according to an embodiment of this application.

FIG. 20 is a schematic diagram of a system framework to which an application interface display method is applicable according to an embodiment of this application. The system framework may include a graphical user interface (graphical user interface, GUI) layer, an APP layer, an interface (interface) layer, a framework (framework, FWK) layer.

A perception application module in the APP layer transmits perception information (for example, information for representing that two applications are frequently switched or information for representing that selecting text or a picture on a current interface) to a computing engine application module, the computing engine application module transmits the perception information to a suggested application module, and then the suggested application module reports the perception information to a user experience (user experience, UX) interface recommended icon module of the GUI layer. The UX interface recommended icon module displays an identifier of an APP recommended based on the perception information or displays a split-screen enable control.

Further, when detecting an operation on the identifier of the APP or the split-screen enable control by the user, the UX interface recommended icon module delivers split-screen instruction information to the suggested application module of the APP layer, the suggested application module delivers the split-screen instruction information to a user interface (user interface, UI) software development kit (software development kit, SDK) module of the interface layer, the UI SDK module invokes a corresponding interface program to deliver the split-screen instruction information to a multi-window enable manager module of the FWK layer, and then the multi-window enable manager module triggers a multi-window split-screen pair manager module according to the split-screen instruction information, to implement a split-screen display function.

A multi-window dynamic effect module of the FWK layer may provide a multi-window dynamic effect function for the multi-window split-screen pair manager module. In addition, the multi-window split-screen pair manager module may invoke services of an activity manager service (activity manager service, AMS) module and a window manager service (window manager service, WMS) module, to implement the split-screen display function.

It may be understood that, a system architecture shown in FIG. 20 in this embodiment of this application may not constitute a specific limitation. In some other embodiments of this application, the system architecture may include more or fewer modules than those shown in the figure, or some modules may be combined, or some modules may be split, or modules are arranged in different manners.

It is to be further noted that, in the embodiments of this application, "greater than" may be replaced with "greater than or equal to", and "less than or equal to" may be replaced with "less than". Alternatively, "greater than or equal to" may be replaced with "greater than", and "less than" may be replaced with "less than or equal to".

Each embodiment described herein may be an independent solution, or may be combined according to an internal logic, and such solutions all fall within the protection scope of this application.

It may be understood that, the methods and operations implemented by the electronic device in the foregoing method embodiments may also be implemented by a component (for example, a chip or a circuit) that can be used in the electronic device.

The method embodiments provided in this application are described above, and apparatus embodiments provided in this application are described below. It should be understood that, the descriptions of the apparatus embodiments correspond to the descriptions of the method embodiments. Therefore, for content not described in detail, reference may be made to the foregoing method embodiments. For brevity, details are not described herein again.

The solutions provided in the embodiments of this application are mainly described above from a perspective of method steps. It may be understood that, to implement the foregoing functions, the electronic device implementing the method includes corresponding hardware structures and/or software modules for performing the functions. A person skilled in the art may be aware that, in combination with the units and algorithm steps of the examples described in the embodiments disclosed in this specification, this application can be implemented by hardware or a combination of hardware and computer software. Whether a function is implemented by hardware or computer software driving hardware depends on particular applications and design constraints of the technical solutions. A person skilled in the art may use different methods to implement the described functions for each particular application, but it should not be considered that the implementation goes beyond the protection scope of this application.

In the embodiments of this application, function modules of the electronic device may be divided based on the foregoing method example. For example, each function module may be divided according to each function, or two or more functions may be integrated into one processing module. The integrated module may be implemented in the form of hardware, or may be implemented in a form of a software functional module. It is to be noted that, module division in the embodiments of this application is an example, and is only logical function division. During actual implementation, there may be another division manner. The following descriptions are made by using an example in which function modules are divided corresponding to functions.

Figure 21:
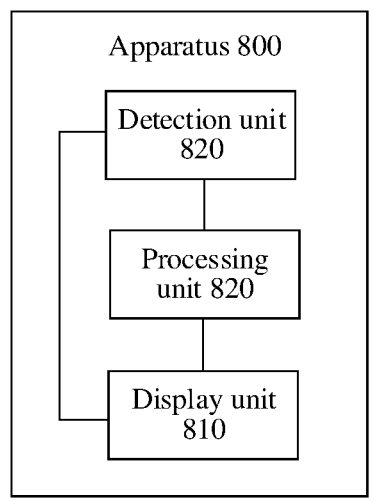
FIG. 21 is a schematic structural diagram of an application interface display apparatus according to an embodiment of this application.

FIG. 21 is a schematic block diagram of an application interface display apparatus 800 according to an embodiment of this application. The apparatus 800 may be configured to perform actions performed by the electronic device in the foregoing method embodiments. The apparatus 800 includes a display unit 810, a detection unit 820, and a processing unit 830.

The display unit 810 is configured to display an interface of a first application on a display screen; [00342] the detection unit 820 is configured to receive a first operation performed by a user on a target object in the interface of the first application; and [00343] the processing unit 830 is configured to instruct, in response to the first operation, the display unit 810 to display a second application identifier on the display screen.

The display unit 810 is further configured to display the second application identifier on the display screen based on the instruction of the processing unit 830, a second application corresponding to the second application identifier being an application recommended based on the target object; [00345] the detection unit 820 is further configured to receive a second operation performed by the user on the second application identifier; and [00346] the processing unit 830 is further configured to instruct, in response to the second operation, the display unit 810 to simultaneously display an interface of the first application and an interface of the second application on the display screen.

The display unit 810 is further configured to simultaneously display the interface of the first application and the interface of the second application on the display screen according to the instruction of the processing unit 830.

By using the solution of this application, according to an operation (for example, selection or copy) performed by the user on an object (for example, text or a picture) displayed on a current interface, a related application may be recommended, based on the target object, to the user for selection. When selecting a recommended application, the user may trigger simultaneous display (for example, split-screen display or floating-window display) of the current interface and an interface of the recommended application. In this application, a split-screen requirement may be determined according to a scenario behavior of the user, and then a recommended application and an intelligent split-screen service may be actively provided in a targeted manner, to achieve more efficient task parallel experience, thereby improving user experience.

The apparatus 800 according to this embodiment of this application may correspondingly perform the method described in the embodiments of this application, and the foregoing and other operations and/or functions of the units in the apparatus 800 are respectively used for implementing corresponding procedures in the method. For brevity, details are not described herein again.

Figure 22:
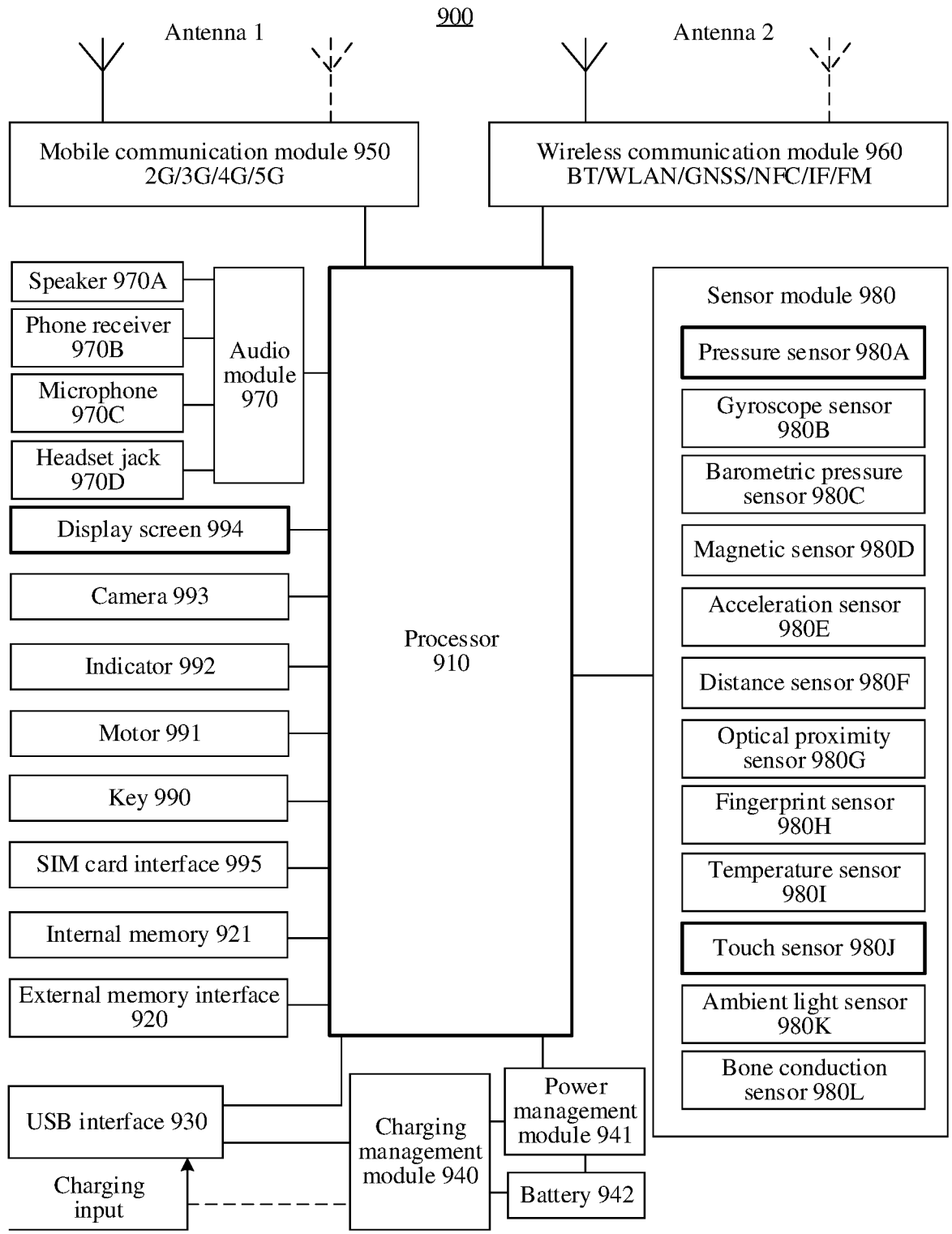
FIG. 22 is a schematic structural diagram of an electronic device according to an embodiment of this application.

FIG. 22 is a schematic structural diagram of an electronic device 900 according to an embodiment of this application. The electronic device 900 may include a processor 910, an external memory interface 920, an internal memory 921, a universal serial bus (universal serial bus, USB) interface 930, a charging management module 940, a power management unit 941, a battery 942, an antenna 1, an antenna 2, a mobile communication module 950, a wireless communication module 960, an audio module 970, a speaker 970A, a phone receiver 970B, a microphone 970C, a headset jack 970D, a sensor module 980, a key 990, a motor 991, an indicator 992, a camera 993, a display screen 994, a subscriber identity module (subscriber identification module, SIM) card interface 995, and the like. The sensor module 980 may include a pressure sensor 980A, a gyroscope sensor 980B, a barometric pressure sensor 980C, a magnetic sensor 980D, an acceleration sensor 980E, a distance sensor 980F, an optical proximity sensor 980G, a fingerprint sensor 980H, a temperature sensor 980I, a touch sensor 980J, an ambient light sensor 980K, a bone conduction sensor 980L, and the like.

It may be understood that the schematic structure in this embodiment of this application constitutes no specific limitation on the electronic device 900. In some other embodiments of this application, the electronic device 900 may include more or fewer components than those shown in the figure, or some components may be combined, or some components may be split, or components are arranged in different manners. The components in the figure may be implemented by hardware, software, or a combination of software and hardware.

The processor 910 may include one or more processing units. For example, the processor 910 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU), and the like. Different processing units may be independent devices, or may be integrated into one or more processors. The controller may be a nerve center and a command center of the electronic device 900. The controller may generate an operation control signal based on an instruction operation code and a timing signal, and read an instruction and control execution of the instruction.

A memory may be further configured in the processor 910, to store an instruction and data. In some embodiments, the memory in the processor 910 is a cache. The memory may store an instruction or data that is just used or circularly used by the processor 910. If the processor 910 needs to use the instruction or the data again, the processor may directly invoke the instruction or the data from the memory, to avoid repeated access, and reduce a waiting time of the processor 910, thereby improving system efficiency.

In some embodiments, the processor 910 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like. It may be understood that a schematic interface connection relationship between the modules in this embodiment of this application is merely an example for description, and constitutes no limitation on the structure of the electronic device 900. In some other embodiments of this application, the electronic device 900 may alternatively use an interface connection manner different from that in the foregoing embodiment, or use a combination of a plurality of interface connection manners.

The charging management module 940 is configured to receive a charging input from a charger. The charger may be a wireless charger or a wired charger. In some embodiments of wired charging, the charging management module 940 may receive a charging input of a wired charger by using the USB interface 930. In some embodiments of wireless charging, the charging management module 940 may receive a wireless charging input by using a wireless charging coil of the electronic device 900. The charging management module 940 may supply power for the electronic device by using the power management unit 941 while charging the battery 942.

The power management unit 941 is configured to connect to the battery 942, the charging management module 940, and the processor 910. The power management unit 941 receives an input of the battery 942 and/or the charging management module 940, to supply power to the processor 910, the internal memory 921, an external memory, a display screen 994, the camera 993, the wireless communication module 960, and the like. The power management unit 941 may be further configured to monitor parameters such as a battery capacity, a cycle count of a battery, and a battery health state (leakage and impedance). In some other embodiments, the power management unit 941 may be alternatively disposed in the processor 910. In some other embodiments, the power management unit 941 and the charging management module 940 may be alternatively disposed in a same component.

A wireless communication function of the electronic device 900 may be implemented by using the antenna 1, the antenna 2, the mobile communication module 950, the wireless communication module 960, the modem processor, the baseband processor, and the like.

The antenna 1 and the antenna 2 are configured to transmit and receive an electromagnetic wave signal. Each antenna in the electronic device 900 may be configured to cover one or more communication frequency bands. Different antennas may also be multiplexed to improve utilization of the antennas. For example, the antenna 1 may be multiplexed as a diversity antenna of a wireless local area network. In some other embodiments, the antenna may be used in combination with a tuning switch.

The mobile communication module 950 may provide a solution to wireless communication such as 2G/3G/4G/5G applied to the electronic device 900. The mobile communication module 950 may include at least one filter, a switch, a power amplifier, a low noise amplifier (low noise amplifier, LNA), and the like. The mobile communication module 950 may receive an electromagnetic wave through the antenna 1, perform processing such as filtering and amplification on the received electromagnetic wave, and transmit a processed electromagnetic wave to the modem processor for demodulation. The mobile communication module 950 may further amplify a signal modulated by the modem processor, and convert the signal into an electromagnetic wave for radiation through the antenna 1. In some embodiments, at least some functional modules of the mobile communication module 950 may be arranged in the processor 910. In some embodiments, at least some functional modules of the mobile communication module 950 and at least some modules of the processor 910 may be arranged in the same device.

The modem processor may include a modulator and a demodulator. The modulator is configured to modulate a to-be-sent low-frequency baseband signal into a medium-high-frequency signal. The demodulator is configured to demodulate a received electromagnetic wave signal into a low-frequency baseband signal. Next, the demodulator transmits the demodulated low-frequency baseband signal to the baseband processor for processing. The low-frequency baseband signal is processed by the baseband processor and then transmitted to an AP. The application processor outputs a sound signal through an audio device (which is not limited to the speaker 970A, the phone receiver 970B, and the like), or displays an image or a video through the display screen 994. In some embodiments, the modem processor may be an independent device. In some other embodiments, the modem processor may be independent of the processor 910, and the modem processor and the mobile communication module 950 or another functional module may be disposed in the same component.

The wireless communication module 960 may provide a solution for wireless communication applied to the electronic device 900, including a WLAN (such as Wi-Fi), BT, a global navigation satellite system (global navigation satellite system, GNSS), FM, NFC, a general 2.4G/5G wireless communication technology, and the like. The wireless communication module 960 may be one or more components into which at least one communication processing module is integrated. The wireless communication module 960 receives an electromagnetic wave by using the antenna 2, performs frequency modulation and filtering processing on an electromagnetic wave signal, and sends a processed signal to the processor 910. The wireless communication module 960 may further receive a to-be-sent signal from the processor 910, perform frequency modulation and amplification on the signal, and convert the signal into an electromagnetic wave for radiation through the antenna 2.

In some embodiments, the wireless communication module 960 may be Wi-Fi and/or a Bluetooth chip. The electronic device 900 may establish a connection to an electronic device such as a wireless headset through the chip, to implement wireless communication and service processing between the electronic device 900 and another electronic device through connection. The Bluetooth chip may generally support BR/EDR Bluetooth and BLE.

In some embodiments, in the electronic device 900, the antenna 1 is coupled to the mobile communication module 950, and the antenna 2 is coupled to the wireless communication module 960, so that the electronic device 900 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, and/or IR technologies, and the like. The GNSS may include a global positioning system (global positioning system, GPS), a global navigation satellite system (global navigation satellite system, GLONASS), a Beidou navigation satellite system (beidou navigation satellite system, BDS), a quasi-zenith satellite system (quasi-zenith satellite system, QZSS) and/or satellite-based augmentation systems (SBAS).

The electronic device 900 implements a display function by using the GPU, the display screen 994, the application processor, and the like. The GPU is a microprocessor for image processing, and is connected to the display screen 994 and the AP. The GPU is configured to perform mathematical and geometric calculation, and is configured to render graphics. The processor 910 may include one or more GPUs, and execute program instructions to generate or change display information.

The display screen 994 is configured to display an image, a video, and the like. The display screen 994 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flex light-emitting diode (flex light-emitting diode, FLED), a mini LED, a micro LED, a micro-OLED, a quantum dot light emitting diode (quantum dot light emitting diode, QLED), or the like. In some embodiments, the electronic device 900 may include one or N display screens 994, and N is a positive integer greater than 1.

The electronic device 900 can implement a photographing function by using the ISP, the camera 993, the video codec, the GPU, the display screen 994, the application processor, and the like.

The ISP is configured to process data fed back by the camera 993. For example, during photographing, a shutter is enabled. Light is transferred to a photosensitive element of the camera through a lens, and an optical signal is converted into an electrical signal. The photosensitive element of the camera transfers the electrical signal to the ISP for processing, and therefore, the electrical signal is converted into an image visible to a naked eye. The ISP may also optimize noise point, brightness, and skin tone algorithms. The ISP may also optimize parameters such as exposure and color temperature of a shooting scene. In some embodiments, the ISP may be disposed in the camera 993.

The camera 993 is configured to capture a static image or a video. An optical image of an object is generated through a lens and is projected to the photosensitive element. The photosensitive element may be a charge coupled device (charge coupled device, CCD) or a complementary metal-oxide-semiconductor (complementary metal-oxide-semiconductor, CMOS) phototransistor. The light-sensitive element converts an optical signal into an electrical signal, and then transmits the electrical signal to the ISP, so that the ISP converts the electrical signal into a digital image signal. The ISP outputs the digital image signal to the DSP for processing. The DSP converts the digital image signal into a standard image signal in RGB and YUV formats. In some embodiments, the electronic device 900 may include one or N cameras 993, and N is a positive integer greater than 1.

The digital signal processor is configured to process a digital signal, and in addition to a digital image signal, may further process another digital signal. For example, when the electronic device 900 performs frequency selection, the DSP is configured to perform Fourier transform and the like on frequency energy.

The video codec is configured to compress or decompress a digital video. The electronic device 900 may support one or more video codecs. In this way, the electronic device 900 may play or record videos in a plurality of encoding formats, for example, moving picture experts group (moving picture experts group, MPEG) 1, MPEG 2, MPEG 3, and MPEG 4.

The NPU is a neural-network (neural-network, NN) computing processor, quickly processes input information by referring to a structure of a biological neural network, for example, a transmission mode between neurons in a human brain, and may further continuously perform self-learning. The NPU may be used to implement an application such as intelligent cognition of the electronic device 900, for example, image recognition, facial recognition, voice recognition, and text understanding.

The external memory interface 920 may be configured to connect to an external storage card, for example, a micro SD card, to expand a storage capability of the electronic device 900. The external storage card communicates with the processor 910 by using the external memory interface 920, to implement a data storage function, for example storing a file such as a music or a video in the external storage card.

The internal memory 921 may be configured to store computer executable program code, where the executable program code includes an instruction. The processor 910 runs the instruction stored in the internal memory 921, to perform various function applications and data processing of the electronic device 900. The internal memory 921 may include a program storage region and a data storage region. The program storage area may store an operating system, an application required by at least one function (for example, a sound playing function or an image playing function), and the like. The data storage region may store data (for example, audio data and an address book) and the like created when the electronic device 900 is used. In addition, the internal memory 921 may include a high-speed random access memory, and may also include a non-volatile memory, for example, at least one magnetic disk storage device, a flash memory device, or a universal flash storage (universal flash storage, UFS), and the like.

The processor 910 may be configured to execute the foregoing program code, and invoke related modules to implement functions of the electronic device in the embodiments of this application, for example, establishing a plurality of communication links with another electronic device; and transmitting data of the preset service to the another electronic device through the plurality of communication links in a case that there is a preset service (for example, a file transmission service, and the like).

The electronic device 900 may implement an audio function by using the audio module 970, the speaker 970A, the phone receiver 970B, the microphone 970C, the headset jack 970D, the application processor, and the like. for example, music playback and sound recording.

The audio module 970 is configured to convert digital audio information into an analog audio signal output, and is further configured to convert an analog audio input into a digital audio signal. The audio module 970 may be further configured to encode and decode an audio signal. In some embodiments, the audio module 970 may be disposed in the processor 910, or some functional modules of the audio module 970 are disposed in the processor 910.

The speaker 970A, also referred to as a "speaker", is configured to convert an audio electrical signal into a sound signal. Music can be listened to or a hands-free call can be answered by using the speaker 970A in the electronic device 900.

The phone receiver 970B, also referred to as a "receiver", is configured to convert an audio electrical signal into a sound signal. When the electronic device 900 is configured to answer a call or receive voice information, the phone receiver 970B may be put close to a human ear to receive a voice.

The microphone 970C, also referred to as a "microphone", is configured to convert a sound signal into an electrical signal. When making a call or sending voice information, a user may speak with the mouth approaching the microphone 970C, to input a sound signal to the microphone 970C. At least one microphone 970C may be disposed in the electronic device 900. In some other embodiments, two microphones 970C may be disposed in the electronic device 900, to collect a sound signal and implement a noise reduction function. In some other embodiments, three, four, or more microphones 970C may be alternatively disposed in the electronic device 900, to collect a sound signal, implement noise reduction, recognize a sound source, implement a directional recording function, and the like.

The headset jack 970D is configured to connect to a wired headset. The headset jack 970D may be a USB interface 930, or may be a 3.5 mm open mobile terminal platform (open mobile terminal platform, OMTP) standard interface, or a cellular telecommunications industry association of the USA (cellular telecommunications industry association of the USA, CTIA) standard interface.

The pressure sensor 980A is configured to sense a pressure signal, and may convert the pressure signal into an electrical signal. In some embodiments, the pressure sensor 980A may be arranged in the display screen 994. There are a plurality of types of pressure sensors 980A, for example, a resistive pressure sensor, an inductive pressure sensor, and a capacitive pressure sensor. The capacitive pressure sensor may include at least two parallel plates made of a conductive material. When a force is applied to the pressure sensor 980A, capacitance between electrodes changes. The electronic device 900 determines pressure strength based on a change in the capacitance. When a touch operation is performed on the display screen 994, the electronic device 900 detects strength of the touch operation by using the pressure sensor 980A. The electronic device 900 may further calculate a position of the touch based on a detection signal of the pressure sensor 980A. In some embodiments, the touch operations that are performed at a same touch position but have different touch operation strength may correspond to different operation instructions. For example, when a touch operation whose touch operation strength is less than a first pressure threshold is performed on an SMS message application icon, an instruction of checking an SMS message is executed. When a touch operation whose touch operation intensity is greater than or equal to the first pressure threshold is performed on the icon of the SMS message application, an instruction for creating a new SMS message is performed.

The gyroscope sensor 980B may be configured to determine a motion posture of the electronic device 900. In some embodiments, an angular velocity of the electronic device 900 around three axes (for example, x, y, and z axes) may be determined by using the gyroscope sensor 980B. The gyroscope sensor 980B may be used for image stabilization in photography. For example, when the shutter is pressed, the gyro sensor 980B detects an angle at which the electronic device 900 jitters, and calculates, based on the angle, a distance for which a lens module needs to compensate, and allows the lens to cancel the jitter of the electronic device 900 through reverse motion, thereby implementing image stabilization. The gyro sensor 980B may also be used in navigation and a motion sensing game scene.

The acceleration sensor 980E may detect an acceleration value of the electronic device 900 all directions (generally in three axes). When the electronic device 900 is stationary, a magnitude and a direction of gravity may be detected. The acceleration sensor may be further configured to recognize a posture of the electronic device, and is applied to an application such as switching between landscape orientation and portrait orientation or a pedometer.

The distance sensor 980F is configured to measure a distance. The electronic device 900 may measure a distance through infrared or laser. In some embodiments, in a photographing scenario, the electronic device 900 may measure a distance by using the distance sensor 980F, to implement quick focusing.

The optical proximity sensor 980G may include, for example, a light emitting diode (light-emitting diode, LED) and an optical detector. The light-emitting diode may be an infrared light-emitting diode. The electronic device 900 emits infrared light by using the light emitting diode. The electronic device 900 detects infrared reflected light from a nearby object by using the photodiode. When sufficient reflected light is detected, it may be determined that there is an object near the electronic device 900. When insufficient reflected light is detected, the electronic device 900 may determine that there is no object near the electronic device 900. The electronic device 900 may detect, by using the optical proximity sensor 980G, that the user holds the electronic device 900 close to an ear to make a call to automatically turn off the screen for power saving. The optical proximity sensor 980G may also be used in an intelligent cover mode or a pocket mode to automatically perform screen unlocking or locking.

The ambient light sensor 980K is configured to sense a brightness of ambient light. The electronic device 900 may adaptively adjust brightness of the display screen 994 based on the sensed ambient light brightness. The ambient light sensor 980K may also be configured to automatically adjust white balance during photographing. The ambient light sensor 980K may further cooperate with the optical proximity sensor 980G to detect whether the electronic device 900 is in a pocket, so as to prevent an accidental touch.

The barometric pressure sensor 980C is configured to measure barometric pressure. In some embodiments, the electronic device 900 calculates an altitude by using a barometric pressure value measured by the barometric pressure sensor 980C, to assist in positioning and navigation.

The magnetic sensor 980D includes a Hall sensor. The electronic device 900 may detect movement of the electronic device 900 by using the magnetic sensor 980D. In some embodiments, the Hall sensor may form a linear trapezoidal magnetic field (or referred to as a slope magnetic field) by using magnets. The change of displacement of a Hall plate in the linear magnetic field is consistent with the change of a magnetic field intensity, and a formed Hall potential is proportional to the displacement. Therefore, the electronic device 900 may measure the displacement by obtaining the Hall potential.

The fingerprint sensor 980H is configured to collect a fingerprint. The electronic device 900 may implement fingerprint unlock, application lock accessing, fingerprint photographing, fingerprint-based call answering, and the like by using a feature of the collected fingerprint.

The temperature sensor 980I is configured to detect temperature. In some embodiments, the electronic device 900 executes a temperature processing policy by using the temperature detected by the temperature sensor 980I. For example, when the temperature reported by the temperature sensor 980I exceeds a threshold, the electronic device 900 reduces performance of a processor near the temperature sensor 980I, to reduce power consumption and implement heat protection. In some other embodiments, when the temperature is lower than another threshold, the electronic device 900 heats the battery 942, to avoid an abnormal shutdown of the electronic device 900 caused by a low temperature. In some other embodiments, when the temperature is lower than still another threshold, the electronic device 900 boosts an output voltage of the battery 942 to avoid abnormal shutdown caused by a low temperature.

The touch sensor 980J is also referred to as a "touch panel". The touch sensor 980J may be arranged on the display screen 994. The touch sensor 980J and the display screen 994 form a touchscreen, which is also referred to as a "touch screen". The touch sensor 980J is configured to detect a touch operation performed on or near the touch sensor 980J. The touch sensor may transmit the detected touch operation to the application processor, to determine a touch event type. A visual output related to the touch operation may be provided through the display screen 994. In some other embodiments, the touch sensor 980J may alternatively be arranged on a surface of the electronic device 900 at a position different from that of the display screen 994.

The bone conduction sensor 980L may acquire a vibration signal. In some embodiments, the bone conduction sensor 980L may obtain a vibration signal of a vibration bone of a human vocal-cord part. The bone conduction sensor 980L may alternatively contact a human pulse, and receive a blood pressure beating signal. In some embodiments, the bone conduction sensor 980L may be alternatively disposed in a headset, to form a bone conduction headset. The audio module 970 may obtain a voice signal through parsing based on the vibration signal, of the vibration bone of the vocal-cord part, that is obtained by the bone conduction sensor 980L, to implement a voice function. The application processor may parse heart rate information based on the blood pressure beating signal obtained by the bone conduction sensor 980L, to implement a heart rate detection function.

The key 990 includes a power key, a volume key, and the like. The key 990 may be a mechanical key, or may be a touch-type key. The electronic device 900 may receive a key input, and generate a key signal input related to user setting and function control of the electronic device 900.

The motor 991 may generate a vibration prompt. The motor 991 may be configured to provide a vibration prompt for an incoming call, and may be further configured to provide a touch vibration feedback. For example, touch operations applied to different applications (for example, photographing and audio playback) may correspond to different vibration feedback effects. For touch operations performed on different regions of the display screen 994, the motor 991 may also correspond to different vibration feedback effects. Different application scenarios (for example, a time reminder, information receiving, an alarm clock, and a game) may also correspond to different vibration feedback effects. A touch vibration feedback effect may be further customized.

The indicator 992 may be an indicator light, may be configured to indicate a charging state and a battery change, and may be further configured to indicate a message, a missed call, a notification, and the like.

The SIM card interface 995 is configured to connect to a SIM card. The SIM card may be inserted into the SIM card interface 995 or plugged from the SIM card interface 995, to come into contact with or be separated from the electronic device 900. The electronic device 900 may support one or N SIM card interfaces. N is a positive integer greater than 1. The SIM card interface 995 can support a Nano SIM card, a micro SIM card, a SIM card, and the like. A plurality of cards may all be inserted into the same SIM card interface 995. The plurality of cards may be of a same type or different types. The SIM card interface 995 may further be compatible with different types of SIM cards. The SIM card interface 995 may also be compatible with an external memory card. The electronic device 900 interacts with a network by using a SIM card, to implement functions such as a call and data communication. In some embodiments, the electronic device 900 uses an eSIM, that is, an embedded SIM card. The eSIM card may be embedded in the electronic device 900 and cannot be separated from the electronic device 900.

The electronic device 900 may be a mobile terminal, or may be a non-mobile terminal. Exemplarily, the electronic device 900 may be a mobile phone, a tablet computer, a notebook computer, a palmtop computer, an in-vehicle terminal, a wearable device, an ultra-mobile personal computer (ultra-mobile personal computer, UMPC), a netbook or a personal digital assistant (personal digital assistant, PDA), a wireless headset, a wireless bracelet, wireless intelligent glasses, a wireless watch, an augmented reality (augmented reality, AR)/virtual reality (virtual reality, VR) device, a desktop computer, intelligent appliances (such as a TV, a speaker, a refrigerator, an air purifier, an air conditioner, a rice cooker), and the like. The electronic device 900 may also be collectively referred to as an Internet of Things (Internet of Things, IoT) device. A type of the electronic device 900 is not specifically limited in the embodiments of this application.

It may be understood that, the electronic device 900 shown in FIG. 22 may correspond to the apparatus 800 shown in FIG. 16. The processor 910, the display screen 994, the pressure sensor 980A, or the touch sensor 980J in the electronic device 900 shown in FIG. 22 may correspond to the processing unit 830, the display unit 810, and the detection unit 820 in the apparatus 800 in FIG. 21.

During actual implementation, when the electronic device 900 is running, the processor 910 executes computer-executable instructions in the memory 921 to perform the operation steps of the foregoing methods by using the electronic device 900.

Optionally, in some embodiments, this application provides a chip, the chip being coupled to a memory and configured to read and execute a computer program or instructions stored in the memory, to perform the method according to the foregoing embodiments.

Optionally, in some embodiments, this application provides an electronic device including a chip, the chip being configured to read and execute a computer program or instructions stored in a memory, to perform the method according to the foregoing embodiments.

Optionally, in some embodiments, an embodiment of this application further provides a computer-readable storage medium, storing program code, the computer program code, when run on a computer, causing the computer to perform the method according to the foregoing embodiments.

Optionally, in some embodiments, the embodiments of this application further provide a computer program product, including computer program code, the computer program code, when run on a computer, causing the computer to perform the method according to the foregoing embodiments.

In the embodiments of this application, the electronic device includes a hardware layer, an operating system layer running on the hardware layer, and an application layer running on the operating system layer. The hardware layer may include hardware such as a central processing unit (central processing unit, CPU), a memory management unit (memory management unit, MMU), and a memory (which is also referred to as a main memory). The operating system of the operating system layer may be any one or more computer operating systems such as a Linux operating system, a Unix operating system, an Android operating system, an iOS operating system, or a Windows operating system that implement service processing by using a process (process). The application layer includes an application such as a browser, an address book, word processing software, or instant messaging software.

The embodiments of this application do not specifically limit a specific structure of an execution entity of the methods provided in the embodiments of this application, as long as the program in which the codes of the methods provided in the embodiments of this application are recorded can be executed to communicate according to the embodiments of this application. For example, the execution entity of the method provided in the embodiments of this application may be an electronic device, or may be functional modules in the electronic device that can invoke a program and execute the program.

Aspects or features of this application may be implemented as a method, an apparatus or a product that uses standard programming and/or engineering technologies. The term "product" used in this specification may cover a computer program that can be accessed from any computer readable component, carrier or medium. For example, the computer-readable medium may include but is not limited to: a magnetic storage component (such as a hard disk, a floppy disk, or a magnetic tape), an optical disc (for example, a compact disc (compact disc, CD), or a digital versatile disc (digital versatile disc, DVD)), a smart card, and a flash memory component (such as an erasable programmable read-only memory (erasable programmable read-only memory, EPROM), a card, a stick, or a key drive).

Various storage media described in this specification may indicate one or more devices and/or other machine-readable media that is used to store information. The term "machine readable media" may include but is not limited to a radio channel, and various other media that can store, contain and/or carry an instruction and/or data.

It should be understood that, the processor mentioned in the embodiments of this application may be a central processing unit (central processing unit, CPU), or may be another general-purpose processor, a digital signal processor (digital signal processor, DSP), an application-specific integrated circuit (application specific integrated circuit, ASIC), a field-programmable gate array (field-programmable gate array, FPGA), or another programmable logic device, a discrete gate or a transistor logic device, a discrete hardware component, or the like. The general-purpose processor may be a microprocessor, or the processor may be any conventional processor and the like.

It may be further understood that the memory mentioned in the embodiments of this application may be a volatile memory or a non-volatile memory, or may include a volatile memory and a non-volatile memory. The non-volatile memory may be a read-only memory (read-only memory, ROM), a programmable ROM (programmable ROM, PROM), an erasable PROM (erasable PROM, EPROM), an electrically EPROM (electrically EPROM, EEPROM), or a flash memory. The volatile memory may be a random access memory (random access memory, RAM). For example, the RAM may be used as an external cache. By way of example, and not limitation, the RAM may include the following various forms: a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It is to be noted that, when the processor is a general-purpose processor, a DSP, an ASIC, an FPGA, or another programmable logic device, a discrete gate or a transistor logic device, or a discrete hardware component, the memory (a storage module) may be integrated into the processor.

It is to be noted that, the memory described herein aims to include but not limited to these memories and any other suitable types of memories.

A person of ordinary skill in the art may be aware that the units and steps in the examples described with reference to the embodiments disclosed in this specification can be implemented by electronic hardware or a combination of computer software and electronic hardware. Whether the functions are executed in a mode of hardware or software depends on particular applications and design constraint conditions of the technical solutions. A person skilled in the art may use different methods to implement the described functions for each particular application, but it should not be considered that the implementation goes beyond the protection scope of this application.

A person skilled in the art may clearly understand that for convenience and conciseness of description, for specific working processes of the foregoing described system, apparatus and unit, reference may be made to the corresponding processes in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units may be integrated into one unit.

If implemented in the form of software functional units and sold or used as an independent product, the functions may also be stored in a computer-readable storage medium. Based on such an understanding, the technical solutions of this application essentially, or the part contributing to the prior art, or some of the technical solutions may be implemented in a form of a computer software product. The computer software product is stored in a storage medium, and includes several instructions for instructing a computer device (which may be a personal computer, a server, a network device, or the like) to perform all or some of the steps of the methods described in the embodiments of this application. The storage medium may include but is not limited to: various media that may store processing code, such as a USB flash drive, a removable hard disk, a ROM, a RAM, a magnetic disk, and an optical disc.

Unless otherwise defined, meanings of all technical and scientific terms used in this specification are the same as those usually understood by a person skilled in the art to which this application belongs. In this application, terms used in the specification of this application are merely intended to describe objectives of the specific embodiments, but are not intended to limit this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An application interface display method, comprising:
displaying, by an electronic device, an interface of a first application on a display screen;
receiving, by the electronic device, a first operation performed by a user on a target object in the interface of the first application;
displaying, by the electronic device, a second application identifier on the display screen in response to the first operation, a second application corresponding to the second application identifier being an application recommended based on the target object;
receiving, by the electronic device, a second operation performed by the user on the second application identifier; and
simultaneously displaying, by the electronic device, the interface of the first application and an interface of the second application on the display screen in response to the second operation;
wherein the displaying by an electronic device, an interface of a first application on a display screen comprises:
displaying, by the electronic device the interface of the first application and an interface of a third application on the display screen in a split-screen manner:
wherein in a case that the electronic device displays the interface of the first application and the interface of the third application in a split-screen manner, the simultaneously displaying, by the electronic device, the interface of the first application and an interface of the second application on the display screen comprises:
displaying, by the electronic device, the interface of the first application and the interface of the second application in a split-screen manner in a case that the second application supports split-screen display; and
displaying, by the electronic device, the interface of the third application in a form of a floating ball or hiding the interface of the third application.

2. The method according to claim 1, wherein the simultaneously displaying, by the electronic device, the interface of the first application and an interface of the second application on the display screen in response to the second operation comprises:
displaying, by the electronic device in response to the second operation, the interface of the first application and the interface of the second application on the display screen in a split-screen manner in a case that both the first application and the second application support split-screen display.

3. The method according to claim 1, wherein the simultaneously displaying, by the electronic device, the interface of the first application and an interface of the second application on the display screen in response to the second operation comprises:
displaying, by the electronic device in response to the second operation, the interface of the second application on the interface of the first application in a form of a floating window in a case that at least one of the first application and/or the second application does not support split-screen display, and the second application supports floating-window display.

4. The method according to claim 1, wherein the simultaneously displaying, by the electronic device, the interface of the first application and an interface of the second application on the display screen in response to the second operation comprises:
in response to the second operation and in a case that at least one of the first application or the second application does not support split-screen display, and the first application supports floating-window display, displaying, by the electronic device, the interface of the second application on the display screen in a full-screen manner and displaying the interface of the first application on the interface of the second application in a form of a floating window.

5. The method according to claim 1, wherein after the receiving, by the electronic device, a second operation performed by the user on the second application identifier, the method further comprises:
displaying, by the electronic device in response to the second operation, the interface of the second application on the display screen in a full-screen manner in a case that at least one of the first application or the second application does not support split-screen display, and both the first application and the second application do not support floating-window display.

6. The method according to claim 1, wherein the target object is text or a picture.

7. The method according to claim 1, wherein
the first operation is a selection or copy operation on the target object in a case that the target object is text; or
the first operation comprises a text recognition operation on the target object and a selection or copy operation on text content of a text recognition result in a case that the target object is a picture.

8. The method according to claim 1, wherein in a case that the electronic device displays a first sub-interface and a second sub-interface of the first application on the display screen in a split-screen manner, the first operation is an operation performed by the user on the target object in the first sub-interface; and
the simultaneously displaying, by the electronic device, the interface of the first application and an interface of the second application on the display screen comprises:
displaying, by the electronic device, the first sub-interface and the interface of the second application in a split-screen manner in a case that the second application supports split-screen display; and
displaying, by the electronic device, the second sub-interface in a form of a floating ball or hiding the second sub-interface.

9. The method according to claim 1, wherein in a case that the electronic device displays a first sub-interface and a second sub-interface of the first application on the display screen in a split-screen manner, the first operation is an operation performed by the user on the target object in the first sub-interface; and the simultaneously displaying, by the electronic device, the interface of the first application and an interface of the second application on the display screen comprises:

in a case that the second application does not support split-screen display but supports floating-window display, maintaining, by the electronic device, display of the first sub-interface and the second sub-interface of the first application in a split-screen manner, and displaying the interface of the second application on the second sub-interface in the form of a floating window.

10. The method according to claim 1, wherein in a case that the electronic device displays the interface of the first application and the interface of the third application in a split-screen manner, the simultaneously displaying, by the electronic device, the interface of the first application and an interface of the second application on the display screen comprises:

in a case that the second application does not support split-screen display but supports floating-window display, maintaining, by the electronic device display of the interface of the first application and the interface of the third application in a split-screen manner, and displaying the interface of the second application on the interface of the third application in the form of a floating window.

11. The method according to claim 1, wherein the second application identifier comprises at least one of the following: an icon, text, a preview, or a thumbnail.

12. The method according to claim 1, wherein the second application identifier comprises a pull-down control; and the method further comprises:

displaying, by the electronic device, a recommended menu bar in a case that the electronic device receives an operation performed by the user on the pull-down control, the recommended menu bar comprising the second application identifier and a fourth application identifier, and a fourth application corresponding to the fourth application identifier being an application recommended based on the target object; and simultaneously displaying, by the electronic device, the interface of the first application and an interface of the fourth application on the display screen in a case that the electronic device receives an operation performed by the user on the fourth application identifier.

13. An electronic device, comprising a processor, coupled to a memory and configured to execute a computer program or instructions stored in the memory, to cause the electronic device to implement the following steps:

displaying by an electronic device an interface of a first application on a display screen;

receiving, by the electronic device, a first operation performed by a user on a target object in the interface of the first application;

displaying, by the electronic device, a second application identifier on the display screen in response to the first operation, a second application corresponding to the second application identifier being an application recommended based on the target object;

receiving, by the electronic device, a second operation performed by the user on the second application identifier; and simultaneously displaying, by the electronic device, the interface of the first application and an interface of the second application on the display screen in response to the second operation, wherein the displaying by an electronic device, an interface of a first application on a display screen comprises:

displaying, by the electronic device, the interface of the first application and an interface of a third application on the display screen in a split-screen manner;

wherein in a case that the electronic device displays the interface of the first application and the interface of the third application in a split-screen manner, the simultaneously displaying, by the electronic device, the interface of the first application and an interface of the second application on the display screen comprises:

displaying, by the electronic device, the interface of the first application and the interface of the second application in a split-screen manner in a case that the second application supports split-screen display; and displaying, by the electronic device, the interface of the third application in a form of a floating ball or hiding the interface of the third application.

14. A computer-readable storage medium, storing a computer program, the computer program, when run on an electronic device, causing the electronic device to perform the following steps:

displaying, by n electronic device, an interface of a first application on a display screen;

receiving, by the electronic device, a first operation performed by a user on a target object in the interface of the first application;

displaying, by the electronic device, a second application identifier on the display screen in response to the first operation, a second application corresponding to the second application identifier being an application recommended based on the target object;

receiving, by the electronic device, a second operation performed by the user on the second application identifier; and simultaneously displaying, by the electronic device, the interface of the first application and an interface of the second application on the display screen in response to the second operation;

wherein the displaying, by an electronic device, an interface of a first application on a display screen comprises:

displaying, by the electronic device, the interface of the first application and an interface of a third application on the display screen in a split-screen manner;

wherein in a case that the electronic device displays the interface of the first application and the interface of the third application in a split-screen manner, the simultaneously displaying, by the electronic device, the interface of the first application and an interface of the second application on the display screen comprises:

displaying, by the electronic device, the interface of the first application and the interface of the second application in a split-screen manner in a case that the second application supports split-screen display; and displaying, by the electronic device, the interface of the third application in a form of a floating ball or hiding the interface of the third application.

15. The electronic device according to claim 13, wherein the processor is configured to execute a computer program or instructions stored in the memory, to cause the electronic device to further implement the following steps:

wherein in a case that the electronic device displays a first sub-interface and a second sub-interface of the first application on the display screen in a split-screen manner, the first operation is an operation performed by the user on the target object in the first sub-interface; and the simultaneously displaying, by the electronic device, the interface of the first application and an interface of the second application on the display screen comprises:

displaying, by the electronic device, the first sub-interface and the interface of the second application in a split-screen manner in a case that the second application supports split-screen display; and displaying, by the electronic device, the second sub-interface in a form of a floating ball or hiding the second sub-interface.

16. The electronic device according to claim 13, wherein in a case that the electronic device displays a first sub-interface and a second sub-interface of the first application on the display screen in a split-screen manner, the first operation is an operation performed by the user on the target object in the first sub-interface; and the simultaneously displaying, by the electronic device, the interface of the first application and an interface of the second application on the display screen comprises: in a case that the second application does not support split-screen display but supports floating-window display, maintaining, by the electronic device, display of the first sub-interface and the second sub-interface of the first application in a split-screen manner, and displaying the interface of the second application on the second sub-interface in the form of a floating window.

17. The electronic device according to claim 13, wherein in a case that the electronic device displays the interface of the first application and the interface of the third application in a split-screen manner, the simultaneously displaying, by the electronic device, the interface of the first application and an interface of the second application on the display screen comprises: in a case that the second application does not support split-screen display but supports floating-window display, maintaining, by the electronic device display of the interface of the first application and the interface of the third application in a split-screen manner, and displaying the interface of the second application on the interface of the third application in the form of a floating window.

* * * * *

UNITED STATES PATENT AND TRADEMARK OFFICE
CERTIFICATE OF CORRECTION

PATENT NO. : 12,229,387 B2  
APPLICATION NO. : 18/025690  
DATED : February 18, 2025  
INVENTOR(S) : Liu Yang Page 1 of 1

It is certified that error appears in the above-identified patent and that said Letters Patent is hereby corrected as shown below:

In the Claims

Column 46, Claim 3, Line 10, change "and/or" to --or--; and

Column 48, Claim 14, Line 5, change "displaying, by n" to --displaying, by an--.

Signed and Sealed this  
Eighteenth Day of March, 2025

Coke Morgan Stewart  
*Acting Director of the United States Patent and Trademark Office*